(12) United States Patent
Shinjo et al.

(10) Patent No.: US 9,009,655 B2
(45) Date of Patent: Apr. 14, 2015

(54) CODE STRING SEARCH APPARATUS, SEARCH METHOD, AND PROGRAM

(75) Inventors: Toshio Shinjo, Kanagawa (JP); Mitsuhiro Kokubun, Kanagawa (JP)

(73) Assignee: Kousokuya, Inc., Kanagawa (JP)

( * ) Notice: Subject to any disclaimer, the term of this patent is extended or adjusted under 35 U.S.C. 154(b) by 502 days.

(21) Appl. No.: 13/064,487

(22) Filed: Mar. 28, 2011

(65) Prior Publication Data

US 2011/0191756 A1    Aug. 4, 2011

Related U.S. Application Data

(63) Continuation of application No. PCT/JP2009/001284, filed on Mar. 24, 2009, and a continuation of application No. PCT/JP2009/001292, filed on Mar. 24, 2009, and a continuation of application No. PCT/JP2009/006921, filed on Dec. 16, 2009, and a continuation of application No. PCT/JP2009/006922, filed on Dec. 16, 2009.

(30) Foreign Application Priority Data

| Sep. 28, 2008 | (JP) | 2008-249373 |
| Feb. 23, 2009 | (JP) | 2009-038748 |
| Mar. 18, 2009 | (JP) | 2009-065379 |
| Mar. 29, 2009 | (JP) | 2009-080726 |

(51) Int. Cl.
*G06F 9/44* (2006.01)
*G06F 17/30* (2006.01)

(52) U.S. Cl.
CPC .............................. *G06F 17/30221* (2013.01)

(58) Field of Classification Search
None
See application file for complete search history.

(56) References Cited

U.S. PATENT DOCUMENTS

| 2002/0123995 A1* | 9/2002 | Shibuya ........................... 707/6 |
| 2003/0101171 A1* | 5/2003 | Miyamoto et al. ................ 707/3 |

FOREIGN PATENT DOCUMENTS

| JP | 04-205560 A | 7/1992 |
| JP | 04-242864 A | 8/1992 |
| JP | 05-61910 A | 3/1993 |
| JP | 05-324722 A | 12/1993 |
| JP | 06-149882 A | 5/1994 |

(Continued)

OTHER PUBLICATIONS

Kunihiko Sadakane, "A Note on the Compressed Suffix Arrays," Technical Report of IEICE, vol. 100, No. 226, pp. 49-56, The Institute of Electronics, Information and Communication Engineers (Jul. 19, 2000).

(Continued)

*Primary Examiner* — Qamrun Nahar
(74) *Attorney, Agent, or Firm* — Brian K. Dutton

(57) ABSTRACT

A code ID range table holding code ID ranges for each code of a same code type and a next code ID table holding next code IDs are created. Code ID ranges of code types of codes configuring a search code string are read out from the code ID range table for the search target code string, and the stored next code ID corresponding to a code ID included in the code ID range of the code type of the head code in the search code string is read out from the next code ID table while the stored next code IDs corresponding to the next codes are successively read out from the next code ID table, and the next code ID read out from the next code ID table is verified whether it is included in the code ID range read out from the code ID range table.

91 Claims, 56 Drawing Sheets

(56) References Cited

FOREIGN PATENT DOCUMENTS

| JP | 06-162092 A | 6/1994 |
|---|---|---|
| JP | 08-190571 A | 7/1996 |
| JP | 2002-229987 A | 8/2002 |
| JP | 2003-006231 A | 1/2003 |
| JP | 3672242 B1 | 7/2005 |
| JP | 4402168 B1 | 1/2010 |
| JP | 4402169 B1 | 1/2010 |
| WO | WO-2010/035366 A1 | 4/2010 |
| WO | WO-2010/095179 A1 | 8/2010 |

OTHER PUBLICATIONS

Japan Patent Office Action, 2009-521269, 5 pages, mailed on Sep. 8, 2010.
Japan Patent Office Action, 2009-521270, 7 pages, mailed on Sep. 8, 2010.
Japan Patent Office commuication, Decision to grant patent, 3 pages, mailed on Nov. 17, 2010.
Japan Patent Office Action, 2009-080726, 5 pages, mailed on Nov. 17, 2010.
International Search Report mailed on May 19, 2009 in connection with PCT/JP2009/001284.
International Search Report mailed on May 19, 2009 in connection with PCT/JP2009/001292.
International Search Report mailed on Feb. 2, 2010 in connection with PCT/JP2009/006921.
International Search Report mailed on Feb. 2, 2010 in connection with PCT/JP2009/006922.
Roberto Grossi et al.: "Compressed suffix arrays and suffix trees with applications to text indexing and string matching (extended abstract)," Proceedings of the Thirty-Second Annual ACM Symposium on Theory of Computing, STOC '00, Jan. 1, 2000, pp. 397-406, XP055050848, New York, New York, USA, DOI: 10.1145/335305.335351.
Extended European Search Report issued in EP application No. 09842945.9, dated Jan. 30, 2013.

* cited by examiner

CODE STRING SEARCH APPARATUS, SEARCH METHOD, AND PROGRAM

CROSS-REFERENCE TO RELATED APPLICATIONS

This application is a continuation of PCT/JP2009/001284 filed on Mar. 24, 2009, PCT/JP2009/001292 filed on Mar. 24, 2009, PCT/JP2009/006921 filed on Dec. 16, 2009, and PCT/JP2009/006921 filed on Dec. 16, 2009. PCT/JP2009/001284, PCT/JP2009/001292, PCT/JP2009/006921, and PCT/JP2009/006922 are based on and claim the benefit of priority of the prior Japanese Patent Application 2008-249373 filed on Sep. 28, 2008, the prior Japanese Patent Application 2009-038748 filed on Feb. 23, 2009, the prior Japanese Patent Application 2009-065379 filed Mar. 18, 2009, and the prior Japanese Patent Application 2009-080726 filed Mar. 29, 2009 respectively, the entire contents of which are incorporated by reference. The contents of PCT/JP2009/001284, PCT/JP2009/001292, PCT/JP2009/006921, and PCT/JP2009/006922 are incorporated by reference.

BACKGROUND OF THE INVENTION

1. Field of the Invention

This invention is related to code string searches that search with a computer for codes or code strings consisting of bit strings in the same way as character string searches that search for character codes or character code strings consisting of bit strings.

2. Description of Related Art

Recently it has become customary to use word processing to create business documents, and by the spread of the interne, the number and size of electronic documents, using character codes consisting of bit strings that can be processed by computers, have grown immensely throughout the world. For this reason, various character string search methods are being developed in order to fetch a necessary document from out of this huge amount of documents using computers.

In these character string search methods it is general practice to prepare an index ahead of time in order to realize fast searches. For example, the method of extracting words from the documents for the index and making an inverted index that associates the name of a document that includes those words for each of those words is well known. This method has the advantages that the size of this inverted index is relatively small, the search is fast, and configuring the index is easy. How ever there are languages for which words are difficult to extract. And this method has the disadvantage that when a search is made for a set of multiple words it becomes necessary to process word position matches for the document. And a search for an arbitrary string of characters in a single document is also difficult.

And so an index called a suffix array has been developed that enables a search for any character string. The patent reference 1 and non-patent reference 1 below disclose a suffix array and a search method using that array.

FIG. 1A describes an example of previous search methods related to the above suffix array. FIG. 1A shows an example of a character string, character string 10, which is the target of a search. Character string 10 consists of the alphabetic characters A, B, C, E, and the separator character $. The character A is located in character positions 1, 4, and 7 of character string 10. The character B is located in character positions 2 and 5 of character string 10. The character C is located in character positions 6 and 8 of character string 10. The character D is located in character position 3 of character string 10. The separator character $ is located in character position 9, which is the tail end of character string 10.

Also FIG. 1A depicts the suffixes in character position sequence 20, the suffixes in dictionary sequence 20a, and the suffix array 30 which correspond to the character string 10. FIG. 1A further depicts the arrow with a dotted line 81 showing that the suffixes in character position sequence 20 are those of the character string 10 and the arrow with a dotted line 82 showing that the suffixes in dictionary sequence 20a is obtained by sorting the suffixes in character position sequence 20 into dictionary sequence.

Character string 10, as shown in the suffixes in character sequence 20, can be thought to have 9 suffixes as its partial character strings. By sorting suffixes in character position sequence 20, which has suffixes arranged in the character position sequence of the leading character of each suffix, into dictionary sequence, suffixes in dictionary sequence 20a is obtained. At this time, by storing the character position of the leading character of the suffix rearranged in dictionary sequence in an array, suffix array 30 is obtained. By means of this suffix array, the leading character position of a partial character string that matches the pattern of the search character string can be obtained from among the character strings that are the target of the search.

FIG. 1B describes conceptually a character string search using a compressed suffix array in an example of a prior art search method and shows compressed suffix array 50 (a conceptual diagram) associated with search character string 40 and suffix array 30 shown in described referencing FIG. 1A. In array element number (i) of compressed suffix array 50 (conceptual diagram) is stored the next array element number ($\Psi$). The next array element number ($\Psi$) is an array element number of suffix array 30 wherein is stored a character position which has 1 added to the character position stored in array element number (i) of suffix array 30.

By changing the content stored in the array from a character position to a next array element number ($\Psi$), the values stored in each character group are arranged in ascending order, as shown in the drawing. As a result, because the value stored in each array element need not be the actual next array element number ($\Psi$) itself but can be an increment on the value of the previous array element number, the bit width of the addresses can be made smaller, and the amount of information can be compressed.

Regarding the concept of a search, FIG. 1B shows the search steps from each of the characters in the illustrated search character string 40 by means of the arrow with a dotted line to array element numbers (i) of compressed suffix array 50 (conceptual diagram) and by means of an arrow between the numbers 3, 6, 9 shown in bold for those array element numbers (i), and the numbers 6, 9 shown in bold in the next array element number ($\Psi$). In other words, given that from among the array element numbers corresponding to the leading character A in search character string 40, 3, for example, is selected and the next array element number 6 in array element number 3 is the array element number corresponding to the second letter B in the search character string 40, and the next array element number 9 in array element number 6 is the array element number corresponding to the third letter E in the search character string 40, it can be understood that character string 10 that is the target of searches will result in a hit in a search using search character string 40.

Patent document 1: JP 3,672,242 B
Non-Patent document 1: Sadakane Kunihiko, "A Note on the Compressed Suffix Arrays"; IEICE technical report, Data engineering; 100 (226), pp. 49-56, 2000/07/19; The Institute of Electronics, Information and Communication Engineers.

SUMMARY OF THE INVENTION

By using a compressed suffix array in a character string search, a search can be done for any character string and the size of the array can be reduced. However, to create a compressed suffix array, first it is necessary that suffixes be created from the character strings that are the object of searches and those suffixes be sorted in dictionary sequence, and a suffix array be created, and so the processing time for creating a compressed suffix array from character strings that are the object of searches becomes quite large.

Whereat, the problem that this invention intends to solve is to reduce the time for creating index data that enables searches for not only character strings but for any code string. And the objective of this invention is to find an index data structure that enables searches for any code string and that can be created in less time than current art, and to provide a code string search method that uses that data structure.

In accordance with an embodiment 1 of this invention, first a code ID that uniquely identifies each and all of the codes located in the code strings that are the object of searches is to be assigned to each and all of those codes in such a way that the range of code IDs does not overlap for any of the values of differing codes (hereinbelow, in the description of the embodiment 1 and so on, they may simply be called a code if there is no risk of misunderstanding; also conversely to emphasize the fact that they are the values of differing codes they may be called code types). For example, the above code assignment can be realized by repeatedly assigning a code ID in ascending order to each code in the order that they occur in the code string, the value of the first code ID for each code type having a larger value than that of the code IDs assigned until then.

And, in accordance with the embodiment 1, a code ID range table holding the range of code IDs for each code and a next code ID table holding a next code ID indicating the code ID that is located immediately after each code ID are created and code string searches are implemented using that code ID range table and that next code ID table.

According to the embodiment 1's code string search for a search target code string using a search code string, the ranges of the code IDs for the codes comprising the search code string are read out from the code ID range table for the search target code string, and the next code ID held in relation to a code ID included in the code ID range for the leading code in the search code string is read out from the next code ID table, and then the next code IDs held corresponding to that next code are successively read out from the next code ID table and it is verified whether the next code IDs read out from the next code ID table is included in the range of code IDs read out from the code ID range table.

In accordance with an embodiment 2 of this invention, the code string that is the target of searches is divided into several blocks (hereinafter these blocks may be called code string blocks). Then for each code string block a code ID that uniquely identifies each and all of the codes located in the code string block is to be assigned to each and all of those codes in such a way that the range of code IDs does not overlap for any of the values of differing codes. For example, the above code assignment can be realized by repeatedly assigning a code ID in ascending order to each code in the order that they occur in the code string block, the value of the first code ID for each code type having a larger value than that of the code IDs assigned until then.

And, in accordance with the embodiment 2 of this invention, corresponding to each code string block, a code ID range table holding the range of code IDs for each code and a next code ID table holding a next code ID indicating the code ID that is located immediately after each code ID are created and a code string search is implemented using those code ID range tables and next code ID tables.

According to this embodiment 2's code string search for a search target code string using a search code string, the ranges of the code IDs for the codes comprising the search code string are read out from the code ID range table for the head code string block, and the next code ID held in relation to a code ID included in the code ID range for the leading code in the search code string is read out from the next code ID table created for each code string block, and then the next code IDs held corresponding to that next code are successively read out from the next code ID table and it is verified whether the next code ID read out from the next code ID table is included in the range of code IDs read out from the code ID range table. And this verification is similarly performed for each of following code string blocks.

In accordance with an embodiment 3 of this invention, the division of the code string, assignment of code IDs, and creation of code ID range tables and next code ID tables are similarly performed in accordance with the embodiment 2 of this invention.

However, according to this embodiment 3's code string search for a search target code string using a search code string, the ranges of the code IDs for the codes comprising the search code string are read out from the code ID range table for the head code string block, and the next code ID held in relation to a code ID included in the code ID range for the leading code in the search code string is read out from the next code ID table created for each code string block, and then the next code IDs held corresponding to that next code are successively read out from the next code ID table and a code corresponding to the entry in the code ID range table of which code ID range includes the next code ID read out from the next code ID table is acquired, and it is successively verified whether the acquired code is identical to the next positioned code in the search code string. And this verification is similarly performed for each of following code string blocks.

In accordance with an embodiment 4 of this invention, the code string that is the target of searches is also divided into several blocks (hereinafter these blocks may be called code string blocks, too). However, the code located at the tail end of one code string block is duplicated in the code located at the head of the following code string block in the proposed block partitioning. Then for each code string block a code ID that uniquely identifies each and all of the codes located in the code string block is to be assigned to each and all of those codes in such a way that the range of code IDs does not overlap for any of the values of differing codes, which is similar to the assignment of code IDs according to the embodiment 2.

And also, in accordance with the embodiment 4 of this invention, corresponding to each code block, a code ID range table holding the range of code IDs for each code and a next code ID table holding a next code ID indicating the code ID that is located immediately after each code ID are created and a code string search is implemented using those code ID range tables and next code ID tables.

According to this embodiment 4's code string search for a search target code string using a search code string, the ranges of the code IDs for the codes comprising the search code string are read out from the code ID range table for the head code string block, and the next code ID held in relation to a code ID included in the code ID range for the leading code in the search code string is read out from the next code ID table created for each code string block, and then the next code IDs held corresponding to that next code are successively read out from the next code ID table and it is verified whether the next code ID read out from the next code ID table is included in the range of code IDs read out from the code ID range table. And this verification is similarly performed for each of following code string blocks. As described above, the embodiment 4's code string search is similar to the code string search according to the embodiment 2 in the outline.

In accordance with this invention, because a search can be implemented using a code ID range table and a next code ID table, both with a simple structure, it is not necessary to create a suffix array, and the processing burden for creating a computer index can be reduced.

DETAILED DESCRIPTION OF THE INVENTION

Hereinbelow, the preferred embodiments of this invention are described while referencing the drawings.

Figure 2A:
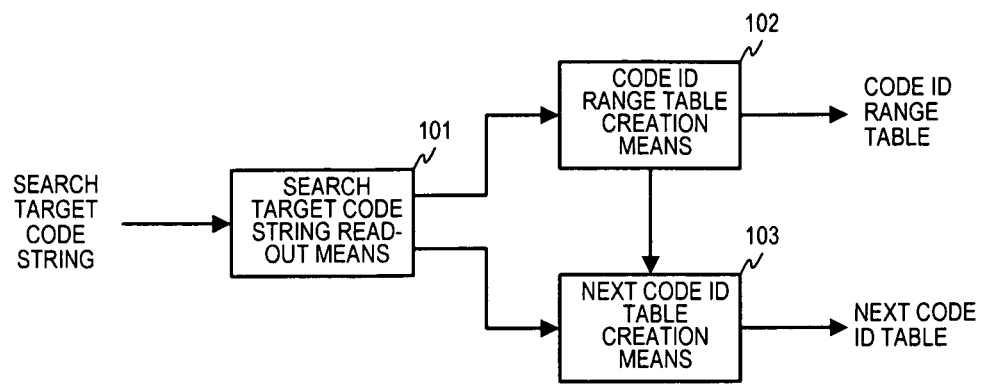
FIG. 2A is a drawing describing function blocks for creating the data structure for an index in an embodiment 1 of this invention.

FIG. 2A is a drawing describing function blocks for creating the data structure for an index in one embodiment, an embodiment 1, of this invention. A search target code string is read out by the search target code string read-out means 101 and is passed to the code ID range table creation means 102 and the next code ID table creation means 103.

The code ID range table creation means 102 creates a code ID range table holding the range of code IDs for each code, and the next code ID table creation means 103 creates a next code ID table holding next code IDs, which are the code IDs positioned next after each code ID. This code ID range table and this next code ID table are created for each of the code strings that are objects of searches.

Figure 2B:
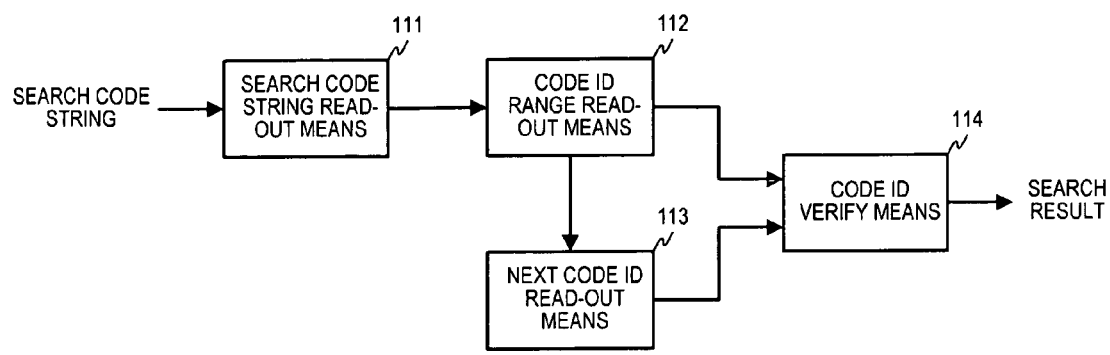
FIG. 2B is a drawing describing function blocks for performing a code string search in an embodiment 1 of this invention.

FIG. 2B is a drawing describing function blocks for performing a code string search in the embodiment 1 of this invention. A search code string is read out by search code string read-out means 111 and is passed to the code ID range read-out means 112. The code ID range read-out means 112 reads out the range of the code IDs of the codes that compose the search code string passed from search code string read-out means 111 using the code ID range table created by the code ID range table creation means 102, and passes them to the next code ID read-out means 113 and the code ID verify means 114.

The next code ID read-out means 113 reads out the next code ID stored in association with a code ID included in the code ID range of the leading code in the search code string passed by the code ID range read-out means 112 from the next code ID table created by the next code ID table creation means 103 and at the same time successively reads out from the next code ID table a next code ID stored in correspondence with that next code and passes it to the code ID verify means 114.

The code ID verify means 114 verifies whether the next code ID passed from the next code ID read-out means 113 is included in the range of code IDs passed from the code ID range read-out means 112 and outputs the search result.

Figure 2C:
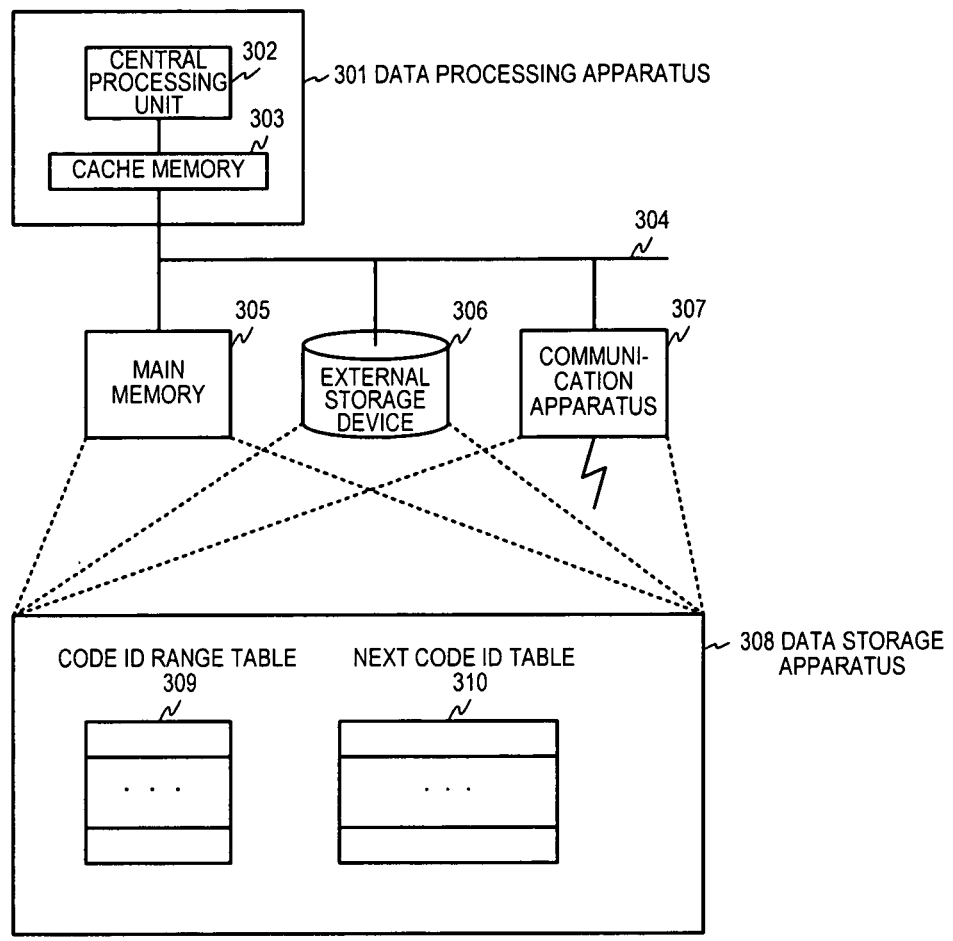
FIG. 2C is a drawing describing an exemplary hardware configuration in an embodiment 1 of this invention.

FIG. 2C is a drawing describing an exemplary hardware configuration in the embodiment 1 of this invention.

Search processing and index creation processing are implemented with the searching apparatus of the present invention by a data processing apparatus 301 having at least a central processing unit 302 and a cache memory 303, and a data storage apparatus 308. The data storage apparatus 308, which has the code ID range table 309 and the next code ID table 310 can be implemented in the main memory 305 or a storage device 306, or alternatively, by using a remotely disposed apparatus connected via a communication apparatus 307.

Each of the function blocks such as the search target code string read-out means 101 and so forth described referencing FIG. 2A and FIG. 2B can be realized in the hardware illustrated in FIG. 2C and in software that prepares the steps described hereinafter.

In the example shown in FIG. 2C, although the main memory 305, the storage device 306, and the communication apparatus 307 are connected to the data processing apparatus 301 by a single bus 304, there is no restriction to this connection method. The main memory 305 can also be disposed within the data processing apparatus 301.

Also, although it is not particularly illustrated, a temporary memory area can of course be used to enable various values obtained during processing to be used in subsequent processing. In the descriptions below, the values stored or set in a temporary memory area may be called by the name of that temporary memory area.

Next, an overview is described of a search method in the embodiment 1 of this invention.

Figure 3A:
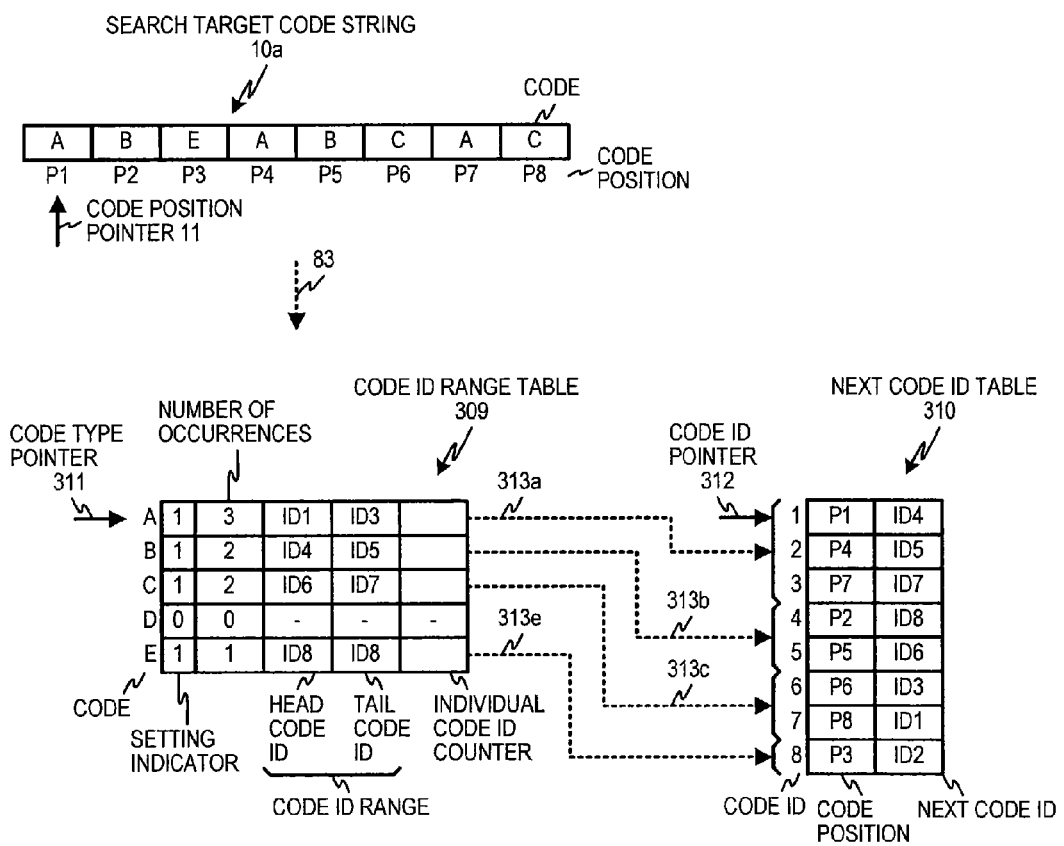
FIG. 3A is a drawing describing an index date structure in an embodiment 1 of this invention.

FIG. 3A is a drawing describing an index data structure in the embodiment 1 of this invention. FIG. 3A shows an example of a search target code string that is the target of index data creation. The exemplified search target code string 10a consists of the eight alphabetic character codes A, B, E, A, B, C, A. The P1 to P8 depicted below each of those alphabetic codes indicate the position of the code in search target code string 10a. The code position pointer 11 is a pointer that indicates the position of a code in search target code string 10a and in the example in the drawing it points to code position P1. A code ID range table and a next code ID table are created as the index data for any code string that is the target of a search.

FIG. 3A shows an exemplary index data structure for a code string search and exemplifies a code ID range table 309 and a next code ID table 310 that are created in correspondence to the search target code string 10a, which correspondence is shown by the dotted line of arrow 83.

The entries of the code ID range table 309 are created for each code type of the differing codes that occur in the search target code string, which is the object for making index data. As is shown on the left side of the code ID range table 309, in the example shown in the drawing, of all the letters in the alphabet, the search target code string with the code strings consisting of codes A to E is the object for making the index data, and an entry is made corresponding to each code. The code type pointer 311 is a pointer to the entries in code ID range table 309, and in the example in the drawing points to the entry corresponding to code A.

Also, because each code is composed of bit strings, each code holds a value that can be expressed by the bit values of that bit string. Thus, it is clear that a position of an entry corresponding to each code in code ID range table 309 can be associated with the value of each such code. In other words, the value taken by the code type pointer 311 can be made the code itself. Consequently, in the description below, an entry corresponding to a given code may be expressed as an entry being pointed to by that code.

As shown in the information beneath the code ID range table 309, an entry in the code ID range table 309 consists of a setting indicator, a number of occurrences, a head code ID, a tail code ID, and an individual code ID counter. The setting indicator shows with a 0 or 1 whether that code occurs in the search target code string, and in the example in the drawing, because the code D does not occur in search target code string 10a, only the entry for code D has a 0, and all the other entries have a 1. The number of occurrences is the number of times that code occurs in the search target code string, and in the example in the drawing, corresponding to search target code string 10a, 3, 2, 2, 0, and 1 are stored for the codes A to E.

The head code ID and the tail code ID indicate the range for that code ID for each code. The code ID is assigned in the order of appearance of each unique code in the search target code string in order that there be no overlap between codes, and in the example shown in the drawing, because the number of occurrences for code A is 3, it has the range of ID 1 to ID 3, and because the number of occurrences for code B is 2, it has the range of ID 4 to ID 5. Hereinbelow, in the same way, code C has ID 6 to ID 7, and for code E, since the number of occurrences is 1, head code and the tail code are both ID 8.

Also, although it preferable that the value of ID 1 and so forth be an integer value beginning concretely from 1, it is not limited to that technique and it is sufficient that the ID ranges for each code be differentiated. Also, although the code ID range is expressed by a head code ID and a tail code ID in the example in the drawing, it can be expressed by enumerating all the code IDs if one does not mind that the code ID range has a variable data length.

The individual code ID counter is a counter needed when a next code ID table is to be created at the same time that a code ID range table is being created, and it is not necessary as index data. Thus it can be set up as a counter separate from that of the code ID range table, for each of the differing code types.

An entry in the next code ID table 310 is created for each code ID assigned to a code in search target code string 10a. As shown on the left side of next code ID table 310, in the example shown in the drawing, entries are created corresponding to code ID 1 to code ID 8. Each entry consists of the items code position and next code ID. Code ID pointer 312 is a pointer pointing to an entry in next code ID table 310, and in the example in the drawing it points to ID 1.

The code position of the entry for each code ID is a code position that is the position of the code with that code ID in search target code string 10a, and in the example shown in the drawing P1 is stored for ID 1, P4 is stored for ID 2, P7 is stored for ID 3, P2 is stored for ID 4, P5 is stored for ID 5, P6 is stored for ID 6, P8 is stored for ID 7, and P3 is stored for ID 8.

As shown by the dotted line of arrow 313a in the drawing, the first to third entries in next code ID table 310 correspond to the code A. In the same way, as shown by the dotted line of arrow 313b in the drawing, the fourth and fifth entries correspond to the code B; as shown by the dotted line of arrow 313c in the drawing, the sixth and seventh entries correspond to the code C; and as shown by the dotted line of arrow 313e in the drawing, the eighth entry corresponds to the code E.

The next code ID for each code ID entry is the code ID for the code located next in search target code string 10a after the code for that code ID entry. In the example shown in the drawing, for ID 1 the stored next code ID is ID 4, for ID 2 it is ID 5, for ID 3 it is ID 7, for ID 4 it is ID 8, for ID 5 it is ID 6, for ID 6 it is ID 3, for ID 7 it is ID 1, and for ID 8 it is ID 2. Also, ID 1, which is the code ID for the code A that is at the head of search target code string 10a, is stored as the next code ID for the code C (code ID 7) that is the tail end of the string.

Next code ID table 310 keeps, as index data, the fact that 2 codes, expressed in code IDs, have a contiguous position relationship in the search target code string. When next code ID table 310 is compared with compressed suffix array 50 in the example of previous art shown in FIG. 1B, whereas, in compressed suffix array 50, the next array element number for each character is sorted, in next code ID table 310, the code position is sorted for the code type of each differing code. Thus if a successive search is made for the same code, the cache effect can be expected to provide faster processing.

Figure 3B:
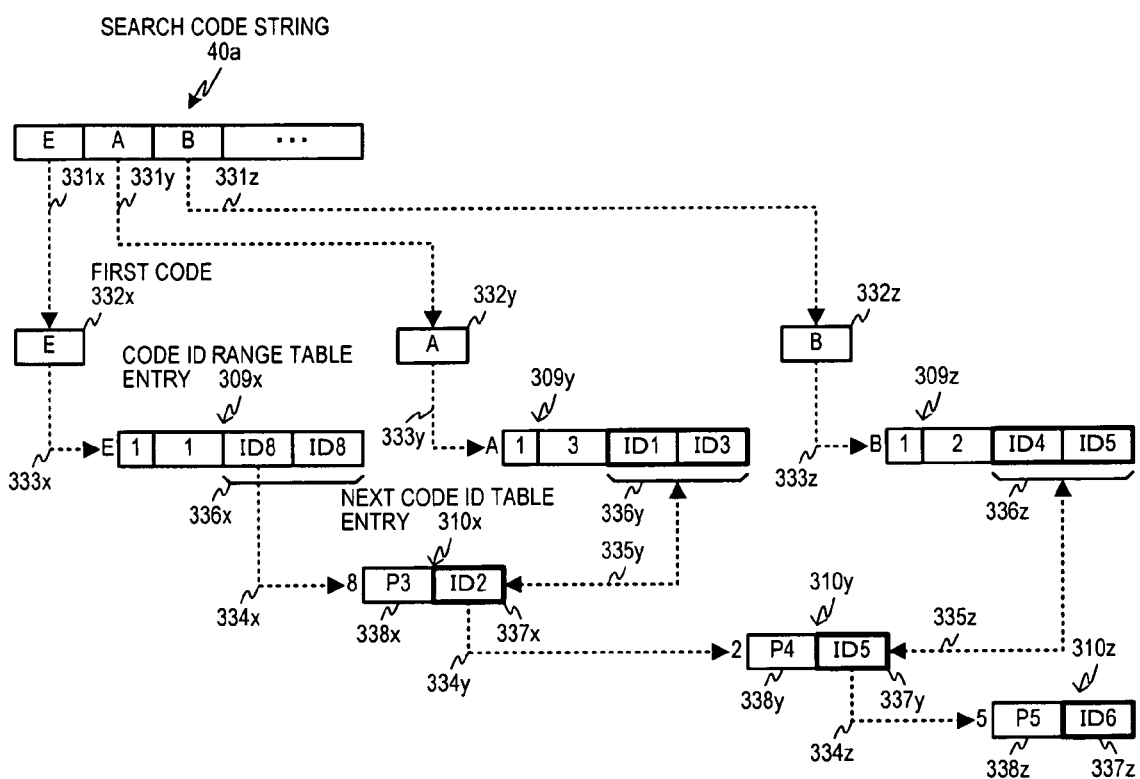
FIG. 3B is a drawing describing conceptually a code string search in an embodiment 1 of this invention.

FIG. 3B is a drawing describing conceptually a code string search in the embodiment 1 of this invention.

FIG. 3B describes conceptually a code string search with search target code string 10a, illustrated in FIG. 3A, as the search target code string and the search code string 40a shown in the drawing as the search code string. Code ID range table 309 and next code ID table 310 are assumed to have been created for search target code string 10a.

As shown in the drawing, from the head of search code string 40a, code E, code A, and code B are located. Then as shown in the drawing by dotted-line arrow 331x, code E, which is the first code, code 332x, is read out, and, as shown by dotted-line arrow 333x, entry 309x corresponding to code E in code ID range table 309 is read out. Then, as shown by dotted-line arrow 334x, entry 310x corresponding to the code ID included in ID range 336x for that entry, in the example in the drawing, this is the code ID 8, is further read out from next code ID table 310.

Next, as shown by dotted-line arrow 331y, code A, which is the second code, code 332y, is read out, and as shown by dotted-line arrow 333y, entry 309y corresponding to code A in code ID range table 309 is read out. Then as shown by the bi-directional dotted-line arrow 335y, a determination is made whether ID 2, which is next code ID 337x of entry 310x that corresponds to code ID 8 read-out from next code ID table 310 (dotted-line arrow 334x), is included in the code ID range 336y (ID 1 to ID 3) of entry 309y, which corresponds with the read-out code A (dotted-line arrow 333y). In the example shown in the drawing, the result of the determination is "yes". This means that the sequence code E, code A exists in search target code string 10a. Also, because the code position 338x of entry 310x, which corresponds to code ID 8 read out from next code ID table 310, is P3, it can be understood that the leading position of that code sequence is P3.

Furthermore, as shown by dotted-line arrow 334y, ID 5, which is next code ID 337y held in entry 310y corresponding to ID 2 in next code ID 337x, is read out. Also, as shown by dotted-line arrow 331z, code B, which is the third code, code 332z, is read out, and as shown by dotted-line arrow 333z, entry 309z corresponding to code B in code ID range table 309 is read out. Then as shown by the bi-directional dotted-line arrow 335z, a determination is made whether ID 5, which is next code ID 337y of entry 310y that corresponds to code ID 2 read-out from next code ID table 310 (dotted-line arrow 334y), is included in the code ID range 336z (ID 4 to ID 5) of entry 309z, which corresponds with the read-out code B (dotted-line arrow 333z). In the example shown in the drawing, the result is the determination is "yes". Thus it can be understood that search target code string 10a has a hit on the search code string EAB. Also, because code position 338y in entry 310y corresponding to code ID 2 read out from next code ID table 310 is P4, and code position 338z in entry 310z corresponding to code ID 5 read out from next code ID table 310 is P5, it can be understood that the hit position is code positions P3, P4, P5.

And even for the unillustrated fourth code in search code string 40a, the process is repeated of reading out the next code ID for the entry in next code ID table 310 entry corresponding to ID 6 which is the next code ID 337z of entry 310z and determining whether that next code is within the range of the code IDs in code ID range table 309 pointed to by the code type of the fourth code.

By doing the above, a code string search in accordance to the embodiment 1 of this invention is implemented.

Next the process for creating index data in the embodiment 1 of this invention is described.

Figure 4:
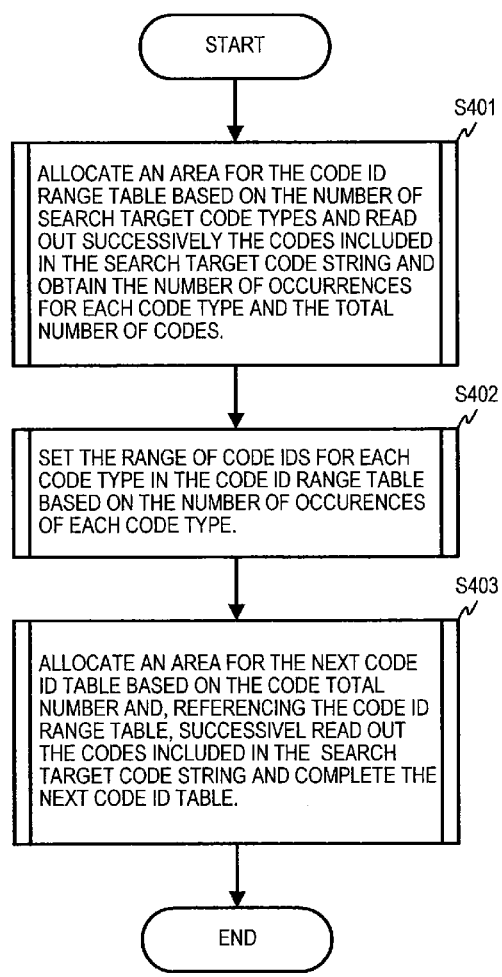
FIG. 4 is a drawing describing the general flow of processing that creates index data in embodiments 1-4 of this invention.

FIG. 4 is a drawing describing the general flow of processing that creates index data in the embodiment 1 of this invention. The general flow consists of 3 steps, S401, S402, and S403. As a general flow of processing that creates index data, the flow itself shown in FIG. 4 is similarly applied to embodiment 2 to 4 of this invention described afterward. However, detail steps of the steps S401, S402, and S403 may be different in embodiment 2 to 4.

First, in step S401, an area for the code ID range table is allocated based on the number of search target code types and at the same time the codes included in the search target code string are successively read out and the number of occurrences of each read-out code type and the total number of codes are obtained. Details on the processing of step S401 are described later referencing FIG. 5A.

Next at step S402, the range of the code IDs for each code type is set in the code ID range table based on the number of occurrences of each code type. Details on the processing of step S402 are described later referencing FIG. 5B.

Next at step S403, an area for the next code ID table is allocated based on the total number of codes, and the codes included in the search target code strings are successively read out referencing the code ID range table, then the next code ID table is completed, and processing is terminated. Details on the processing of step S403 are described later referencing FIG. 5C.

Figure 5A:
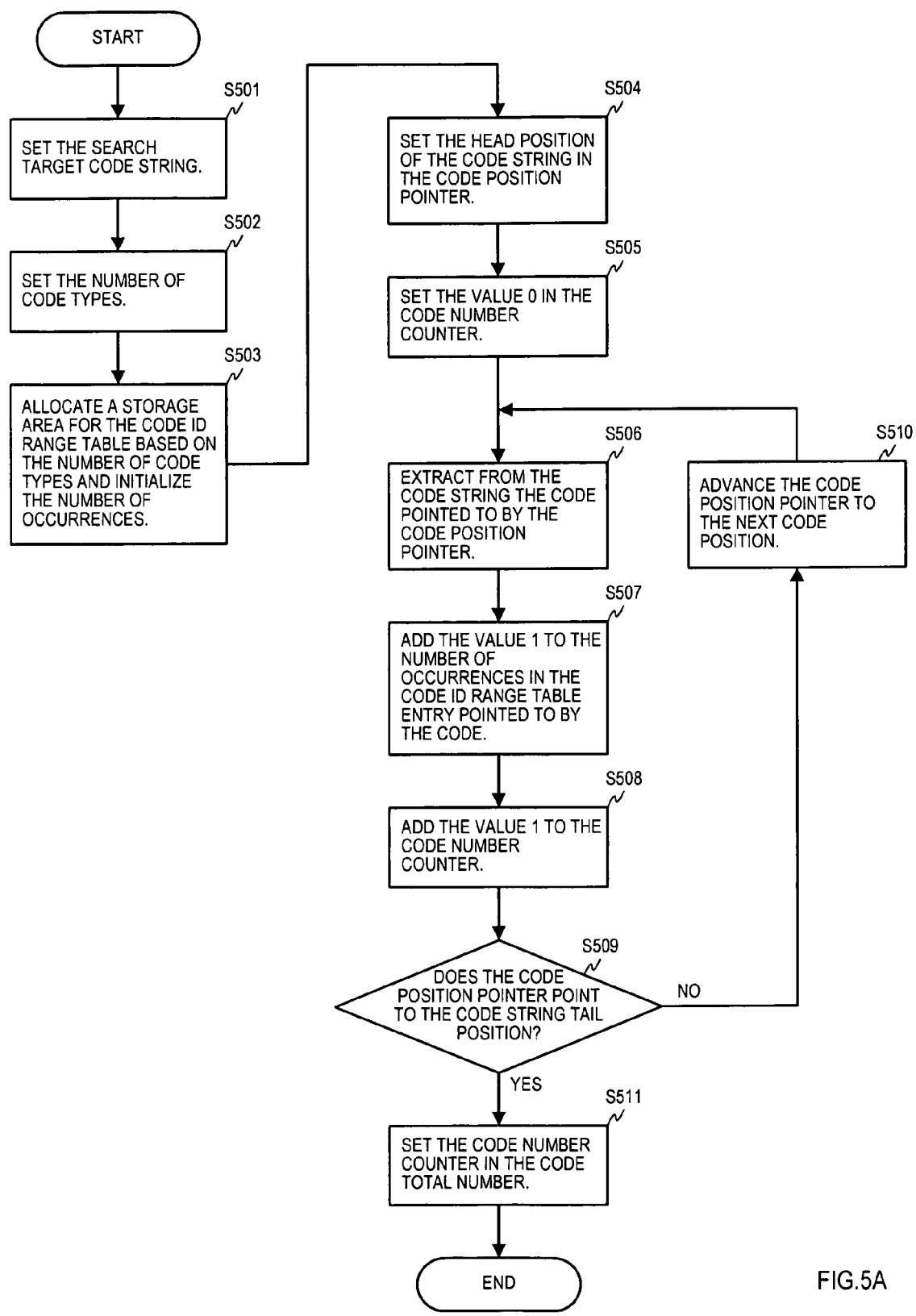
FIG. 5A is a drawing describing the processing flow for enumerating the number of occurrences of each code type of the codes included in the code strings that are objects of searches in an embodiment 1 of this invention.

FIG. 5A shows the detailed flow of the processing in step S401 shown in FIG. 4, and it is a drawing describing the processing flow for enumerating the number of occurrences of each code type of the codes included in code strings that are objects of searches.

As shown in the drawing, in step S501, a search target code string is set. Setting the search target code string means that one code string is read out by search target code string read-out means 101 illustrated in FIG. 2A from the set of code strings that are the object of searches stored in the data storage apparatus, and is set in an unillustrated search target code string setting area. Also, the above search target code string setting area is one of "temporary memory area used to enable various values obtained during processing to be used in subsequent processing" described above referencing FIG. 2C.

In the description hereinbelow, instead of an expression like "setting in an unillustrated search target code string setting area", expressions such as "set as the search target code string" or more simply "set the search target code string" may be used. The same also applies to temporary data other than a search target code string.

Next, in step S502, the number of code types is set.

The number of code types is determined by the code system, and it is assumed to be provided beforehand. Next, proceeding to step S503, a storage area for the code ID range table is allocated based on the number of code types set in step S502, and the number of occurrences is initialized with 0. Continuing, at step S504, the leading position of the code string set at step S501 is set in the code position pointer, and at step S505 the value 0 is set in the code number counter. The above processing of step S501 to step S505 is initialization processing.

Following the initialization processing, proceeding to step S506, the code pointed to by the code position pointer is extracted from the code string. Next, at step S507, the value 1 is added to the number of occurrences for the entry in the code ID range table corresponding to the code type of the extracted code, and at step S508, 1 is added to the code number counter, and processing proceeds to step S509.

Figure 1A:
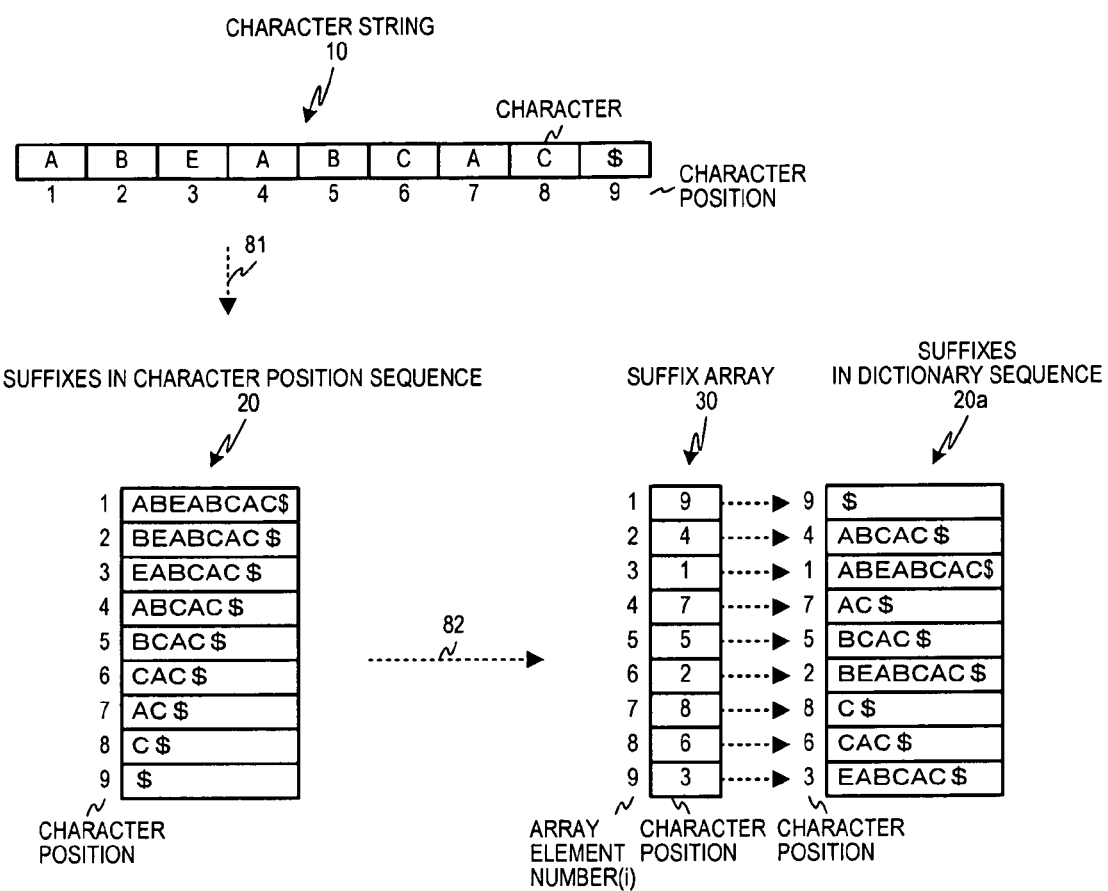
FIG. 1A is a drawing describing an example of previous search methods related to a suffix array

At step S509, a determination is made whether the code position pointer is at the tail position of the code string, and if it is not the tail position, at step S510, the code position pointer is advanced to the next position and processing returns to step S506. If the code position pointer is at the tail position of the code string, at step S511 the code number counter is set in the code total number, and processing is terminated. In the above determination whether the code position pointer is at the tail position of the code string in step S509, a separator character can be used as shown, for example, in FIG. 1A.

By means of the above processing, the number of occurrences in the code ID range table is set as well as the code total number.

Figure 5B:
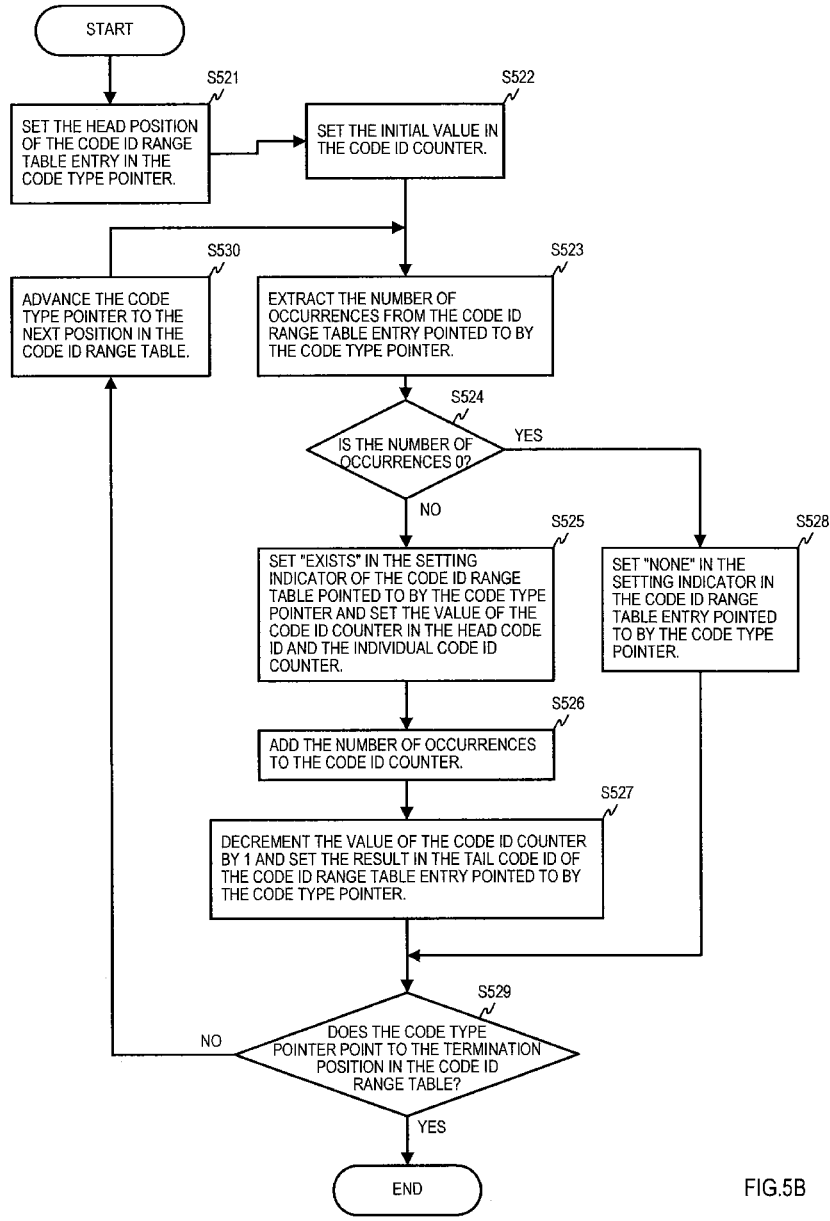
FIG. 5B is a drawing describing the processing flow for setting the code ID range for each code type based on the number of occurrences in an embodiment 1 of this invention.

FIG. 5B shows the detailed flow of the processing of step S402 in FIG. 4, and it is a drawing describing the processing flow for setting the code ID range for each code type based on the number of occurrences set by the processing shown in FIG. 5A.

First, in step S521, the head position in the code ID range table is set in the code type pointer, and next, in step S522, an initialization value is set in the code ID counter. Next, proceeding to step S523, the number of occurrences is extracted from the code ID range table entry pointed to by the code type pointer, and at step S524, a determination is made whether the extracted number of occurrences is 0.

If the number of occurrences is not 0, at step S525, "Exist" is set in the setting indicator in the code ID range table entry pointed to by the code type pointer as well as setting the value of the code ID counter in the head code ID and in the individual code ID counter. Next at step S526, the number of occurrences is added to the code ID counter, and at step S527, the value of code ID counter decremented by 1 is set in the tail code ID of the code ID range table entry pointed to by the code type pointer, and processing proceeds to step S529.

Otherwise, if the determination in step S524 is that the number of occurrences is 0, "None" is set in the setting indicator in the code ID range table entry pointed to by the code type pointer, and Processing proceeds to step S529.

At step S529, a determination is made whether the code type pointer is at the termination position of the code ID range table, and if it is not the termination position, at step S530, the code type pointer is advanced to the next code type position in the code ID range table and processing returns to step S523. If it is the termination position, because the setting of the code ID range table is completed, processing is terminated.

Figure 5C:
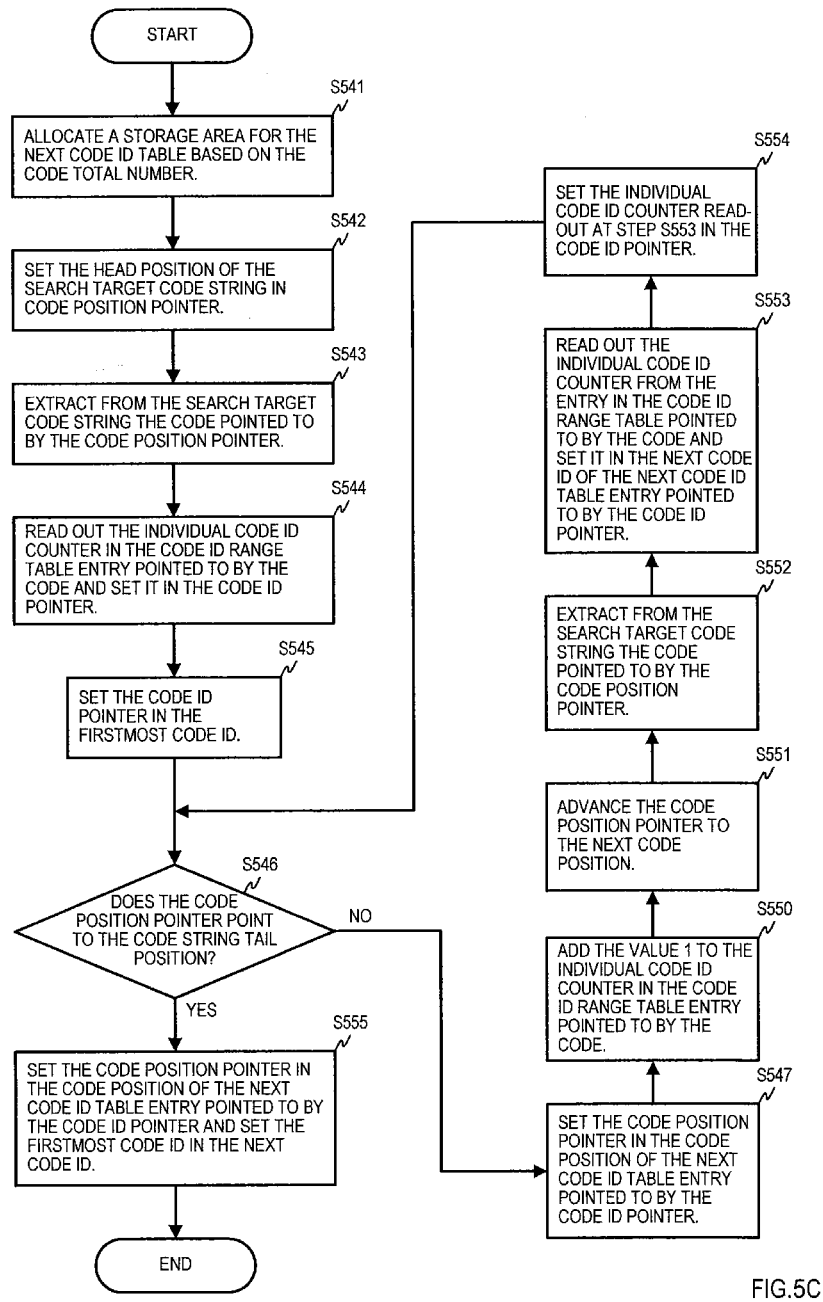
FIG. 5C is a drawing describing the processing flow for completing a next code ID table based on the codes included in the search target code string in an embodiment 1 of this invention.

FIG. 5C is a drawing showing the detailed flow of the processing of step S403 shown in FIG. 4 and describes the processing flow for completing an next code ID table based on the codes included in the search target code string.

First, at step S541, a storage area for the next code ID table is allocated based on the code total number obtained by the processing shown in FIG. 5B, and at step S542, the head position of the search target code string is set in the code position pointer. Next, at step S543, the code pointed to by the code position pointer is extracted from the search target code string, and at step S544, the individual code ID counter in the code ID range table entry pointed by the code is read out and set in the code ID pointer. Next, at step S545, the code ID pointer is set in the firstmost code ID, and processing proceeds to step S546.

At step S546, a determination is made whether the code position pointer is at the tail position of the search target code string, and if it is not at the tail position, the processing of steps S547 to S554 is executed, and the code position and next code ID of the next code ID table entry pointed to by that code ID are set and processing returns to step S546.

First, at step S547, the code position pointer is set in the code position of the next code ID table entry pointed to by the code ID pointer. Next, at step S550, 1 is added to the individual code ID counter in the next code ID table entry pointed to by the code extracted at step S543 or at step S552 described below, and at step S551, the code position pointer is advanced to the next code position.

Next, in step S552, the code pointed to by the code position pointer is extracted from the search target code string, and at step S553, the individual code ID counter in the next code ID table entry pointed to by the extracted code is read out and set in the next code ID of the next code ID table pointed to by the code ID counter.

Next, in step S554, the individual code ID counter read out at step S553 is set in the code ID counter, and processing returns to step S546. The processing of the above steps S546 to S554 is repeated until the code position pointer points to the tail position in the search target code string, and when the code position pointer points to the tail position in the search target code string, processing branches to step S555. At step S555, the code position pointer is set in the code position in the next code ID table entry pointed to by the code ID counter, and the firstmost code ID set at step S545 is set in the next code ID, and processing is terminated.

Next, the processing of a code string search in the embodiment 1 of this invention is described, referencing FIG. 6A to FIG. 6D.

Figure 6A:
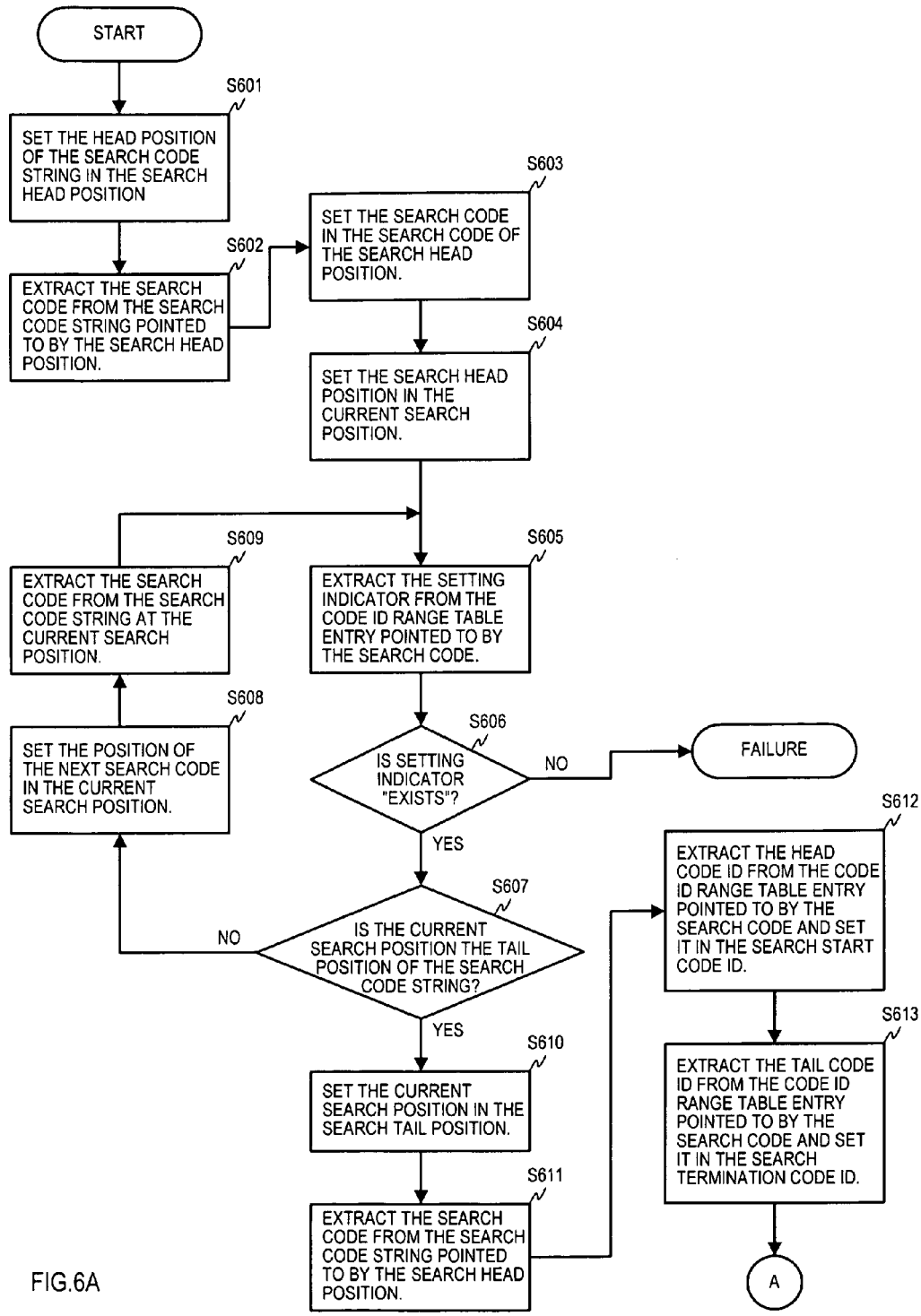
FIG. 6A is a drawing describing the processing flow of the shared prior stage for code string search processing in an embodiment 1 of this invention.
Figure 6B:
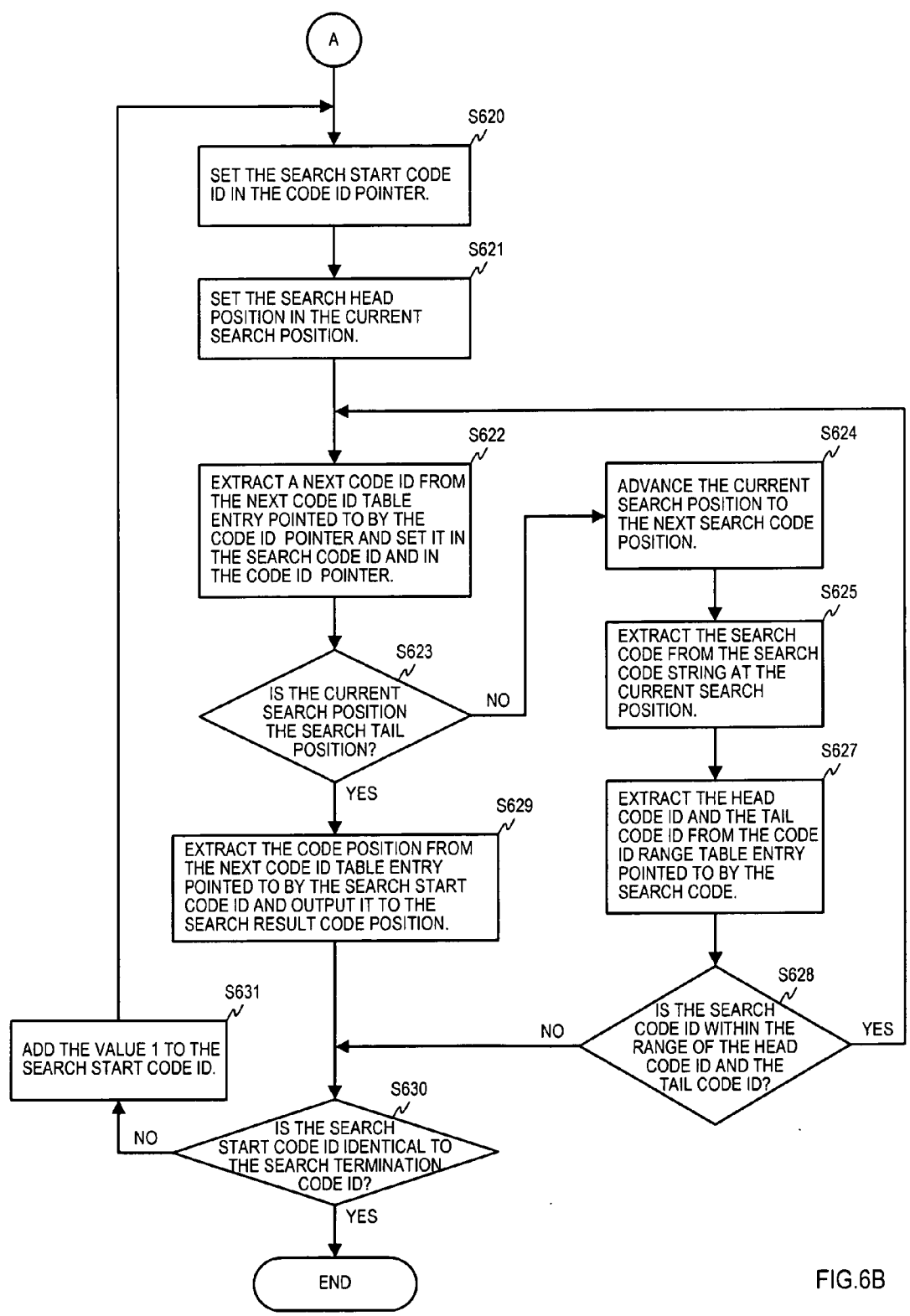
FIG. 6B is a drawing describing the processing flow of the latter stage of full match searches in an embodiment 1 of this invention.
Figure 6C:
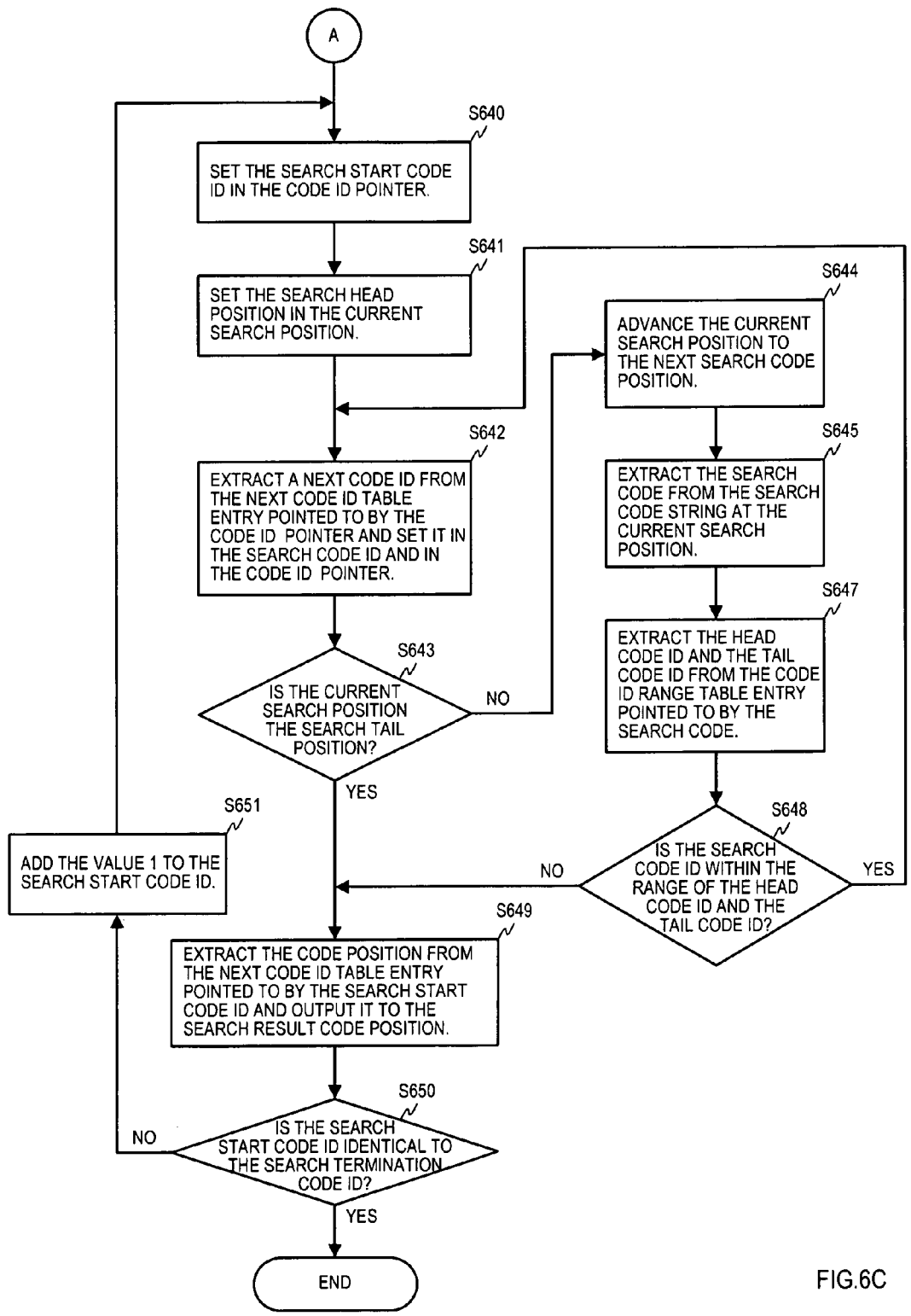
FIG. 6C is a drawing describing the processing flow of the latter stage of prefix match searches in an embodiment 1 of this invention.
Figure 6D:
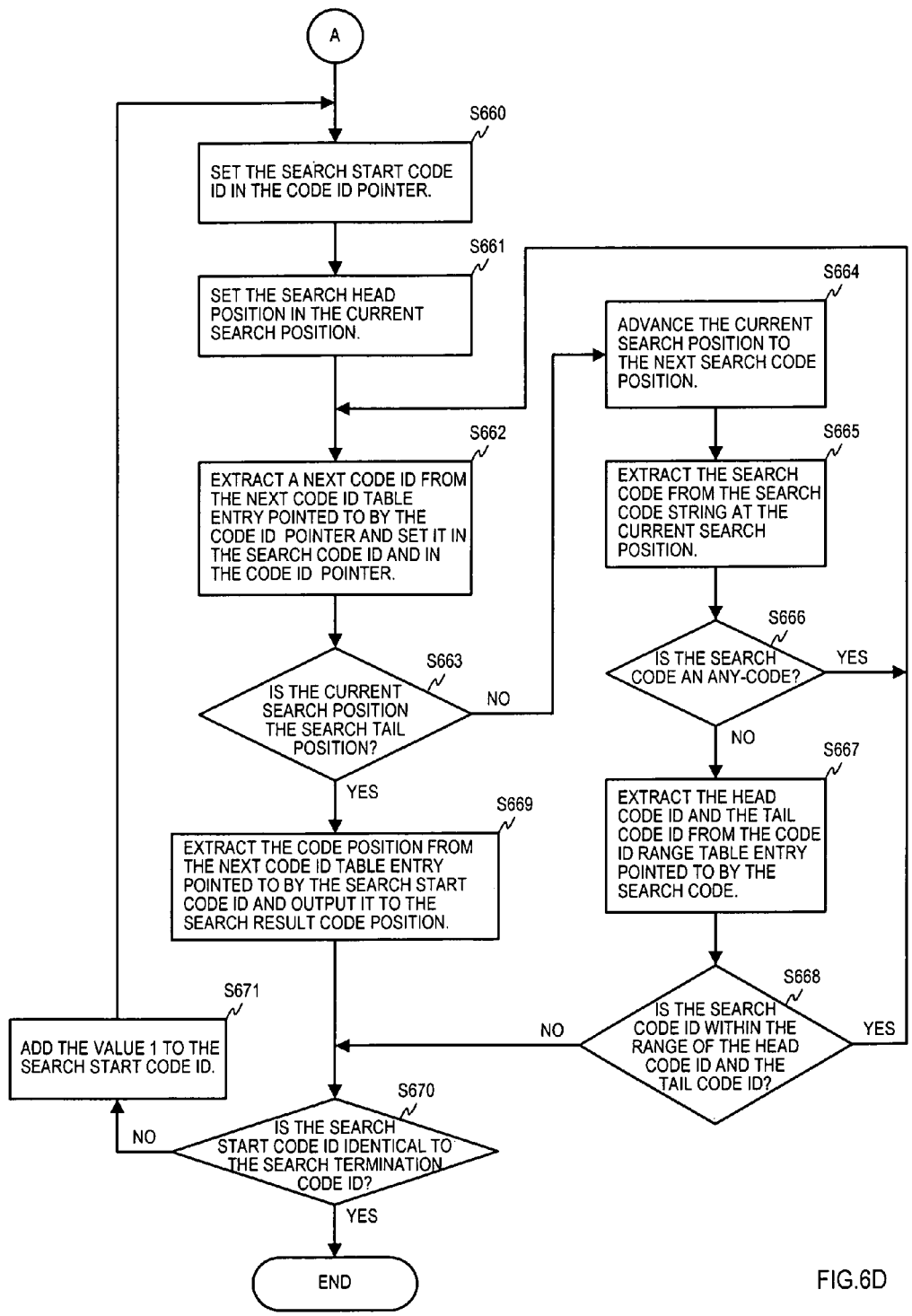
FIG. 6D is a drawing describing the processing flow of the latter stage of a search that includes an any-code in an embodiment 1 of this invention.

What is shown in FIG. 6A is a drawing describing the processing flow of the shared prior stage for the full match search processing, prefix match search processing, and search processing including an any-code shown in FIG. 6B to FIG. 6D respectively.

First, in step S601, the leading position of the search code string is set in the search start position. The search code string is read out by the search code string read-out means 111 shown in FIG. 2B and the leading position of the read-out search code string is taken to be provided.

Next, at step S602, a search code from the position in the search code string pointed to by the search start position is extracted, and at step S603, the search code extracted at step S602 is set in the search code of the search start position, and in addition, at step S604, the search start position is set in the current search position, and processing proceeds to step S605.

At step S605, the setting indicator is extracted from the code ID range table entry pointed to by the search code extracted at step S602 or at step S609 described below, and, next, at step S606, a determination is made whether the extracted setting indicator is "Exists". If the setting indicator is not "Exists", because this means that a search code in the search code string does not exist in the search target code string, search processing fails and processing is terminated.

If the result of the determination in step S606 is that the setting indicator shows "Exists", processing proceeds to step S607, wherein a determination is made whether the current search position set in step S604 or in step S608 described below points to the tail position in the search code string. If the current search position does not point to the tail position in the search code string, at step S608, the next search code position is set in the search code position, and in addition, at step S609, a search code is extracted from the position in the search code string pointed to by the current search position, and processing returns to step S605.

The processing loop of the above steps S605 to S609 is repeated until a determination is made at step S607 that the current search position points to the tail position in the search code string and when the determination is made at step S607 that the current search position points to the tail position in the search code string, processing proceeds to step S610. The above processing loop is processing to prospectively confirm whether search codes in the search code string exist in the search target code string.

At step S610, the current search position is set in the search tail position. Next at step S611, the search code is extracted from the search code string position pointed to by search start position set at step S601, and at step S612, the head code ID is extracted from the code ID range table entry pointed to by the extracted search code and is set in the search start code ID, and at step S613, the tail code ID is extracted from the code ID range table entry pointed to by the extracted search code and is set as the search termination code ID. By means of the above processing, the shared prior stage processing for the full match search, for a prefix match search, and for search processing including an any-code shown in FIG. 6B to FIG. 6D respectively is completed, and processing proceeds to the latter stage of the full match search, of a prefix match search, and of search processing including an any-code shown in FIG. 6B to FIG. 6D respectively.

By means of the above prior stage processing, it is guaranteed that search codes in the search code string exist in the search target code string. Also, the search start position that is the leading position in the search code string, the search tail position that is the tail position in the search code string, and the search start code ID and the search termination code ID that are the head code ID and tail code ID in the code ID range table entry pointed to by the code that is at the leading position in the search code string have all been set for the processing of the latter stage. In the example shown in FIG. 3A and FIG. 3B, ID 8 is set in both the search start code ID and the search termination code ID.

FIG. 6B is a drawing describing the processing flow for the latter stage of a full match search in the embodiment 1 of this invention.

As shown in the drawing, at step S620, the search start code ID set in the prior stage of processing is set in the code ID pointer and, at step S621, the search start position set in the prior stage of processing is set in the current search position, and processing proceeds to step S622. In the example shown in FIG. 3A and FIG. 3B, ID 8 is set as the code ID pointer.

At step S622, a next code ID is extracted from the next code ID table entry pointed to by the code ID pointer and is set in the search code ID and in the code ID pointer. The first processing of the example shown in FIG. 3A and FIG. 3B extracts ID 2 as the next code ID and sets it in the search code ID and the code ID pointer. In this way, the next code ID in the next code ID table entry pointed to by the code ID pointer becomes the next code ID pointer.

Next, at step S623, a determination is made whether the current search position is at the search tail position, and if it is not at the search tail position, processing branches to step S624, and the current search position is advanced to the position of the next search code in the search code string, and at step S625, the search code is extracted from the position in search code string pointed to by the current search position, and at step S627, the head code ID and the tail code ID are extracted from the code ID range table entry pointed to by the extracted search code.

Then in step S628, a determination is made whether the search code ID set in step S622 is within the range of the head code ID and tail code ID extracted in step S627, and if it is within that range, processing returns to step S622, and if it is not within that range processing proceeds to step S630. Because, in the first processing of the example shown in FIG. 3A and FIG. 3B, "A" is extracted as the next search code and because ID 2, which was noted above as the next code ID, is included in that ID range, processing returns to step S623 and proceeds to the verify processing for the next code ID range.

The above processing loop of steps S622 to S628 is the processing to repeat the verify processing from the head code to the tail code of the search code string, taking a code position of the search target code string in which a code whose code type is same as the code type of the head code of the search code string is located as the search start position.

Also, when a determination is made in step S623 that the current search position is the search tail position, in step S629, a code position is extracted from the next code ID table entry pointed to by the search start code ID, and the search result code position is output, and processing proceeds to step S630. In the example shown in FIG. 3A and FIG. 3B, the code position P3 of next code ID table 310 pointed to by ID 8 is output.

At step S630, a determination is made whether the search start code ID coincides with the search termination code ID. If they do not coincide, at step S631 the value 1 is added to the search start code ID and a return is made to step S620, and if they coincide, processing is terminated. The processing of the return to step S620 from the determination above in step S630 via the update of the search start code ID in step S631 changes the search start code ID in order to perform the processing loop of the above steps S622 to S628 from the head code ID to the tail code ID in the code ID range table entry pointed to by the head code of the search code string. Saying it in a different way, the processing changes a code position of the search target code string in which a code whose code type is same as the code type of the head code of the search code string is located in order to repeat the verify processing from the head code of the search code string to its tail code.

Because a determination at step S630 that the search start code ID coincides with the search termination code ID happens when the verify processing has covered all code positions in the search target code string whose code is the same type as the head code of the search code string, the overall processing is terminated. The result of the processing is output in step S629.

FIG. 6C is a drawing describing the processing flow of the latter stage of prefix match searches in the embodiment 1 of this invention. Comparing this processing with the processing flow of the latter stage of the full match search shown in FIG. 6B, the processing itself executed in each step of step S640 to step S651 shown in FIG. 6C is the same as the processing executed in each step from step S620 to step S631 shown in FIG. 6B, where the value 20 is subtracted from each step number in FIG. 6C. However, instead of the determination that the search code ID is not within the range of the head code ID and tail code ID at step S628t and then the branch to step S630 of the full match search shown in FIG. 6B, when the determination that the search code ID is not within the range of the head code ID and tail code ID is done at step S648 of the prefix match search shown in FIG. 6C, a branch is made to step S649 wherein the code position of the next code ID table entry pointed to by the search start code ID is extracted and, after the extracted code position is set in the search result position, processing proceeds to step S650.

Because it is guaranteed by the prior stage processing shown in FIG. 6A that a search code in the search code string exists in the search target code string and thus a code string exists in the search target code string that matches at least until the head code of the search code string, this processing extracts a code position from the next code ID table entry pointed to by the search start code ID and outputs it as the search result of a prefix match search.

Because, as was noted above, all the processing other than the branch after the determination processing at the above step S648 is the same as that shown in FIG. 6B, that description is omitted.

Also, in step S642, in addition to the next code ID, the code position is also successively extracted from the next code ID table entry pointed to by the code ID pointer and put aside and when in step S648 a determination is made that the search code ID is not within the range of the head code ID and tail code ID, in step S649, the code position last extracted at step S642 and the code position extracted from next code ID table entry pointed to by the search start code ID can be set as the search result code position. This last extracted code position is the code position included in the same next code ID table entry as the next code ID which is the search code ID when the determination in the above step S648 is negative, and, saying it differently, is the code position held in the next code ID table entry pointed to by the search code ID for the last positive determination in step S648.

Thus, the search codes in the search code string match the codes in the search target code string up to this code position. By outputting the above last extracted code position and the code position extracted from the next code ID table entry pointed to by the search start code ID as the search result code positions, the code position range of codes in the search target code string that coincide with the longest prefix of the search code string becomes knowable.

FIG. 6D is a drawing describing the processing flow of the latter stage of a search that includes an any-code in the embodiment 1 of this invention. Here, "any-code" is a code that makes any code in the search target code string acceptable as a match. If a search code string includes an any-code and a code string matching all the codes except the any-code exists in the search target code string, then that search target code string is a hit for the search code string that includes the any-code.

When the flow shown in FIG. 6D is compared with the latter stage of the processing flow for performing the full match search shown in FIG. 6B, the processing executed in each step of steps S660 to S671 shown in FIG. 6D (with 40 subtracted from those step numbers) is exactly the same as the processing executed in each step of steps S620 to S631 shown in FIG. 6B except for the insertion of the processing of step S666 between steps S665 and S667.

At step S666, a determination is made whether the search code extracted at step S665 is an any-code. When the determination at step S666 is that of an any-code, processing returns to step 662 and does not pass through the code ID range determination processing of step S667 and step S668. If the determination at step S666 is not that of an any-code, processing proceeds to step S667.

Because, as was noted above, all of the processing is the same as that shown in FIG. 6B except for the determination processing of the above step S666, that description is omitted.

Figure 7A:
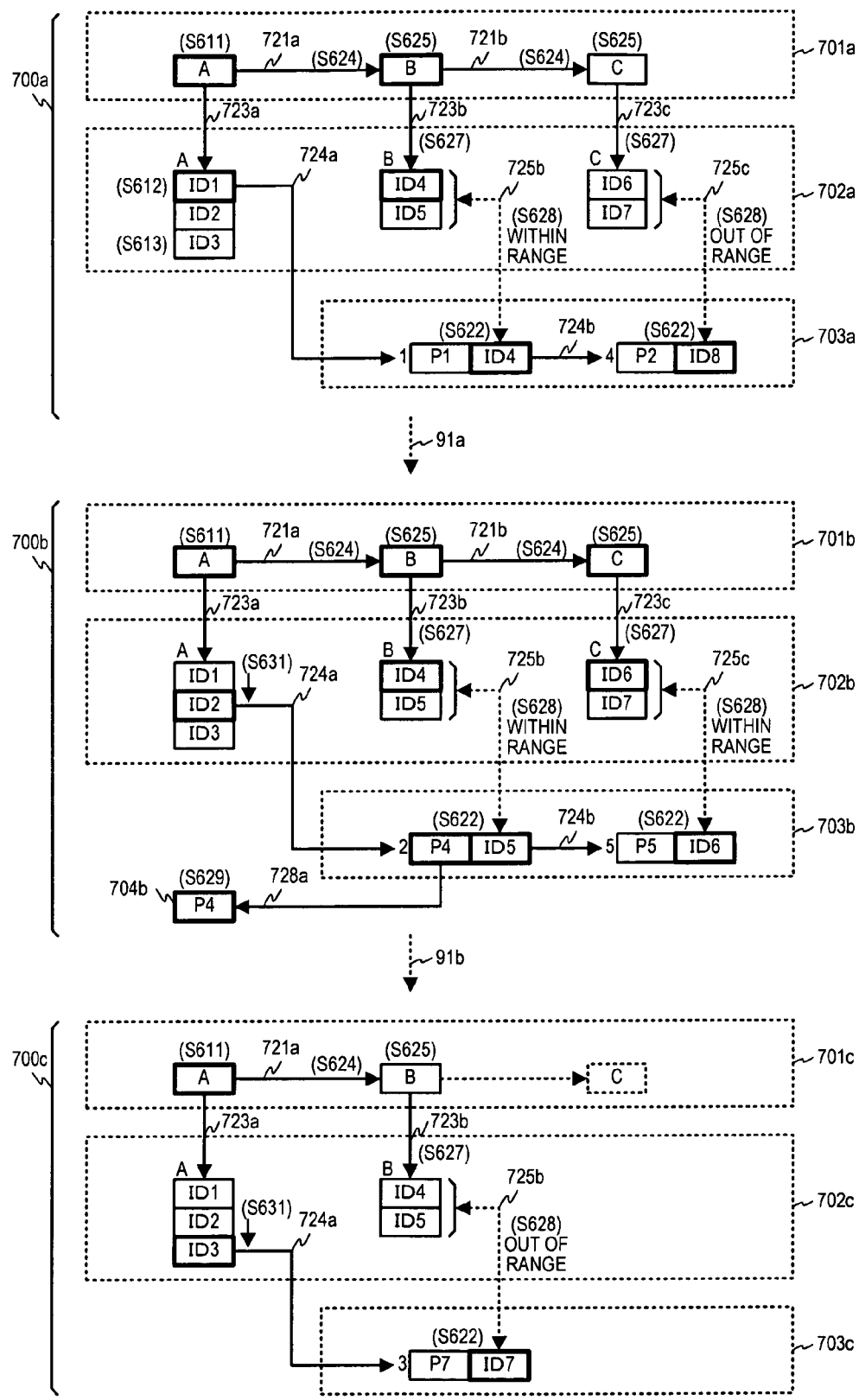
FIG. 7A is a drawing describing the flow of a full match search in an embodiment 1 of this invention

FIG. 7A is a describing the flow of a full match search in the embodiment 1 of this invention. In the example shown in FIG. 7A, the search target code string is taken as the one shown in FIG. 3A, and the search code string is taken as "ABC". Blocks 700a, dotted-line arrow 91a, blocks 700b, dotted-line arrow 91b and blocks 700c of FIG. 7A illustrate the flow referencing the search code string, the code ID range table and the next code ID table as the search processing progresses.

Blocks 700a of FIG. 7A shows the flow of a search with ID 1, which is the head code ID for code A located at the head of the search code string, taken as the search start code ID of the search code string ABC. Also, the check for the setting indicator "Exists" in steps S601 to S607 is taken to be finished. The block to which the reference numeral 701a is affixed delineates the flow of the processing of each of the search codes in the search code string ABC from its head. The block to which the reference numeral 702a is affixed delineates the flow of the changes in the code ID ranges that are objects of processing in the code ID range table 309. The block to which the reference numeral 703a is affixed delineates the flow of obtaining in sequence next codes from the next code ID table 310. The description below references those three blocks with those reference numerals. The same applies to the blocks 700b, 700c of FIG. 7A and to FIG. 7B.

As shown in 701a, first the code A located at the head of the search code is extracted at step S611 of FIG. 6A (in the description below the figure number is omitted) and, as shown by the arrow 723a to 702a, ID 1, which is the head code ID in the code ID range table entry pointed to by code A, is extracted at step S612 and is set in the search start code ID. And ID 3, which is the tail code, is extracted at step S613 and set in the search termination code ID.

Next, as shown by the arrow 724a from ID1 in 702a to 703a, ID 4, which is the next code ID in the next code ID table 310 entry pointed to by ID 1 is extracted at step S622.

Also, as shown by the arrow 721a to the codes from A to B in 701a, at step S624 the code at the next code position becomes the object of processing, and at step S625 code B is extracted. As shown by the arrow 723b to 702a, ID 4, which is the head code ID for the code ID range table 309 entry pointed to by code B, and ID 5, which is the tail code ID, are extracted as the code ID range.

Then, as shown by the bi-directional dotted-line arrow 725b between ID 4, which is the next code ID in the next code ID table 310 entry pointed to by ID 1 in 703a and the code ID range in the code ID range table 309 entry pointed to by code B in 702a, in step S628, a determination is made that ID 4, which is the next code ID in the next code ID table 310 entry pointed to by ID 1, is within the code ID range in the code ID range table 309 entry pointed to by code B.

Hence, next, as shown by the arrow 724b in 703a, ID 8, which is the next code ID in the next code ID table 310 entry pointed to by ID 4, is extracted at step S622.

Furthermore, as shown by the arrow 721b from code B to code C in 701a, at step S624, the code at the next code position becomes the object of processing and at step S625 the code C is extracted. As shown by the arrow 723c to 702a, ID 6, which is the head code ID in the code ID range table 309 entry pointed to by code C, and ID 7, which is its tail code, are extracted as the code ID range.

Then, as shown by the bi-directional dotted-line arrow 725c between ID 8, which is the next code ID in the next code ID table 310 entry pointed to by ID4 in 703a and the range in the code ID range table 309 entry pointed to by code C in 702a, in step S628, a determination is made that ID 8, which is the next code ID in the next code ID table 310 entry pointed to by ID 4, is outside the code ID range in the code ID range table 309 entry pointed to by code C.

In other words, this shows that the code string from the code A for which the code ID is ID 1 in search target code string 10a does not match the search code string ABC. This code string from the code A for which the code ID is ID 1 in search target code string 10a is ABE, as shown in FIG. 3A, and thus does not match ABC.

Blocks 700b in FIG. 7A shows the flow of a search wherein ID 2, which is the next code ID after the ID 1 of code A, is made the search start code ID for the search code string ABC at step S631. As is shown by dotted-line arrow 91a, following the flow shown in block 700a, ID 5, which is the next code ID in the next code ID table 310 entry pointed to by ID 2, is extracted at step S622, as shown by the arrow 724a from ID 2 in 702b to 703b.

Furthermore, as shown by the arrow 721a from the code A to code B in 701b, at step S624, the code at the next code position becomes the object of processing and at step S625 the code B is extracted. As shown by the arrow 723b to 702b, ID 4, which is the head code ID in the code ID range table 309 entry pointed to by code B, and ID 5, which is its tail code, are extracted as the code ID range.

Then, as shown by the bi-directional dotted-line arrow 725b between ID 5, which is the next code ID in the next code ID table 310 entry pointed to by ID 2 in 703b and the code ID range in the code ID range table 309 entry pointed to by code B in 702b, in step S628, a determination is made that ID 5, which is the next code ID in the next code ID table 310 entry pointed to by ID 2, is within the code ID range in the code ID range table 309 entry pointed to by code B.

Hence, next, as shown by the arrow 724b in 703b, ID 6, which is the next code ID in the next code ID table 310 entry pointed to by ID 5, is extracted at step S622.

Furthermore, as shown by the arrow 721b from the code B to code C in 701b, at step S624, the code at the next code position becomes the object of processing and at step S625 the code C is extracted. As shown by the arrow 723c to 702b, ID 6, which is the head code ID in the code ID range table 309 entry pointed to by code C, and ID 7, which is its tail code, are extracted as the code ID range.

Then, as shown by the bi-directional dotted-line arrow 725c between ID 6, which is the next code ID in the next code ID table 310 entry pointed to by ID 5 in 703*b* and the code ID range in the code ID range table 309 entry pointed to by code C in 702*b*, in step S628, a determination is made that ID 6, which is the next code ID in the next code ID table 310 entry pointed to by ID 5, is within the code ID range in the code ID range table 309 entry pointed to by code C.

In other words, this shows that the code string from the code A for which the code ID is ID 2 in search target code string 10*a* matches the search code string ABC. This agrees with the fact that the code string from the code A for which the code ID is ID 2 in search target code string 10*a* is ABC, as shown in FIG. 3A.

Then at step S629, as shown by arrow 728*a*, the code position P4 for the next code ID table 310 entry pointed to by ID 2, which is the search start code ID, is set in the search result code position shown by reference numeral 704*b*.

Blocks 700*c* in FIG. 7A shows the flow of a search wherein ID 3, which is the next code ID after the ID 2 of code A, is made the search start code ID for the search code string ABC at step S631. As is shown by dotted-line arrow 91*b*, following the flow shown in blocks 700*b* of FIG. 7A, ID 7, which is the next code ID in the next code ID table 310 entry pointed to by ID 3, is extracted at step S622, as shown by the arrow 724*a* from ID 3 in 702*c* to 703*c*.

Furthermore, as shown by the arrow 721*a* from the code A to code B in 701*c*, at step S624, the code at the next code position becomes the object of processing and at step S625 the code B is extracted. As shown by the arrow 723*b* to 702*c*, ID 4, which is the head code ID in the code ID range table 309 entry pointed to by code B, and ID 5, which is its tail code, are extracted as the code ID range.

Then, as shown by the bi-directional dotted-line arrow 725*b* between ID 7, which is the next code ID in the next code ID table 310 entry pointed to by ID 3 in 703*c* and the code ID range in the code ID range table 309 entry pointed to by code C in 702*c*, in step S628, a determination is made that ID 7, which is the next code ID in the next code ID table 310 entry pointed to by ID 3, is outside the code ID range in the code ID range table 309 entry pointed to by code C.

In other words, this shows that the code string from the code A for which the code ID is ID 3 in search target code string 10*a* does not match the search code string ABC. This agrees with the fact that the code string from the code A for which the code ID is ID 3 in search target code string 10*a* is AC, as shown in FIG. 3A, and thus does not match ABC.

As shown by the above processing flow, all code IDs with the same code type as that of the code located at the head of the search code string are made the search start code ID and verify processing is performed, and if there is a match for all of the search codes in the search code string, the code position in the next code ID table entry pointed to by that search start code ID is output in the search result code position.

Although the flow of a prefix match search is not illustrated, when the flow of a prefix match search using FIG. 7A is described, even though the determinations shown by the bi-directional dotted-line arrow 725*c* in blocks 700*a* of FIG. 7A and the bi-directional dotted-line arrow 725*b* in blocks 700*c* of FIG. 7A are that they are outside the code ID range, because a code string exists in the search target code string that matches at least the head code in the search code string, a code position is extracted from the next code ID table entry pointed to by the search start code ID and is output as the search result of the prefix match search. In the example of blocks 700*a* and blocks 700*c* in FIG. 7A, code position P1 and P7 are output in the search result code position.

Figure 7B:
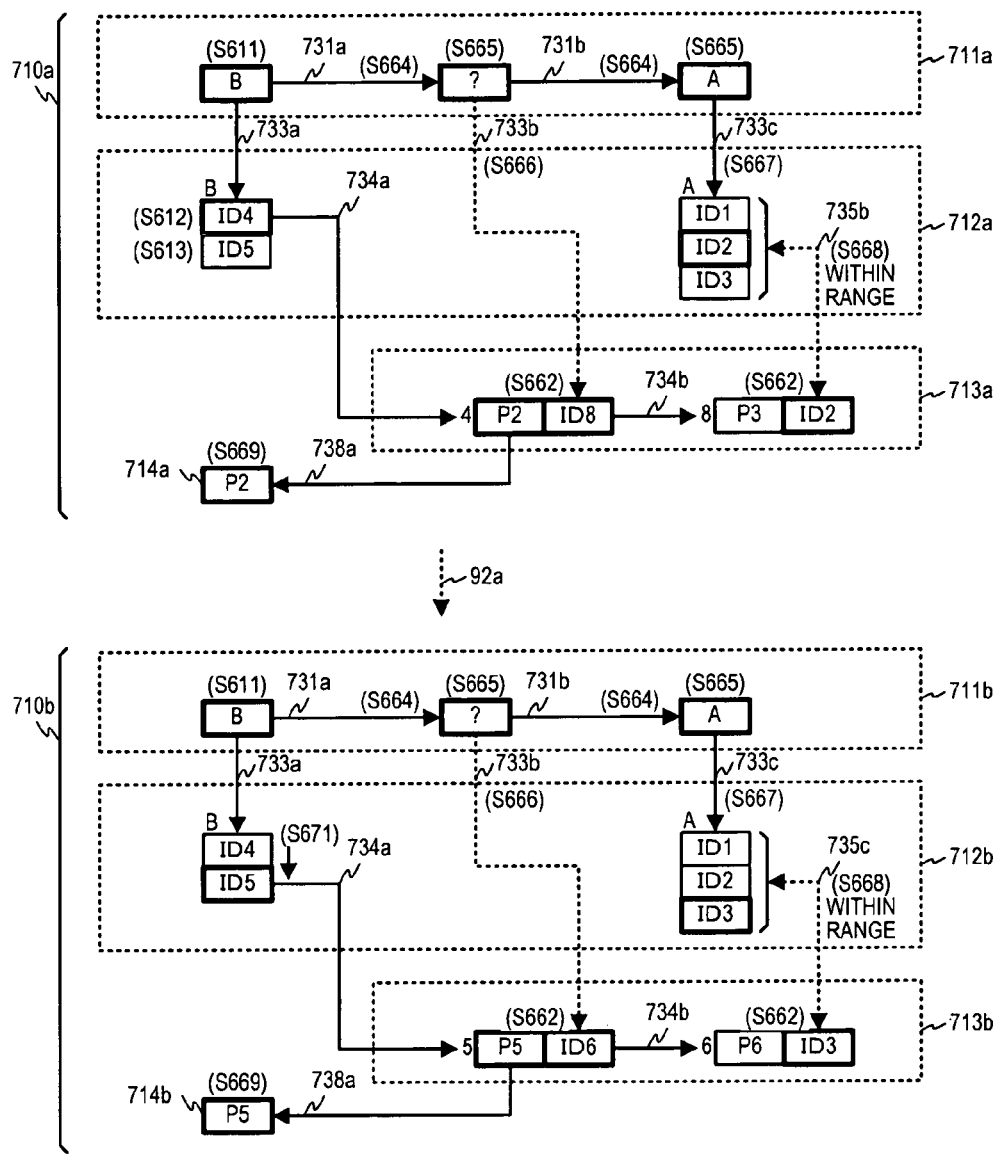
FIG. 7B is a drawing describing the flow of a search that includes an any-code in an embodiment 1 of this invention

FIG. 7B is a drawing describing the flow of a search that includes an any-code in the embodiment 1 of this invention.

What is shown in FIG. 7B is the case wherein the search target code string is made that shown in FIG. 3A, and the search code string is made to be "B?A". The special character "?" is the symbol for an any-code. The flow referencing the search code string, the code ID range table and the next code ID table as the search processing progresses is described by blocks 710*a*, dotted-line arrow 92*a*, and blocks 710*b* shown in FIG. 7B.

Blocks 710*a* shows the flow of a search with ID 4, which is the head code ID for code B located at the head of the search code string, taken as the search start code ID of the search code string B?A. Also, as shown in FIG. 7A, the check for the setting indicator "Exists" of steps S601 to S607 shown in FIG. 6A is taken as being finished.

The block to which the reference numeral 711*a* is affixed delineates the flow of the processing of each search code in the search code string B?A from its head. The block to which the reference numeral 712*a* is affixed delineates the flow of the changes in the code ID ranges that are objects of processing in the code ID range table 309. The block to which the reference numeral 713*a* is affixed delineates the flow of obtaining in sequence next codes from the next code ID table 310.

First, the code B located at the head of the search code string, as shown in 711*a*, is extracted at step S611, and as is shown by the arrow 733*a* to 712*a*, ID 4, which is the head code ID in the code ID range table entry pointed to by code B, is extracted at step S612 and is set in the search start code ID. And ID 5, which is the tail code, is extracted at step S613 and set in the search termination code ID.

Next, as shown by arrow 734*a* from the ID 4 of 712*a* to 713*a*, ID 8, which is the next code ID in the next code ID table 310 entry pointed to by ID 4, is extracted at step S662.

Also, as shown by the arrow 731*a* from code B in 711*a* to code "?" at step S664, the code at the next code position becomes the object of processing and at step S665 the code "?" is extracted. Next, at step S666, a determination is made whether the search code extracted at step S665 is an any-code.

Because it is an any-code in the present example, code ID range verify processing is omitted for ID 8, as shown by the dotted-line arrow 733*b* from the any-code "?" in 711*a* to ID 8, which is the next code ID in the next code ID table 310 entry pointed to by ID 4 in 713*a*.

Then, ID 2, which is the next code ID in the next code ID table 310 entry pointed to by ID 8, is extracted at step S662, as shown by the arrow 734*b* in 713*a*.

Furthermore, as shown by the arrow 731*b* from any-code "?" to code A in 711*a*, at step S664, the code at the next code position becomes the object of processing and at step S665 the code A is extracted. As shown by the arrow 733*c* to 712*a*, ID 1, which is the head code ID in the code ID range table 309 entry pointed to by code A, and ID 3, which is its tail code, are extracted as the code ID range.

Then, as shown by the bi-directional dotted-line arrow 735*b* between ID 2, which is the next code ID in the next code ID table 310 entry pointed to by ID 8 in 713*a*, and the code ID range in the code ID range table 309 entry pointed to by code A in 712*a*, in step S668, a determination is made that ID 2, which is the next code ID in the next code ID table 310 entry pointed to by ID 8, is within the code ID range in the code ID range table 309 entry pointed to by code A. Then at step S669, as shown by arrow 738*a*, code position P2 in the next code ID table 310 entry pointed to by ID 4, which is the search start code ID, is set in the search result code position shown by the reference numeral 714*a*.

Blocks 710*b* in FIG. 7B shows the flow of a search wherein, at step S671, the search start code ID of the search code string "B?A" is made to be ID 5, which is the next code ID after ID 4 for code B. As is shown by dotted-line arrow 92a, following the flow shown in blocks 710a, ID 6, which is the next code ID in the next code ID table 310 entry pointed to by ID 5, is extracted at step S622 as shown by the arrow 734a from ID 5 of 712b to 713b.

Furthermore, as shown by the arrow 731a from code B in 711b to any-code "?", at step S664, the code at the next code position becomes the object of processing and at step S665 the any-code "?" is extracted. Next, at step S666, a determination is made whether the search code extracted at step S665 is an any-code.

Because it is an any-code in the present example, code ID range verify processing is omitted for ID 6, as shown by the dotted-line arrow 733b from the any-code "?" in 711a to ID 6, which is the next code ID in the next code ID table 310 entry pointed to by ID 5 in 713b.

Then, ID 3, which is the next code ID in the next code ID table 310 entry pointed to by ID 6, is extracted at step S662, as shown by the arrow 734b in 713b.

Furthermore, as shown by the arrow 731b from any-code "?" to code A in 711b, at step S664, the code at the next code position becomes the object of processing and at step S665 the code A is extracted. As shown by the arrow 733c to 712b, ID 1, which is the head code ID in the code ID range table 309 entry pointed to by code A, and ID 3, which is its tail code, are extracted as the code ID range.

Then, as shown by the bi-directional dotted-line arrow 735c between ID 3, which is the next code ID in the next code ID table 310 entry pointed to by ID 6 in 713b, and the code ID range in the code ID range table 309 entry pointed to by code A in 712b, in step S668, a determination is made that ID 3, which is the next code ID in the next code ID table 310 entry pointed to by ID 6, is within the code ID range in the code ID range table 309 entry pointed to by code A. Then at step S669, as shown by arrow 738a, code position P5 in the next code ID table 310 entry pointed to by ID 5, which is the search start code ID, is set in the search result code position shown by the reference numeral 714b.

By means of the above processing, when search target code string 10a is searched for search code string "B?A", P2 and P5, which are code positions whose codes have the same code type as the head code of the search code string and which produce a hit in the search target code string for the search code string, are obtained as search results.

As shown in FIG. 3A, the code string with the 3 codes whose head code is code position P2 is BEA, and the code string with the 3 codes whose head code is code position P5 is BCA.

Hereinbelow, the embodiment 2 to the embodiment 4 of this invention are described while referencing FIG. 8A to FIG. 25C.

Figure 8A:
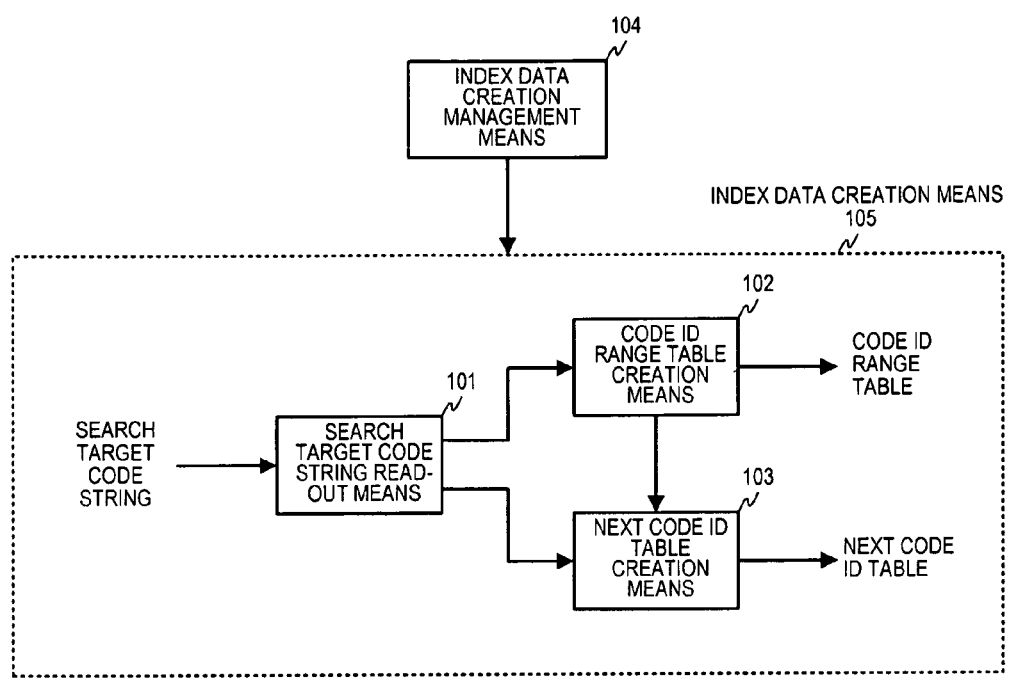
FIG. 8A is a drawing describing function blocks for creating the data structure for an index in an embodiment 2 of this invention.

FIG. 8A is a drawing describing function blocks for creating the data structure for an index in the embodiment 1 of this invention. These function blocks are the same as the function blocks for creating the data structure for an index in the embodiment 3 and in the embodiment 4.

Index data creation management means 104 manages the creation, by index data creation means 105, of index data for each block (code string block) that is partitioned out of the code strings that are the target of searches, and creates an index data management table. Index data creation means 105 includes search target code string read-out means 101, code ID range table creation means 102, and next code ID table creation means 103. A search target code string is read out by the search target code string read-out means 101 and is passed to the code ID range table creation means 102 and the next code ID table creation means 103. The code ID range table creation means 102 creates a code ID range table holding the range of code IDs for each code, and the next code ID table creation means 103 creates a next code ID table holding next code IDs, which are the code IDs positioned next after each code ID.

Figure 8B:
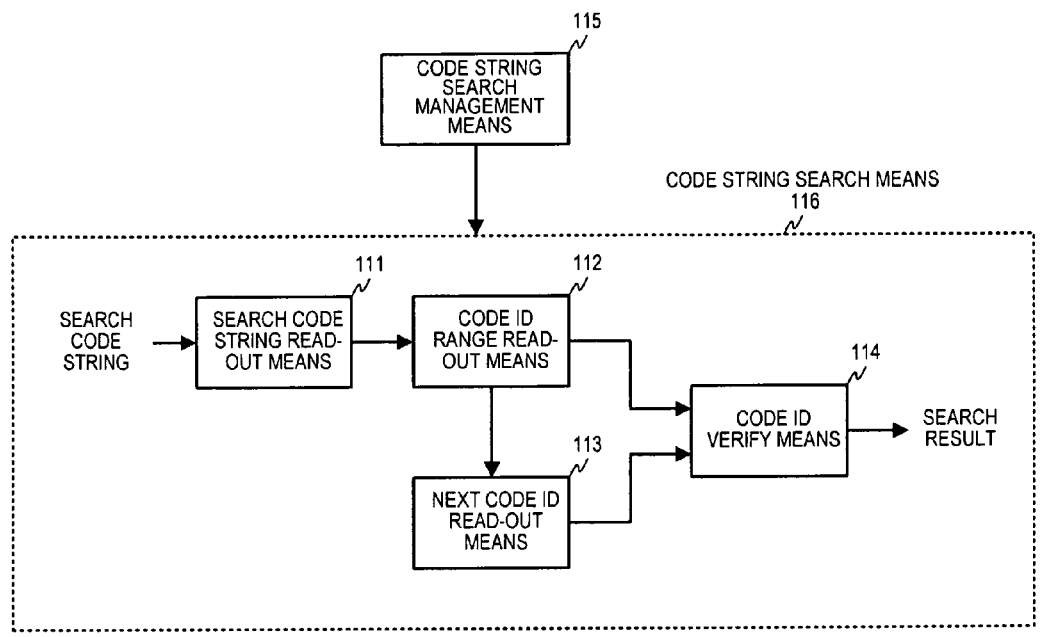
FIG. 8B is a drawing describing function blocks for performing a code string search in an embodiment 2 of this invention.

FIG. 8B is a drawing describing function blocks for performing a code string search in the embodiment 2 of this invention. These function blocks are the same as the function blocks for performing a code string search in the embodiment 4 and differ slightly from function blocks for performing a code string search in the embodiment 3 described hereinafter.

Code string search management means 115 manages the search, by code string search means 116, for each code string block in the search target code string. Code string search means 116 includes search code string read-out means 111, code ID range read-out means 112, next code ID read-out means 113, and code ID verify means 114.

A search code string is read out by search code string read-out means 111 and is passed to the code ID range read-out means 112. The code ID range read-out means 112 reads out the range of the code IDs of the codes that compose the search code string passed from search code string read-out means 111 using the code ID range table created by the code ID range table creation means 102, and passes them to the next code ID read-out means 113 and the code ID verify means 114.

The next code ID read-out means 113 reads out the next code ID stored in association with a code ID included in the code ID range of the leading code in the search code string passed by the code ID range read-out means 112 from the next code ID table created by the next code ID table creation means 103 and at the same time successively reads out from the next code ID table a next code ID stored in correspondence with that next code and passes it to the code ID verify means 114. The code ID verify means 114 verifies whether the next code ID passed from the next code ID read-out means 113 is included in the range of code IDs passed from the code ID range read-out means and outputs the search result.

Figure 8C:
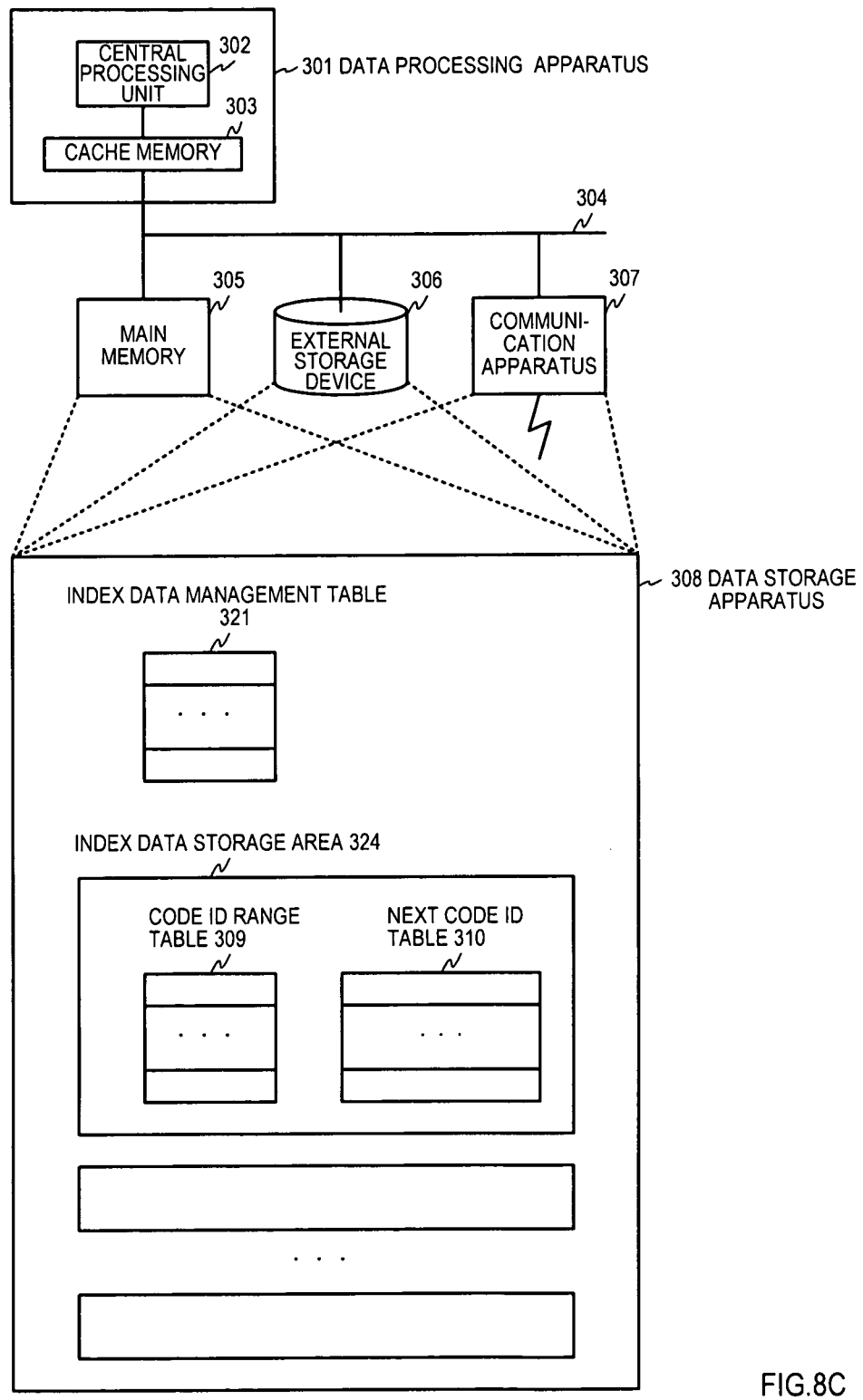
FIG. 8C is a drawing describing an exemplary hardware configuration in an embodiment 2 of this invention.

FIG. 8C is a drawing describing an exemplary hardware configuration in the embodiment 2 of this invention. This exemplary hardware configuration is same as the exemplary hardware configuration in the embodiments 3 to 4 of this invention and differs slightly from the exemplary hardware configuration in the embodiment 1 shown in FIG. 2C with tables which the data storage apparatus 308 has. Therefore some part of the description is omitted in order to avoid repetition.

Search processing and index creation processing are implemented with the searching apparatus of the present invention by a data processing apparatus 301 having at least a central processing unit 302 and a cache memory 303, and a data storage apparatus 308. The data storage apparatus 308, which has the storage area for index data management table 321 and the code ID range table 309 and the next code ID table 310 associated with each code string block, can be implemented in the main memory 305 or a storage device 306, or alternatively, by using a remotely disposed apparatus connected via a communication apparatus 307.

Each of the function blocks such as the search target code string read-out means 116 and so forth described referencing FIG. 8A and FIG. 8B can be realized in the hardware illustrated in FIG. 8C and in software that prepares the steps described hereinafter.

Next, an overview is described of a search technique in the embodiment 2 of this invention.

Figure 9A:
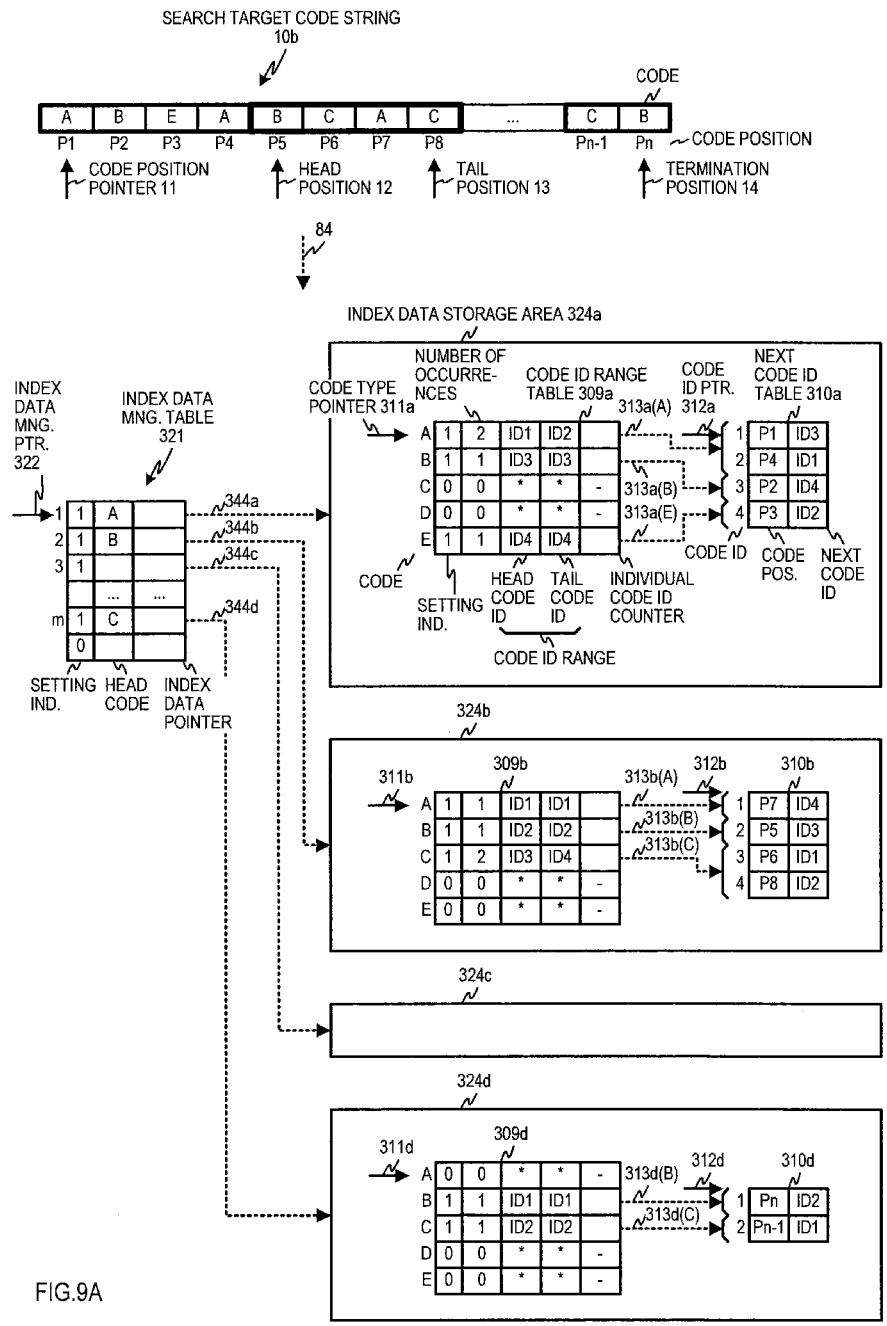
FIG. 9A is a drawing describing an index date structure in an embodiment 2 of this invention.

FIG. 9A is a drawing describing an index data structure in the embodiment 2 of this invention. This index data structure is same as the index data structure in the embodiment 3 of this invention. In FIG. 9A is shown an example of a code string that forms the target of index data creation and is a target of searches. The exemplified search target code string 10*b* consists of the alphabetic character codes A, B, E, A, B, C, A, . . . C, B. The P1 to P8 . . . Pn–1, Pn depicted below each of those alphabetic codes indicate the position of the code in search target code string 10*b*. The code position pointer 11 is a pointer that indicates the position of a code in search target code string 10*b* and in the example in the drawing it points to code position P1. In the example shown in the drawing, search target code string 10*b* is partitioned into strings of 4 codes each. Thus, as shown by arrow 12, the head position of the second code string block is P5. And, as shown by arrow 13, the tail position of the second code string block is P8. Code position Pn shown by arrow 14 is defined as the termination position. Only the last code string block is configured by 2 codes.

A code ID range table and a next code ID table are created as the index data for each code string block.

In FIG. 9A is also shown an exemplary index data structure for a code string search corresponding to the search target code string 10*b*, as shown by dotted-line arrow 84. FIG. 9A exemplifies the index data management table 321 that is created corresponding to the code strings blocks for the search target code string 10*b*, and an index data storage area 324*a* corresponding to the head code string block holding a code ID range table 309*a* and a next code ID table 310*a*, an index data storage area 324*b* corresponding to the second code string block and holding a code ID range table 309*b* and a next code ID table 310*b*, an index data storage area 324*c* corresponding to the third code string block and holding a code ID range table 309*c* and a next code ID table 310*c*, an index data storage area 324*d* corresponding to the final code string block and holding a code ID range table 309*d* and a next code ID table 310*d*. Depiction of the index data stored in index data storage area 324*c* is omitted. Also, hereinbelow including in the descriptions for the embodiment 3 to 4, items in common may be expressed as "code ID range table 309" and "next code ID table 310". And the same applies to expressing other reference numerals. Because a code string block can be considered as one search target code string, explanations for code ID range table 309 and next code ID table 310 in the embodiment 2 are similar to those for code ID range table 309 and next code ID table 310 in the embodiment 1. Therefore some part of the description for code ID range table 309 and next code ID table 310 is omitted in order to avoid repetition.

In the example in the drawing of the code ID range table 309*a* corresponding to the head code string block, code type pointer 311*a* points to the entry corresponding to code A. In the same way, in the example of the code ID range table 309*b* corresponding to the second code string block, code type pointer 311*b* points to the entry corresponding to code A. Also, in the example of the code ID range table 309*d* corresponding to the last code string block, code type pointer 311*d* points to the entry corresponding to code A.

As shown in the information beneath the code ID range table 309*a*, an entry in the code ID range table 309*a* consists of a setting indicator, a number of occurrences, a head code ID, a tail code ID, and code ID counter.

The setting indicator shows with a 0 or 1 whether that code occurs in the search target code string. In the example of code ID range table 309*a*, because the codes C and D do not occur in the head code string block, the entries for codes C and D have a 0, and all the other entries have a 1. In the example of code ID range table 309*b*, because the codes D and E do not occur in the second code string block, the entries for codes D and E have a 0, and all the other entries have a 1. In the example of code ID range table 309*d*, because the codes B and C do not occur in the last code string block, the entries for codes B and C have a 0, and all the other entries have a 1.

The number of occurrences is the number of times that code occurs in the search target code string. In the example of code ID range table 309*a*, 2, 1, 0, 0, and 1 are stored for the codes A to E. In the example of code ID range table 309*b*, 1, 1, 2, 0, and 0 are stored for the codes A to E. In the example of code ID range table 309*d*, 0, 1, 1, 0, and 0 are stored for the codes A to E.

In the example of code ID range table 309*a*, because the number of occurrences for code A is 2, it has the range of ID 1 to ID 2, and because the number of occurrences for the next code B is 1, the head code and the tail code are both ID 3. Because the number of occurrences for code C and code D is 0, the head code IDs and the tail code IDs are not set. Because the number of occurrences for code E is 1, the head code and the tail code are both ID 4.

In the same way below, in the example of code ID range table 309*b*, the head code and tail code of code A are both ID 1, the head code and tail code of code B are both ID 2, and because the number of occurrences of code C is 2, the code ID range is ID 3 to ID 4.

Also, in the example of code ID range table 309*d*, the head code and tail code of code B are both ID 1, and the head code and tail code of code C are both ID 2.

An entry in the next code ID table 310 is created for each code ID assigned to a code in a code string block. As shown on the left side of next code ID table 310, in the example shown in the drawing, except for the next code ID table 310*d* for the last code string block, entries are created corresponding to code ID 1 to code ID 4. Each entry consists of the item's code position and next code ID. Code ID pointer 312 is a pointer pointing to an entry in next code ID table 310, and in the example in the drawing it points to ID 1 in each of the next code ID tables 310.

The code position in the entry for each code ID is a code position that is the position of the code with that code ID in search target code string 10*b*, and in the example shown in the drawing P1 is stored for ID 1, P4 is stored for ID 2, P2 is stored for ID 3, and P3 is stored for ID 4.

As shown by the dotted line of arrow 313*a* (A) in the drawing, the first and second entries in next code ID table 310*a* correspond to the code A. In the same way, as shown by the dotted line of arrow 313*a* (B) in the drawing, the third entry corresponds to the code B; and, as shown by the dotted line of arrow 313*a* (E) in the drawing, the fourth entry corresponds to the code E.

The next code ID for each code ID entry is the code ID for the code located next in the code string block after the code for that code ID entry. Also, the code ID for the code that is at the head of a code string block is stored as the next code ID of the tail end of the string. Thus in next code ID table 310*a*, for ID 1 the stored next code ID is ID 3, for ID 2 it is ID 1, for ID 3 it is ID 4, for ID 4 it is ID 2.

In next code ID table 310*b*, P7 is stored for ID 1, P5 is stored for ID 2, P6 is stored for ID 3, and P8 is stored for ID 4.

As shown by the dotted-line arrow 313*b* (A), the first entry in the next code ID table 310*b* corresponds to the code A. In the same way, as shown by the dotted-line arrow 313*b* (B), the second entry corresponds to the code B; and as shown by the dotted-line arrow 313*b* (C), the third and fourth entries correspond to the code C.

Also, the stored next code ID for ID 1 is ID 4, for ID 2 it is ID 3, for ID 3 it is ID 1, and for ID 4 it is ID 2.

In next code ID table 310*d*, Pn is stored for ID 1, and Pn−1 is stored for ID 4.

As shown by the arrow with the dotted line 313*d* (B), the first entry in the next code ID table 310*b* corresponds to the code B. In the same way, as shown by the dotted-line arrow 313*d* (C), the second entry corresponds to the code C.

Also, the stored next code ID for ID 1 is ID 2, and for ID 2 it is ID 1.

Next code ID table 310 keeps, as index data, the fact that 2 codes, expressed in code IDs, have a contiguous position relationship in the search target code string. The relationship between the code in the tail position in a preceding code string block and the code in the head position in a following code string block is managed by the fact that the index data management table holds the head codes of each code string block.

As shown in the drawing, index data management table 321 has an entry for each code string block, and consists of the items: a setting indicator, a head code, and an index data pointer. Index data management pointer 322 is a pointer pointing to an entry in the index data management table. In the example in the drawing, index data management pointer 322 points to entry 1, which corresponds to the head code string block.

A 1 is set in the setting indicator of index data management table 321 for the entries from entry 1 to entry m, and 0 is set in all the other entries. Entry m corresponds to the last code string block. Also, code A is set in entry 1 of the index data management table as its head code, code B is set in entry 2 as its head code, and code C is set in entry m as its head code. As shown by the dotted-line arrows 344*a*, 344*b*, 344*c*, and 344*d*, the index data pointers point to the index data storage areas 324*a*, 324*b*, 324*c*, and 324*d* that correspond to those code string blocks.

Figure 9B:
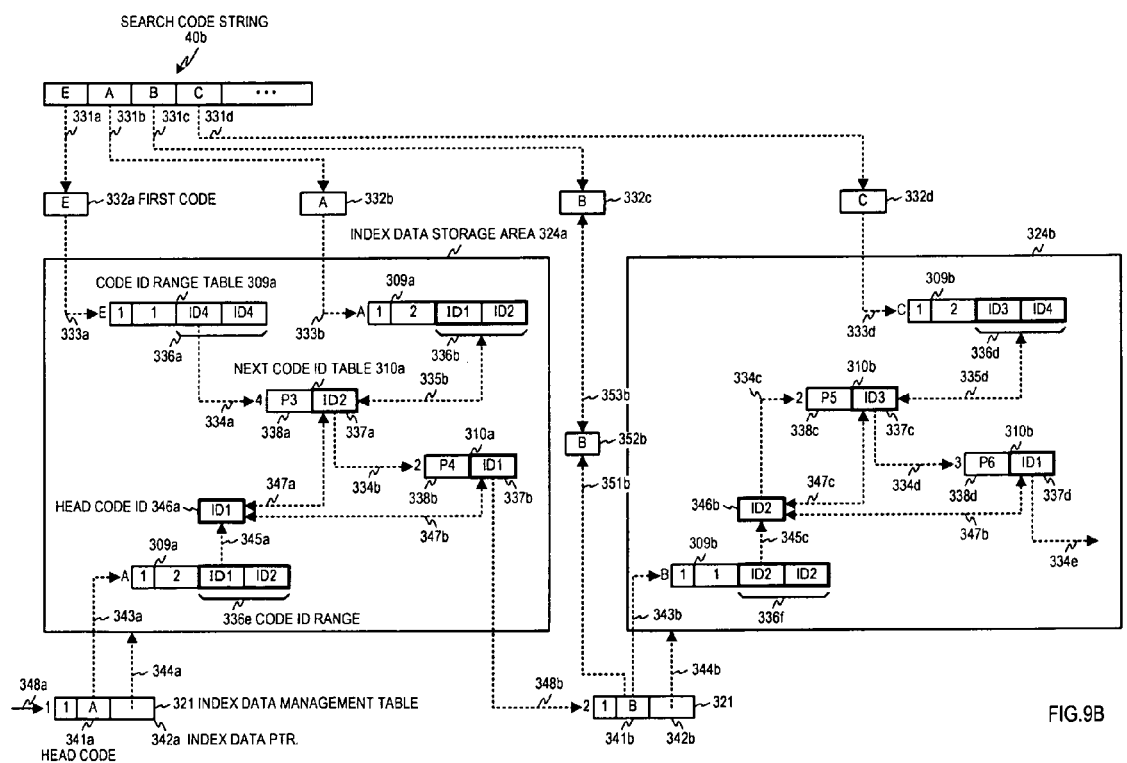
FIG. 9B is a drawing describing conceptually a code string search in an embodiment 2 of this invention.

FIG. 9B is a drawing describing conceptually a code string search in the embodiment 2 of this invention.

The search target code string is taken to be search target code string 10*b* shown in FIG. 9A, and it is taken to be partitioned into the code string blocks shown in FIG. 9A. Also a search code string is described conceptually by the search code string 40*b* shown in FIG. 9B. Code ID range tables 309 and next code ID tables 310 are taken to be created corresponding to the code string blocks of the search target code string, and index data management table 321 is also taken to be created.

Before starting a search, the head entry 321 (1) of the index data management table shown by arrow 348*a* is read out, and, as shown by the arrow with a dotted line 344*a*, code ID range table 309*a* and next code ID table 310*a* stored in index data storage area 324*a* are obtained by index data pointer 342*a*.

Furthermore, as shown by the dotted-line arrow 343*a*, entry 309*a* (A) of the code ID range table 309*a* corresponding to the code A stored in the head code 341*a* is read out, and, as shown by the arrow with a dotted-line arrow 345*a*, ID 1, which is the head code ID, is read out, and is set in the head code ID 346*a* in a temporary storage area.

As shown in the drawing, code E, code A, code B, and code C are located in search code string 40*b*, starting from its head. Then as shown in the drawing by dotted-line arrow 331*a*, code E, which is the first code, code 332*a*, is read out. Next, as shown by dotted-line arrow 333*a*, entry 309*a* (E) corresponding to code E in code ID range table 309*a* corresponding to the head code string block is read out. (If the head code of search code string 40*b* does not exist in the head code string block, processing skips to the index data associated with a code string block wherein the head code exists.)

Then, as shown by dotted-line arrow 334*a*, the code ID included in ID range 336*a*, which code ID is ID4 in the example in the drawing, is read out from entry 309*a* (E), and entry 310*a* (4) corresponding to the read out code ID 4 is read out from next code ID table 310*a*.

Also, code 1, the head code for code A, which is the head code set in the code ID range table 309*a*, is set in head code ID 346*a* in a temporary storage area.

Then as shown by the bi-directional dotted-line arrow 347*a*, ID 2, which is the next code ID in entry 310*a* (4) corresponding to code ID 4, and ID 1, which is set in head code ID 346*a* are compared and a determination is made that the next code ID is other than the head code ID.

Next, as shown by dotted-line arrow 331*b*, code A, which is the second code, code 332*b*, is read out. Because the determination by the bi-directional dotted arrow 347*a* noted above is that the code is other than the head code ID, as shown by dotted-line arrow 333*b*, entry 309*a* (A) corresponding to code A in code ID range table 309*a* that is the same as that for the first code E is read out. Then as shown by the bi-directional dotted-line arrow 335*b*, a determination is made whether ID 2, which is next code ID 337*a* of entry 310*a* (4) that corresponds to code ID 4 read-out from next code ID table 310*a*, is included in the code ID range 336*b* (ID 1 to ID 2) of entry 309*a* (A), which corresponds to the read-out code A in code ID range table 309. In the example shown in the drawing, the result of the determination is "yes". This means that the sequence code E-A exists in the head code string block in search target code string 10*b*. Also, because the code position 338*a* of entry 310*a* (4), which corresponds to code ID 4 read out from next code ID table 310*a*, is P3, it can be understood that the leading position of the code sequence code E-A is P3.

Furthermore, as shown by dotted-line arrow 334*b*, ID 1, which is the next code ID 337*b* in entry 310*a* (2) corresponding to ID 2 in next code ID 337*a*, is read out. Then as shown by the bi-directional dotted-line arrow 347*b*, a comparison is made between the read-out ID 1 and the ID 1 set previously in the head code ID 346*a*, and a determination is made whether the next code ID coincides with the head code ID. In other words, a determination is made that the code A of the head code string block, whose code ID is the code ID 2 and which is being compared with the code A, which is the second code 332*b* in the search code string, is located in the tail position of the head code string block.

Then, entry 321 (2), which is the second entry in the index data management table shown by the dotted-line arrow 348*b*, is read out, and, as shown by the dotted-line arrow 351*b*, the code B stored in that head code 341*b* is set in temporary storage area 352*b*. Then, as shown by the dotted-line arrow 331*c*, when code B is read out as the third code 332*c*, a determination is made whether it coincides with the code set in the temporary storage area 352*b*, as shown by the bi-directional dotted-line arrows 353*b*. In other words, a determination is made whether the code B that is the third code 332*c* coincides with the code B that is the head code of the second code string block. In the example in the drawing, an affirmative determination result is obtained. Thus the search target code string 10*b* produces a hit for the search code string EAB.

Then as shown by the dotted-line arrow 344*b*, index storage area 324*b* is accessed by means of the index data pointer 342*b*, and, as shown by the dotted-line arrow 343*b*, entry 309*b* (B) of the code ID range table 309*b* corresponding to the code B stored in the head code 341*b* is read out. As shown by the dotted-line arrow 345*c*, ID 2, which is the head code ID in the range 336*f* for that code ID, is read out and is set in the head code ID 346*b* in a temporary storage area.

Next, as shown by the dotted-line arrow 334*c*, ID 3, which is the next code ID 337*c* in entry 310*b* (2) corresponding to ID 2, which is the head code ID 346*b*, is read out. Then as shown by the bi-directional dotted-line arrow 347*c*, a comparison is done between the read-out ID 3 and the ID 2 set previously in the head code ID 346*b*, and a determination is made that the next code ID is other than the head code ID.

As shown by the next dotted-line arrow 331*d*, code C, which is the fourth code 332*d*, is read out. Because, as shown by the above noted bi-directional dotted-line arrow 347*c*, the determination was that the next code ID is other than the head code ID, as shown by the dotted-line arrow 333*d*, the entry 309*b* (C) corresponding to the code C in the same code ID range table as in the case of the third code B is read out. Then as shown by the bi-directional dotted-line arrow 335*d*, a determination is made whether ID 3, which is next code ID 337*c* of entry 310*b* (2) that corresponds to code ID 2 in next code ID table 310 shown by dotted-line arrow 334*c*, is included in the code ID range 336*d* (ID 3 to ID 4) of entry 309*b* (C), which corresponds with the read-out code C shown by dotted-line arrow 333*d*. In the example shown in the drawing, because the determination is "yes", it can be understood that search target code string 10*b* produces a hit on the search code string EABC.

Following that determination, as shown by the dotted-line arrow 334*d*, ID 1, which is the next code ID 337*d* in entry 310*b* (3) corresponding to ID 3, which is the next code ID 337*c*, is read out. Then as shown by the bi-directional dotted-line arrow 347*d*, a comparison is done between the read-out ID 1 and the ID 2 set previously in the head code ID 346*b*, and a determination is made that the next code ID does not coincide with the head code ID.

Then because the code position 338*b* of the entry 310*a* (2) corresponding to the code ID 2 read out from next code ID table 310*a* is P4, and the code position 338*c* of the entry 310*b* (2) corresponding to the code ID 2 read out from next code ID table 310*b* is P5, the code position 338*d* of the entry 310*b* (3) corresponding to the code ID 3 is P6, it can be understood that the above noted hit positions are code positions P3, P4, P5, and P6.

Even for the fifth code, not shown in the search code string 40*b*, as shown by the dotted-line arrow 334*e*, the process of reading out the next code ID of the entry in the code ID range table corresponding to ID 1, which is the next code ID 337*d*, and determining whether it is within the ID code range of the entry in the code ID range table 309 entry pointed to by the code type of the fifth code is repeated.

By doing the above, a code string search according to the embodiment 2 of this invention is implemented.

Next the process for creating index data in the embodiment 2 of this invention is described. As shown in FIG. 9A, the index data is composed of the index data management table and the code ID range table and the next code ID table stored in the index data storage area corresponding to each code string block.

Figure 10A:
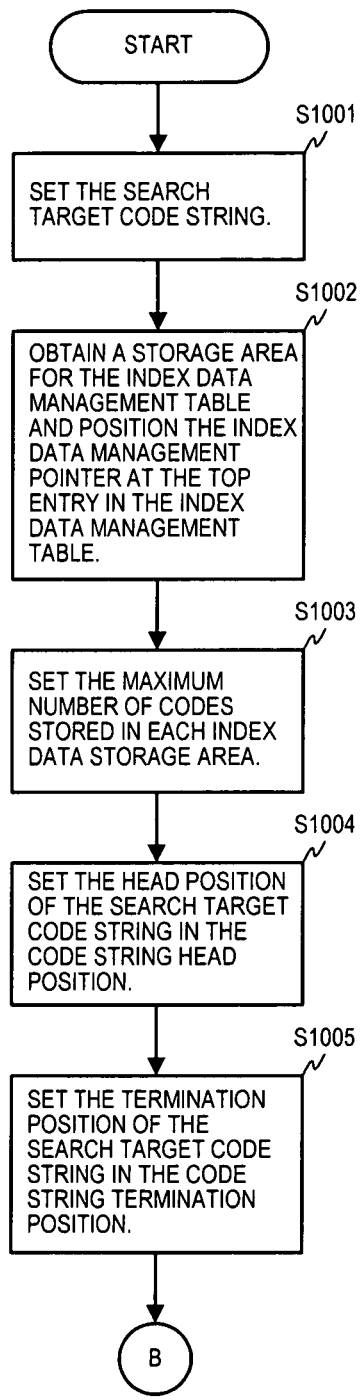
FIG. 10A is a drawing describing the processing flow of the prior stage that creates index data for a code string block in an embodiment 2 of this invention.
Figure 10B:
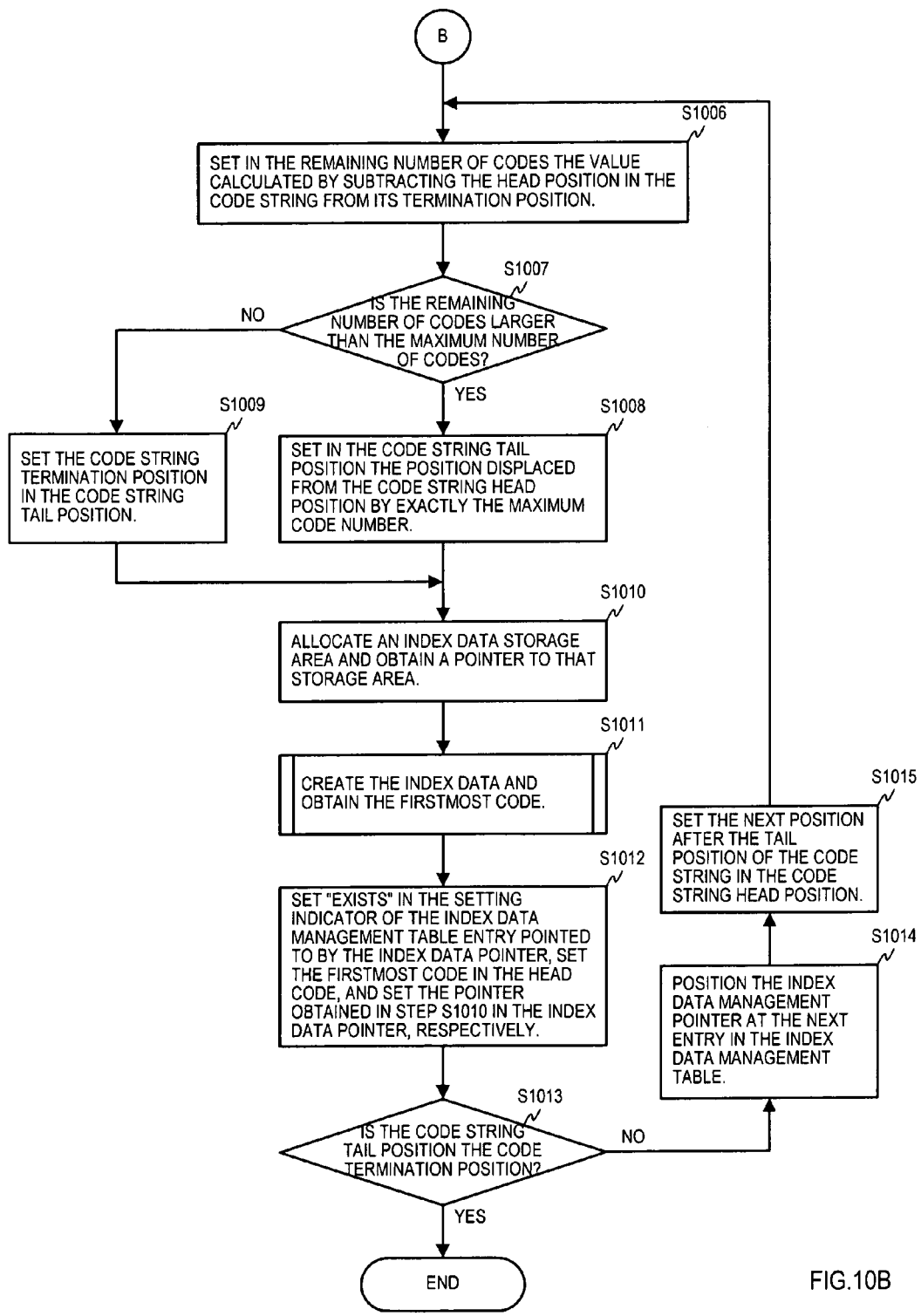
FIG. 10B is a drawing describing the processing flow of the latter stage that creates index data for a code string block in an embodiment 2 of this invention.

FIG. 10A and FIG. 10B are drawings describing the flow of processing that creates index data in the embodiment 2 of this invention. The index data creation processing flow shown in FIG. 10A and FIG. 10A is configured from the sequential flow of the initialization processing and the creation processing of the block index data corresponding to each code string block (hereinafter this data may be called the block index data corresponding to each code string block, or, more simply, block index data).

FIG. 10A is a drawing describing the processing for creating index data in the embodiment 2 of this invention, in other words, the processing flow of the prior stage processing that creates successively block index data corresponding to each code string block. The processing of this prior stage is the above noted initialization processing. This initialization processing is common to the embodiment 3 and the embodiment 4 of this invention.

As shown in FIG. 10A, in step S1001, the search target code string is set. Setting the search target code string means that one code string is read out by search target code string read-out means 101 illustrated in FIG. 8A, from the code strings that are targets of searches stored in a data storage apparatus, and setting it in an unillustrated search target code string setting area.

Next in step S1002, a storage area for the index data management table is obtained, and an index data management pointer is positioned at the top entry in the index data management table. Proceeding to step S1003, the maximum number of codes in a code string block partitioned out of the search target code string is set. In the example shown in FIG. 9A, the maximum number of codes is 4. Next, at step S1004, the head position of the code positions in the search target code string is set in the code string head position. And at step S1005 the termination position of the code positions in the search target code string is set in the code string termination position, and processing moves to step S1006 shown in FIG. 10B.

With the above, the initialization processing of the index data creation processing is finished. As shown in FIG. 9A, the search target code string 10*b* has been set, the index data management pointer 322 has been positioned at the head entry in the index data management table 321, 4 is set in the maximum number of codes, P1 is set in the code string head position, and Pn is set in the code string termination position.

FIG. 10B is a drawing describing the processing flow of the latter stage that creates successively block index data corresponding to each code string block.

As shown in the drawing, in step S1006, the value computed by subtracting the head position of the code string from the termination position of the code string is set in the remaining number of codes, and at step S1007, a determination is made whether the remaining number of codes is larger than the maximum number of codes. If the remaining number of codes is larger than the maximum number of codes, processing proceeds to step S1008, and the position that is moved from the head position of the code string by only the amount set in the maximum number of codes is set in the code string tail position. And if the remaining number of codes is not larger than the maximum number of codes, processing proceeds to step S1009, and the code string termination position is set in the code string tail position.

The processing of the above steps S1006 to S1009 is performed for the purpose of determining, using the code string tail position set in steps S1008 or S1009, whether the processing, described below, to create index data corresponding to each code string block is to be terminated.

Next, in step S1010, a storage area is allocated for the index data of the code string block that is the current target of creating index data and a pointer to that storage area is obtained, and processing proceeds to step S1011. The code string block that is the target of index data creation is the block that starts from the code positioned in the code string head position set in step S1004 or in step S1015 described below.

At step S1011, index data is created for the code string block that is the current target of index data creation and is stored in the storage area allocated in step S1010, and the firstmost code is obtained. Details of the processing in step S1011 and the firstmost code is explained hereinbelow referencing FIG. 11A to FIG. 11C.

Next, at step S1012, "Exists" is set in the setting indicator of the index data management table pointed to by the index data pointer, the firstmost code is set in the head code, and the pointer obtained in step S1010 is set in the index data pointer. Also, the firstmost code is the code set in the processing of step S1011.

Next, at step S1013, a determination is made whether the code string tail position coincides with the code string termination position. If the code string tail position coincides with the code string termination position, because the creation of index data has finished, processing is terminated. If the code string tail code position does not coincide with the code string termination position, processing proceeds to step S1014, and the index data management pointer is positioned at the next entry in the index data management table, and, at step S1015, the next code position after the code string tail position is set in the code string head position, and processing returns to step S1006.

The processing loop of the above steps S1006 to S1015 is repeated until a determination is made in step S1013 that the code string tail position points to the code string termination position, and when that determination is made, index data creation processing is terminated because index data creation for all the code strings is completed.

Next, a description of the block index data creation processing in the embodiment 2 of this invention is provided as a description of the details of step S1011 shown in FIG. 10B. The block index data creation processing is the same for any code string block, and, due to the fact that a code string block is also a code string, in the description below, the code string block that is the current target of index data creation may be called a search target code string or the code string that is a search target. And as described above, the flow shown in FIG. 4 is similarly applied to the embodiment 2 as a general flow of processing that creates index data. Therefore, the description of the general flow shown in FIG. 4 is omitted, but the details of step S401 to step S403 of the embodiment 2 are described referencing FIG. 11A to FIG. 11C.

Figure 11A:
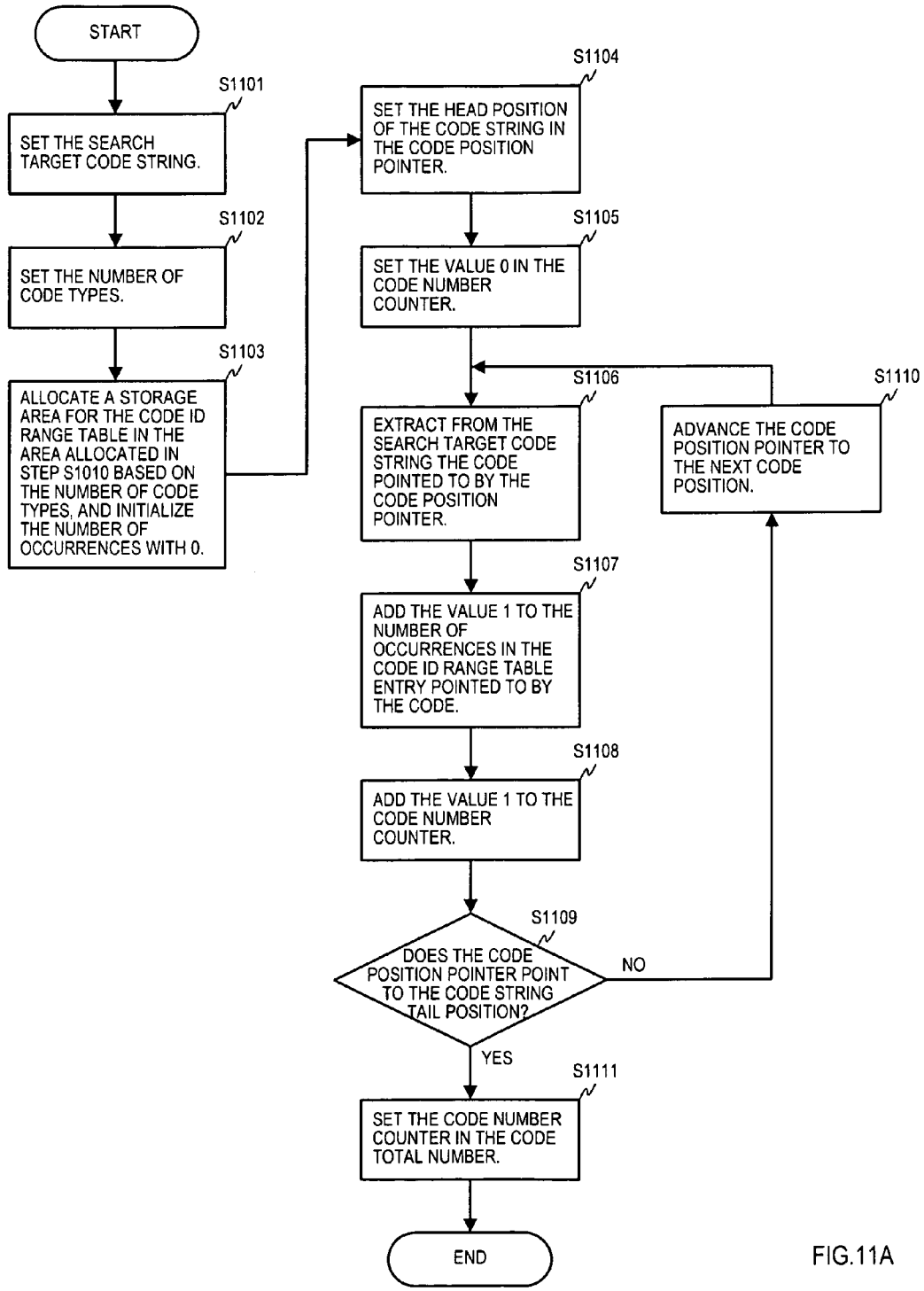
FIG. 11A is a drawing describing the processing flow for enumerating the number of occurrences of each code type of the codes included in the code strings that are targets of searches in an embodiment 2 of this invention.

FIG. 11A shows the detailed flow of the processing in step S401 shown in FIG. 4, and it is a drawing describing the processing flow for enumerating the number of occurrences of each code type of the codes included in the code string that are targets of searches.

As shown in the drawing, in step S1101, a search target code string is set. Setting the search target code string means that a code string block that is the current target of index data creation is set in an unillustrated search target code string setting area.

Next, in step S1102, the number of code types is set. The number of code types is determined by the code system, and it is assumed to be provided beforehand.

Next, proceeding to step S1103, a storage area for the code ID range table is allocated in the area allocated in step S1010 shown in FIG. 10B based on the number of code types set in step S1102, and the number of occurrences is initialized with 0. Continuing, at step S1104, the leading position of the code string set at step S1101 is set in the code position pointer, and at step S1105 the value 0 is set in the code number counter. The above processing of step S1101 to step S1105 is initialization processing.

Following the initialization processing, proceeding to step S1106, the code pointed to by the code position pointer is extracted from the code string. Next, at step S1107, the value 1 is added to the number of occurrences for the entry in the code ID range table corresponding to the code type of the extracted code (hereinafter, this may be called the code ID range table entry pointed to by the code, as is in the embodiment 1), and at step S1108, 1 is added to the code number counter, and processing proceeds to step S1109.

At step S1109, a determination is made whether the code position pointer is at the tail position of the code string set in steps S1008 or S1009 of FIG. 10B, and if it is not the tail position, at step S1110, the code position pointer is advanced to the next position and processing returns to step S1106. If the code position pointer is at the tail position of the code string, at step S1111 the code number counter is set in the code total number, and processing is terminated. By means of the above processing, the number of occurrences in the code ID range table is set as well as the code total number.

Figure 11B:
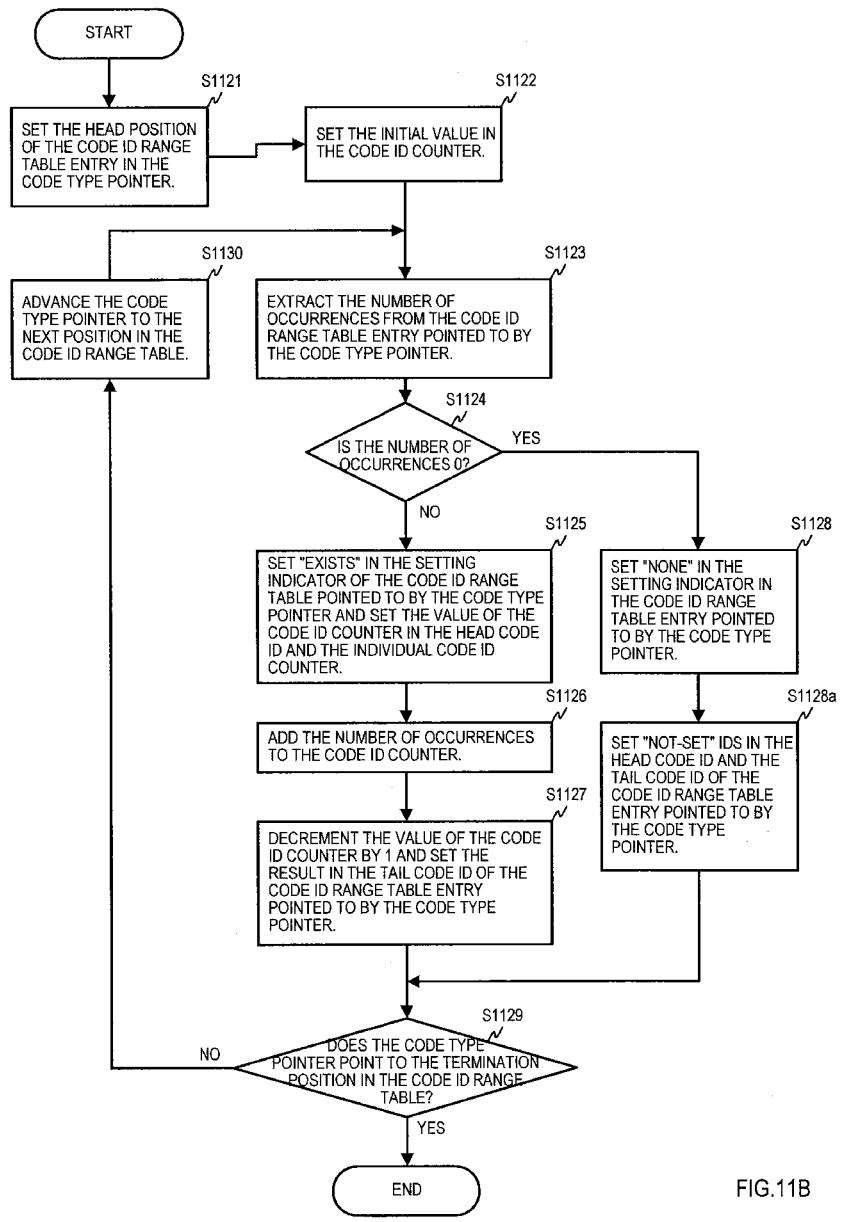
FIG. 11B is a drawing describing the processing flow for setting the code ID range for each code type based on the number of occurrences in an embodiment 2 of this invention.

FIG. 11B shows the detailed flow of the processing of step S402 in FIG. 4, and it is a drawing describing the processing flow for setting the code ID range for each code type based on the number of occurrences set by the processing shown in FIG. 11A.

First, in step S1121, the head position in the code ID range table is set in the code type pointer, and next, in step S1122, an initialization value is set in the code ID counter. Next, proceeding to step S1123, the number of occurrences is extracted from the code ID range table entry pointed to by the code type pointer, and at step S1124, a determination is made whether the extracted number of occurrences is 0.

If the number of occurrences is not 0, at step S1125, "Exist" is set in the setting indicator in the code ID range table entry pointed to by the code type pointer as well as setting the value of the code ID counter in the head code ID and in the individual code ID counter. Next at step S1126, the number of occurrences is added to the code ID counter, and at step S1127, the value of code ID counter is decremented by 1 is set in the tail code ID of the code ID range table entry pointed to by the code type pointer, and processing proceeds to step S1129.

Otherwise, if the determination in step S1124 is that the number of occurrences is 0, at step S1128, "None" is set in the setting indicator in the code ID range table entry pointed to by the code type pointer, and at step S1128a, "not-set" IDs are set in the head code ID and the tail code ID of the code ID range table pointed to by the code type pointer, and processing proceeds to step S1129. The values 0 or −1 can be used as the "not-set" ID.

At step S1129, a determination is made whether the code type pointer is at the termination position of the code ID range table, and if it is not the termination position, at step S1130, the code type pointer is advanced to the next code type position in the code ID range table and processing returns to step S1123. If it is the termination position, processing is terminated because the setting of the code ID range table is completed.

Figure 11C:
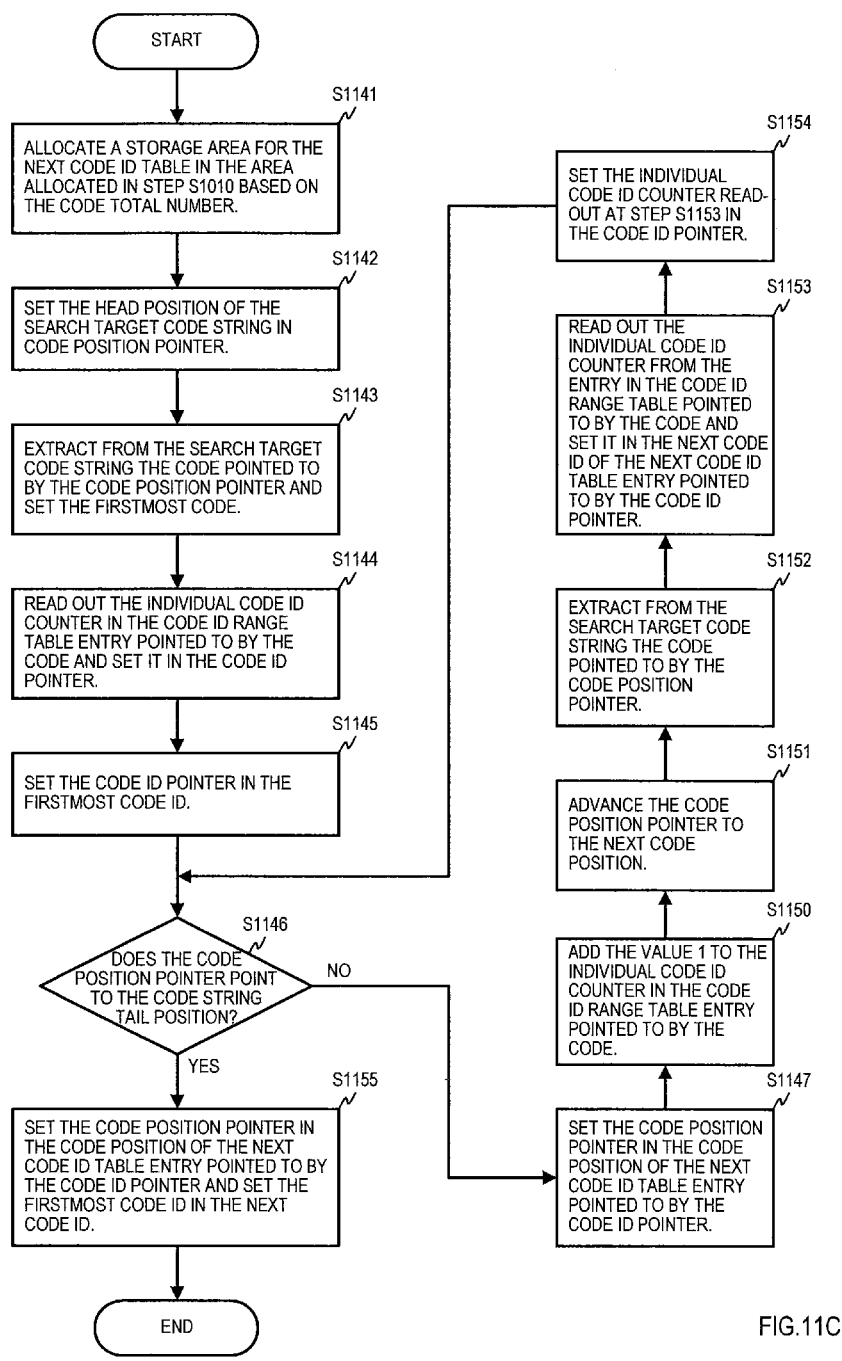
FIG. 11C is a drawing describing the processing flow for completing an next code ID table based on the codes included in the search target code string in an embodiment 2 of this invention.

FIG. 11C is a drawing showing the detailed flow of the processing of step S403 shown in FIG. 4 and describes the processing flow for completing a next code ID table based on the codes included in the search target code string.

First, at step S1141, a storage area for the next code ID table is allocated in the area allocated in step S1010 shown in FIG. 10B based on the total number of codes obtained by the processing shown in FIG. 11B, and at step S1142, the head position of the search target code string is set in the code position pointer. Next, at step S1143, the code pointed to by the code position pointer is extracted from the search target code string and is set in the firstmost code. Then, at step S1144, the individual code ID counter in the code ID range table entry pointed by the code is read out and set in the code ID pointer. Next, at step S1145, the code ID pointer is set in the firstmost code ID, and processing proceeds to step S1146.

At step S1146, a determination is made whether the code position pointer is at the tail position of the search target code string set at steps S1008 or S1009 of FIG. 10B, and if it is not at the tail position, the processing of steps S1147 to S1154 is executed, and the code position and next code ID of the next code ID table entry pointed to by that code ID are set, and processing returns to step S1146.

First, at step S1147, the code position pointer is set in the code position of the next code ID table entry pointed to by the code ID pointer. Next, at step S1150, 1 is added to the individual code ID counter in the next code ID table entry pointed to by the code extracted at step S1143 or at step S1152 described below, and at step S1151, the code position pointer is advanced to the next code position.

Next, in step S1152, the code pointed to by the code position pointer is extracted from the search target code string, and at step S1153, the individual code ID counter in the next code ID table entry pointed to by the extracted code is read out and set in the next code ID of the next code ID table entry pointed to by the code ID counter.

Next, in step S1154, the individual code ID counter read out at step S1153 is set in the code ID counter, and processing returns to step S1146.

The processing of the above steps S1146 to S1154 is repeated until the code position pointer points to the tail position in the search target code string, and when the code position pointer points to the tail position in the search target code string or to the termination position, processing branches to step S1155. At step S1155, the code position pointer is set in the code position in the next code ID table entry pointed to by the code ID counter, and the firstmost code ID set at step S1145 is set in the next code ID, and processing is terminated.

By means of the above processing described in detail referencing FIG. 10A to FIG. 11C, index data is created for a code string search in the embodiment 2 of this invention.

Next, referencing FIG. 12 to FIG. 15B, the processing of a code string search in the embodiment 2 of this invention is described. Just as the concept of a code string search in the embodiment 2 of this invention was described above referencing FIG. 9B, in the code string search in the embodiment 2 of this invention, first, the code in the search target code string that matches the head code of the search code string and the code position that is its position are obtained, and, next, a comparison is made between each single code of the codes in the search target code string from the obtained code position and each single code in the search code string, using the code ID range table and next code ID table created in correspondence to that code string block.

Next, before entering a concrete description referencing FIG. 12 to FIG. 15B, an overview of the processing flow in the code string search processing in the embodiment 2 of this invention and the relationship between the processing depicted in each of the drawings is described. The overview of the processing flow and so on described below is similarly applied to the embodiment 3 and the embodiment 2 of this invention.

The processing flow in the code string search processing in the embodiment 4 of this invention has 3 nested loops.

Figure 12:
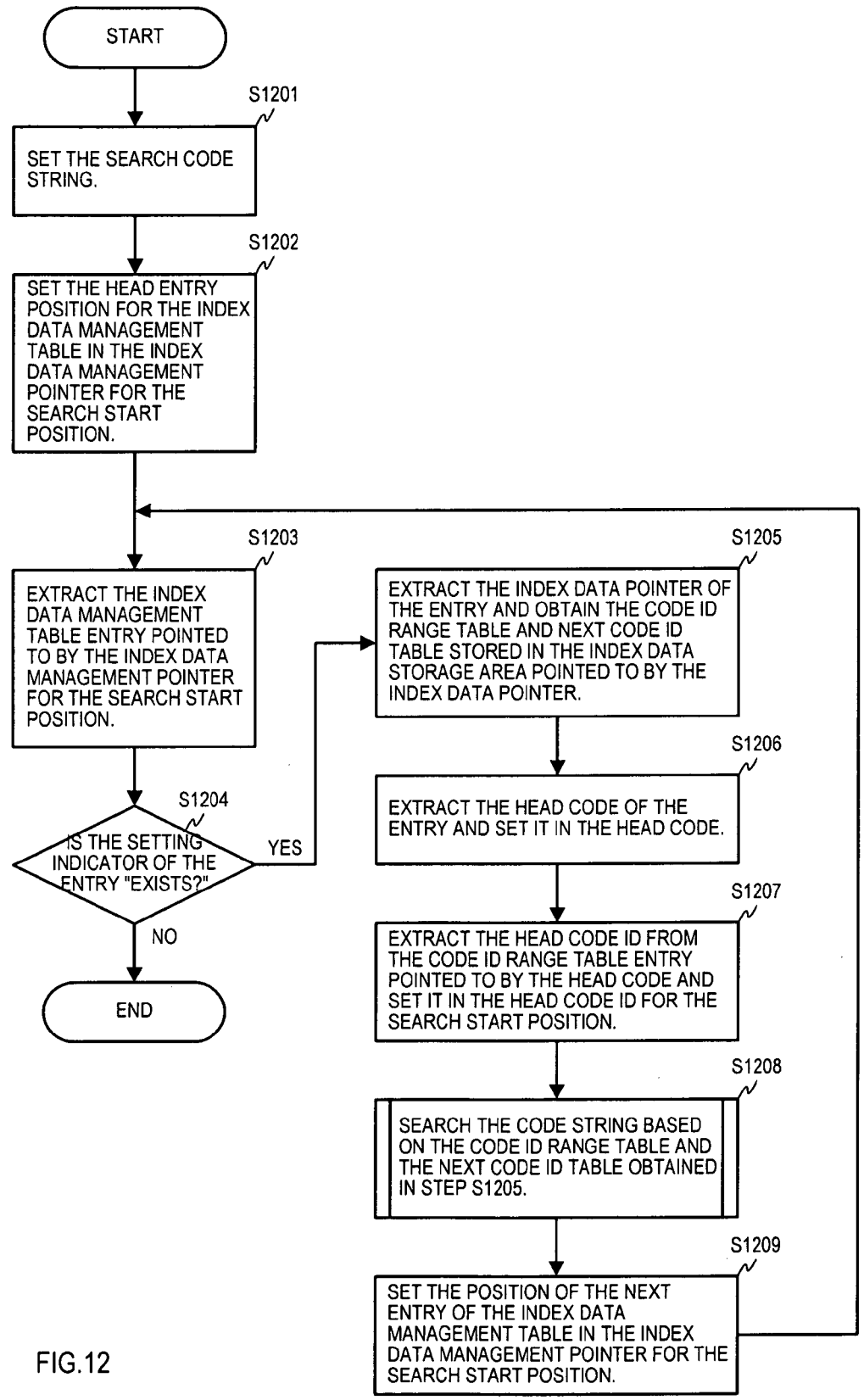
FIG. 12 is a drawing describing in general the overall processing flow for a code string search in an embodiment 2 of this invention.

The outermost loop is a loop executed for each code string block. The search is repeated, using the search code string, from the head code string block of the search target code string until its termination code string block. The control flow of this outermost loop is shown in FIG. 12.

Figure 13A:
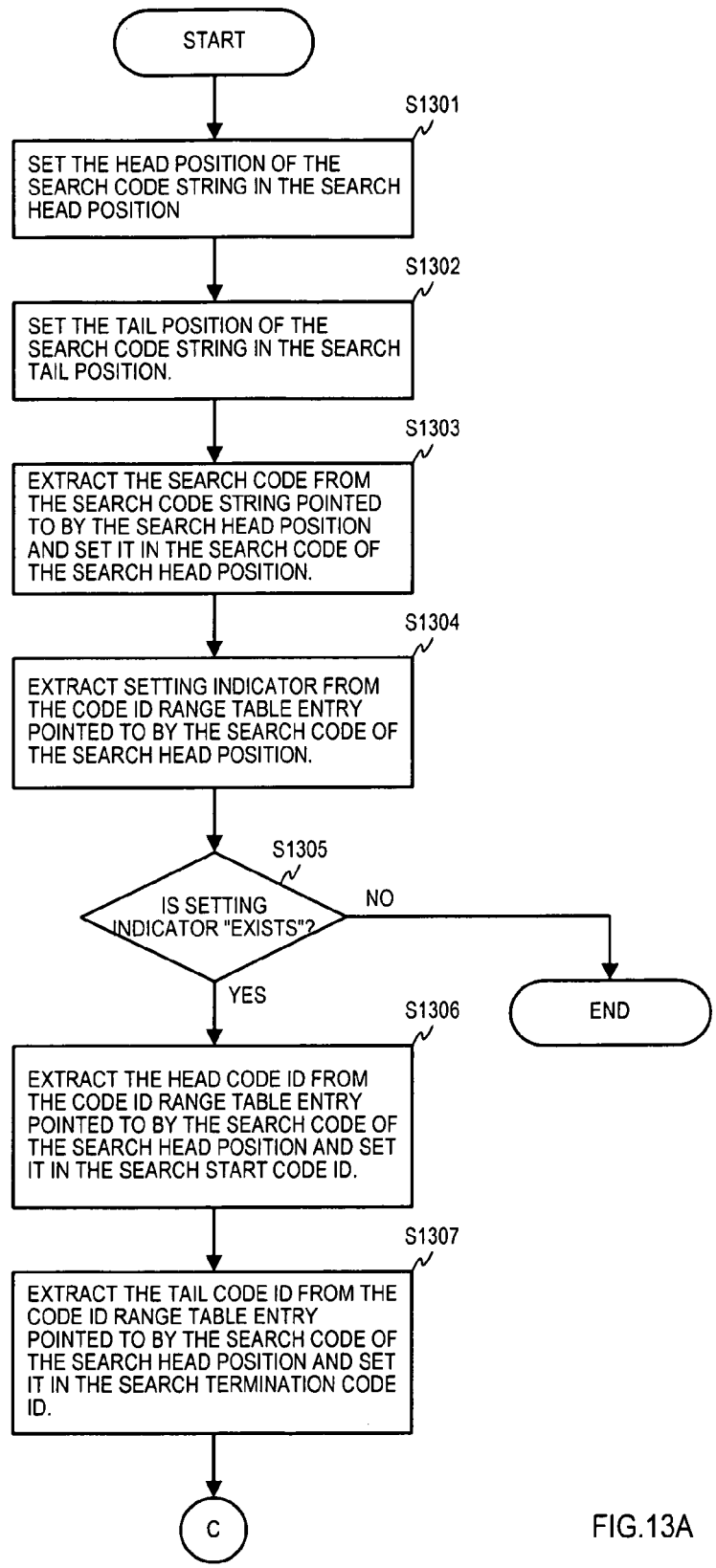
FIG. 13A is a drawing describing the processing flow of the prior stage of a code string search that makes a given code string block the search start position in an embodiment 2 of this invention.
Figure 13B:
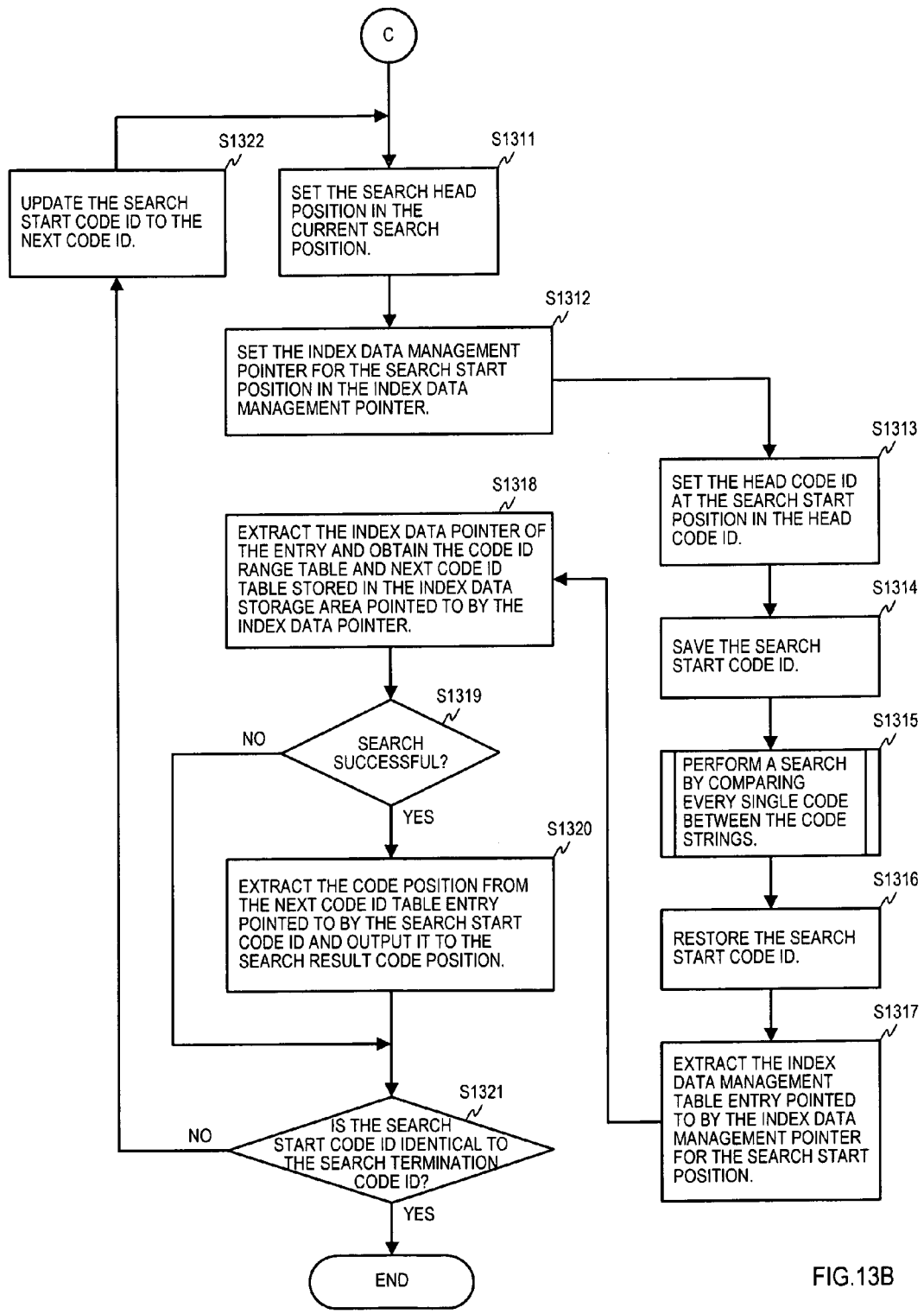
FIG. 13B is a drawing describing the processing flow of the latter stage of a code string search that makes a given code string block the search start position in an embodiment 2 of this invention.
Figure 14A:
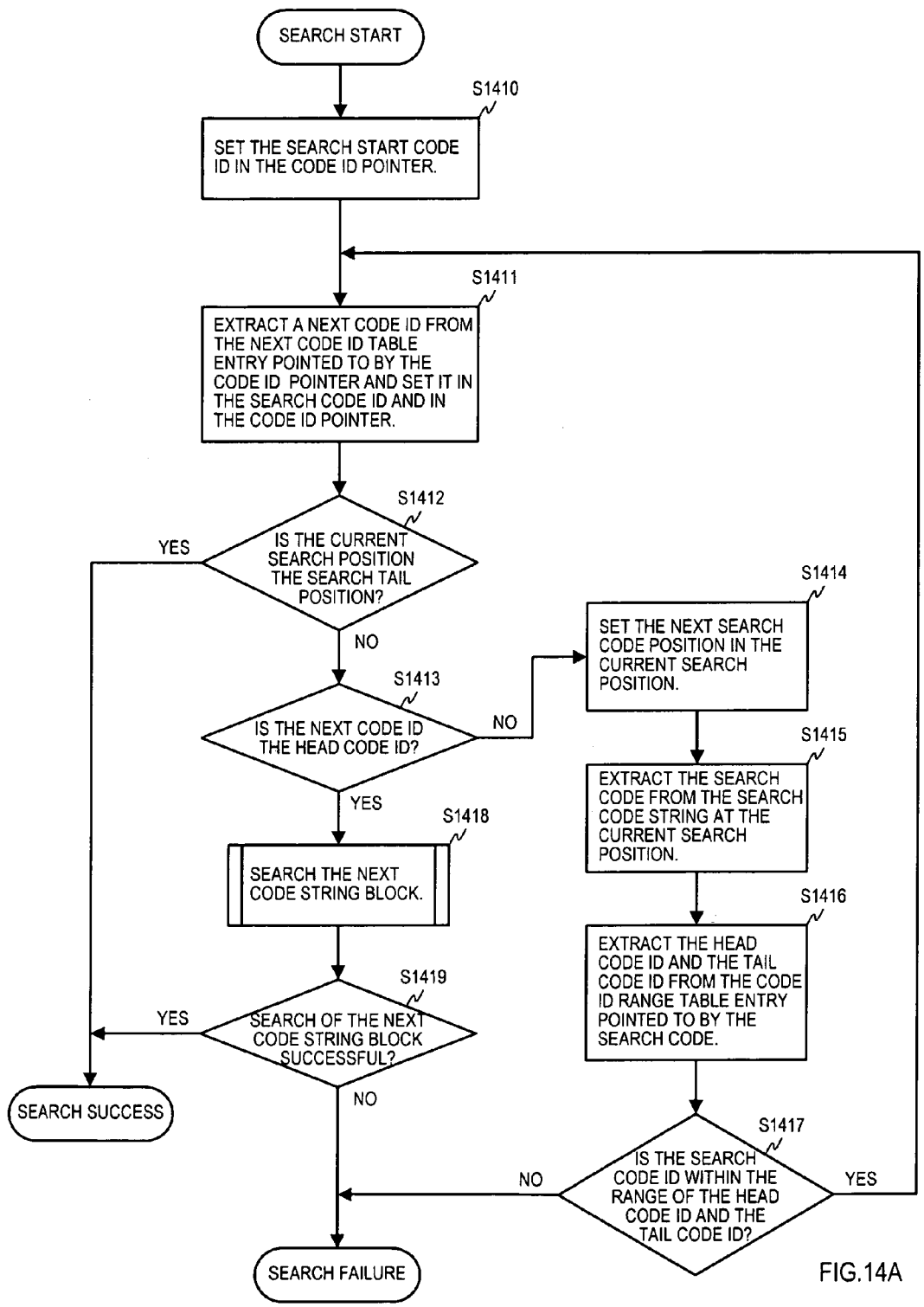
FIG. 14A is a drawing describing the flow of a full match search in an embodiment 2 of this invention.

The next inner loop is a loop executed for each of the code IDs assigned to the head code in the search code string. The search is repeated in a given code string block, using the search code string, spanning the range of code IDs for the head code of the search code string. The control flow of this next inner loop is shown in FIG. 13A and FIG. 13B. The innermost loop is a loop comparing each single code of the search code string with those in the code string block. The comparison is repeated for each single code from the head code in the search code string to its tail code. The control flow of this innermost loop is shown in FIG. 14A for full match searches, in FIG. 14B for prefix match searches, and in FIG. 14C for searches including an any-code.

In accordance with the processing flow of the code string search processing in the embodiment 2 of this invention, for each code string block in the outermost processing loop the next inner processing loop is called, and for each code ID assigned to the head code of the search code string, the innermost processing loop is called, and the comparison with each code in the code string block is repeated for each single code from the head code in the search code string to its tail code.

Then, in this invention, the search target code string has been partitioned into code string blocks and, while the above noted comparison of each single code is being repeated in the innermost processing loop, it is possible that the tail position in the code string block could have been reached before a comparison with the tail code in the search code string has been completed. Hence it is necessary to span to the next code string block and to continue the repeated comparison of each single code.

Figure 15A:
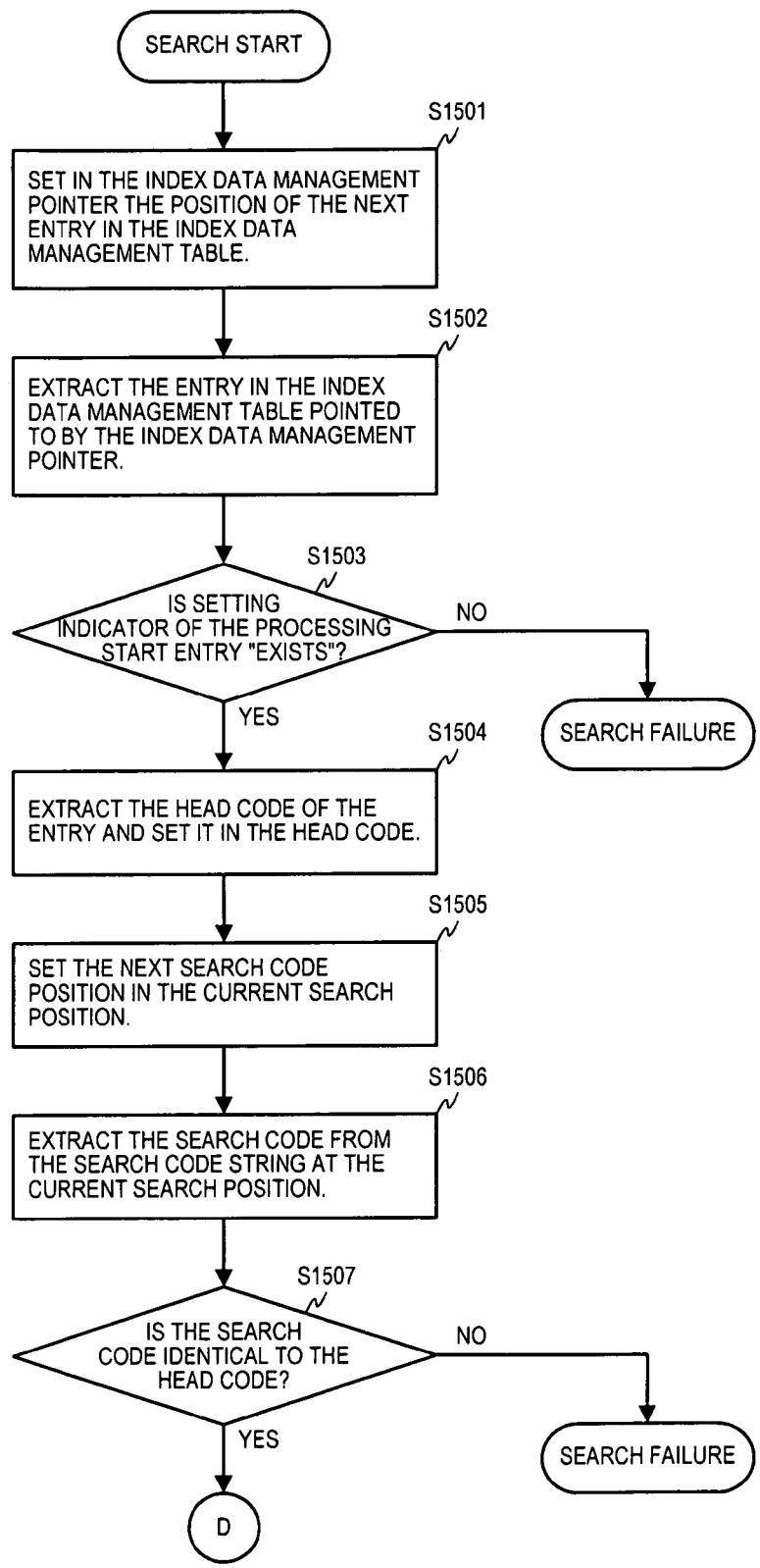
FIG. 15A is a drawing describing the processing flow of the prior stage of a search in the next code string block in an embodiment 2 of this invention.
Figure 15B:
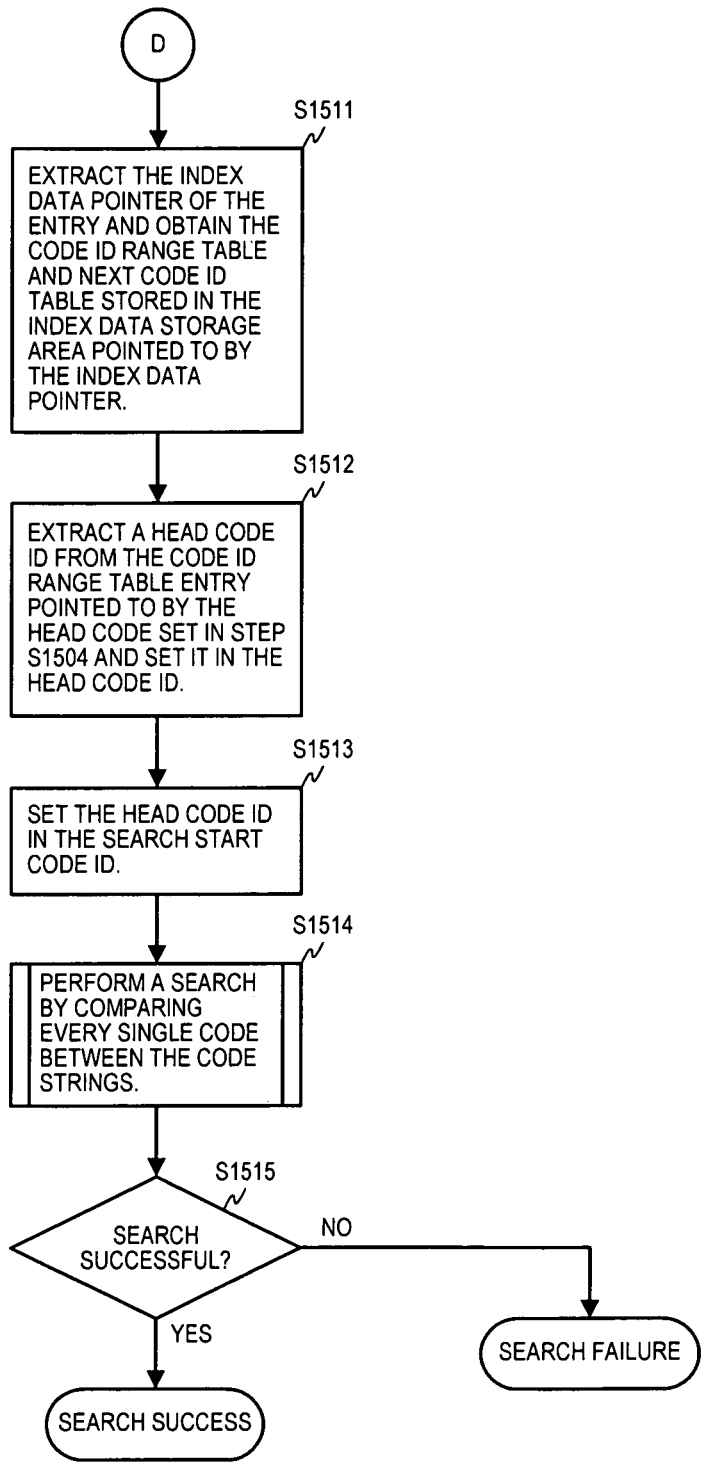
FIG. 15B is a drawing describing the processing flow of the latter stage of a search in the next code string block in an embodiment 2 of this invention.

The way the continuation of this repeated comparison of each single code is realized is by the next code string block search processing shown in the processing flow of FIG. 15A and FIG. 15B. This search processing is called by the innermost processing loop and recursively calls the innermost processing loop in order to repeat the comparison of each single code.

FIG. 12 depicts the above. Thus it is a drawing describing in general the overall processing flow for a code string search in the embodiment 2 of this invention. The flow shown in FIG. 12 consists of the initialization processing and the search processing loop that successively replaces, in the search target code string, the code string block that starts the search with the next code string block.

First, in step S1201, the search code string is set. This setting of the search code string is that wherein the search code string read out by the search code string read-out means 111 shown in FIG. 8B is set in a temporary storage area and the leading position of the read-out search code string is provided.

Next, in step S1202, the top entry position in the index data management table is set in the index data management pointer that is the search start position in a temporary storage area. With that, the initialization processing noted above is finished.

Next, proceeding to step S1203, the index data management table entry pointed to by the index data pointer for the search start position is extracted, and in step S1204, a determination is made whether the setting indicator for the extracted entry shows "Exists". If the setting indicator shows "Exists", processing proceeds to step S1205 and if the setting indicator does not show "Exists", processing is terminated because all of the searches have finished.

At step S1205, the index data pointer for the entry extracted at step S1203 is extracted, and the code ID range table and next code ID table stored in the index data storage area pointed to by the index data pointer are obtained. This obtaining of the code ID range table and next code ID table can be realized by storing pointers showing their starting addresses at the time that the code ID range table and next code ID table are stored in their storage areas in step S1103 shown in FIG. 11A and step S1141 shown in FIG. 11C, and then using those pointers.

Next in step S1206, the head code of the entry extracted in step S1203 is extracted. Then at step S1207 a head code ID is extracted from the code ID range table pointed to by the head code, and is set in the search start position head code ID.

Next in step S1208, that code string block is searched based on the code ID range table entry extracted at step S1205 and the next code ID table. Details of the processing in step S1208 are described below referencing FIG. 13A and FIG. 13B.

Next at step S1209, the position of the next entry in the index data management table is set in index management data pointer for the search start position, and processing returns to step S1203.

The processing loop of the above steps S1203 to S1209 is repeated, while updating the index management data pointer for the search start position in step S1209, until the determination in step S1204 is that the setting indicator of an entry in the index data management table is not "Exists."

Also because there are cases wherein the comparison of each single code spans from the code string block from which the search starts to the next code string block, as was noted above, both the setting processing of the index management data pointer for the search start position in steps S1202 and S1209 and the setting processing for the head code ID save the index data management pointer and the head code ID related to the code string block from which the search starts. This head code ID, as is described referencing FIG. 14A below, is used in the determination whether to proceed to a comparison of a code in the next code string block after the code comparison reaches the end of the current code string block.

Next details of the search processing in step S1208 shown in FIG. 12 are described referencing FIG. 13A and FIG. 13B.

FIG. 13A is a drawing describing the processing flow of the prior stage of a code string search that makes a given code string block the search start position of a code string block in the embodiment 2 of this invention.

First, in step S1301, the search code string head position is set in the search start position, and at step S1302, the tail position of the search code string is set in the search tail position.

Next, at step S1303, a search code is extracted from the search code string pointed to by the search head position and is set in the search code for the search head position. At step S1304, the setting indicator is extracted from the code ID range table entry pointed to by the search code at the search head position, and a determination is made whether the setting indicator extracted at step S1305 is "Exists".

If the setting indicator is not "Exists", because this means that a search code in the search code string does not exist in the search target code string, search processing is terminated.

If the result of the determination in step S1305 is that the setting indicator shows "Exists", processing proceeds to step S1306, wherein the head code ID is extracted from the code ID range table pointed to by the search code at the search head position and is set in the search start code ID. Next, at step S1307, the tail code ID is extracted from the code ID range table entry pointed to by the search code in the search head position and is set in the search termination code position.

The processing at step S1306 is a processing wherein the search start code ID, which is a code ID during the processing in the above noted processing loop for each of the code IDs for that head code in the search code string, is initialized with the head code ID for a code ID range, and the processing of step S1307 is a processing wherein the end of the code IDs subject to processing can be identified.

Following step S1307, processing proceeds to step S1311 shown in FIG. 13B.

FIG. 13B is a drawing describing the processing flow of the latter stage of a code string search that makes a given code string block the search start position in the embodiment 2 of this invention.

At step S1311, the search head position set at step S1301 is set in the current search position. The current search position shows the code position of the code that is the target of verification in the loop that verifies the code string block for each code in the search code string shown in the above noted FIG. 14A and so forth, and, at step S1311, is initialized with the search head position, that is in the head position of the search code string.

Next in step S1312, the index data management pointer of the search start position set in step S1202 shown in FIG. 12 is set in the index data management pointer, and at step S1313, the head code ID at the search start position set at step S1207 shown in FIG. 12 is set in the head code ID, which is in a temporary storage area. Also in step S1314 the search start code ID is saved and processing proceeds to step S1315.

Here, the search start code ID is saved because, as was noted above, there is a possibility that the code string verification in the processing in step S1315 can span a plurality of code string blocks. In that case the processing of FIG. 14A and so forth is called recursively, and at that time there is a possibility that the search start code ID might be changed in the head code ID of the code ID range table pointed to by the code at the head of the next code string block (the table corresponding to the next code string block).

Next, at step S1315, as was noted above, a search is performed by means of a verification of each code from the leading code of the search code string to its last code for each of the codes in the code string block. Then whether the search was a success or a failure is reported back. The details of step S1315 are described below referencing FIG. 14A for a full match search, FIG. 14B for a prefix match search, and FIG. 14C for search processing including an any-code.

Next in step S1316 the search start code ID saved at step S1314 is restored. Then in step S1317, an entry in the index data management table pointed to by the index data management pointer for the search start position is extracted and, at step S1318, the code ID range table and the next code ID table stored in the index data storage area pointed by the index data pointer of the extracted entry are acquired. As was noted above, there is a possibility that the code string verification in the processing in step S1315 can span a plurality of code string blocks, and, in that case, because the code ID range table and next code ID table being used may be different than the code ID range table and next code ID table acquired at step S1205 shown in FIG. 12, the processing of steps S1317 and S1318 once again acquire the code ID range table and next code ID table using the index data management pointer for the search start position set in step S1202 or step S1207 shown in FIG. 12.

Next, proceeding to step S1319, a determination is made whether the search in step S1315 is a success or a failure. If it is a failure, processing proceeds to step S1321, and if it is a success, at step S1320 a code position is extracted from the next code ID table entry pointed to by the search start code ID, and the position of the search result code position is output, and processing proceeds to step S1321.

At step S1321, a determination is made whether the search start code ID coincides with the search termination code ID. If they do not coincide, at step S1322 the search start code ID is updated with the next code ID and a return is made to step S1311.

If the search start code ID coincides with the search termination code ID, a return is made to the processing shown in FIG. 12 because the search has been completed for the range of code IDs in the code ID range table pointed to by the head code of the search code string in the code string block currently being processed.

Figure 14B:
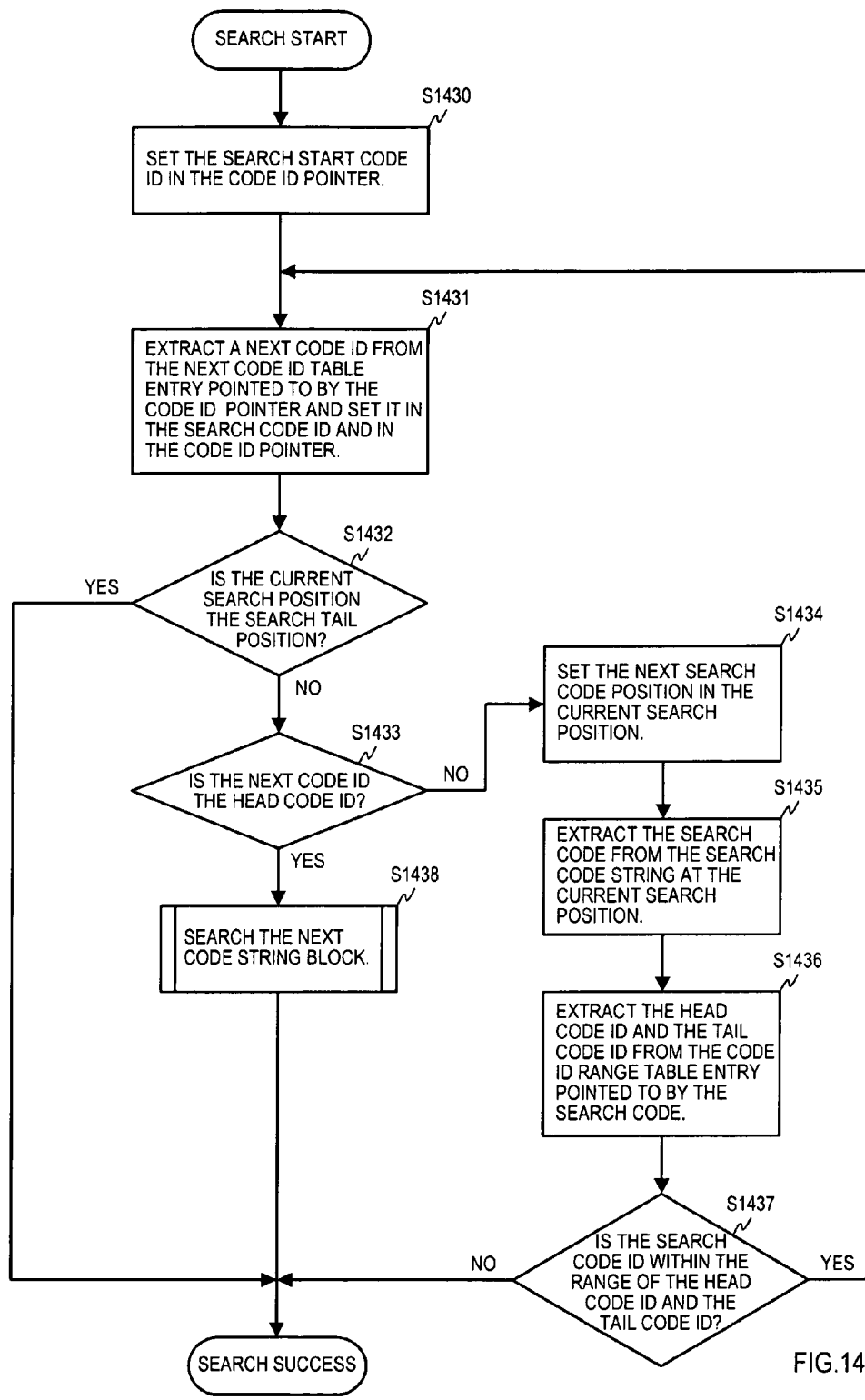
FIG. 14B is a drawing describing the flow for a prefix match search in an embodiment 2 of this invention.
Figure 14C:
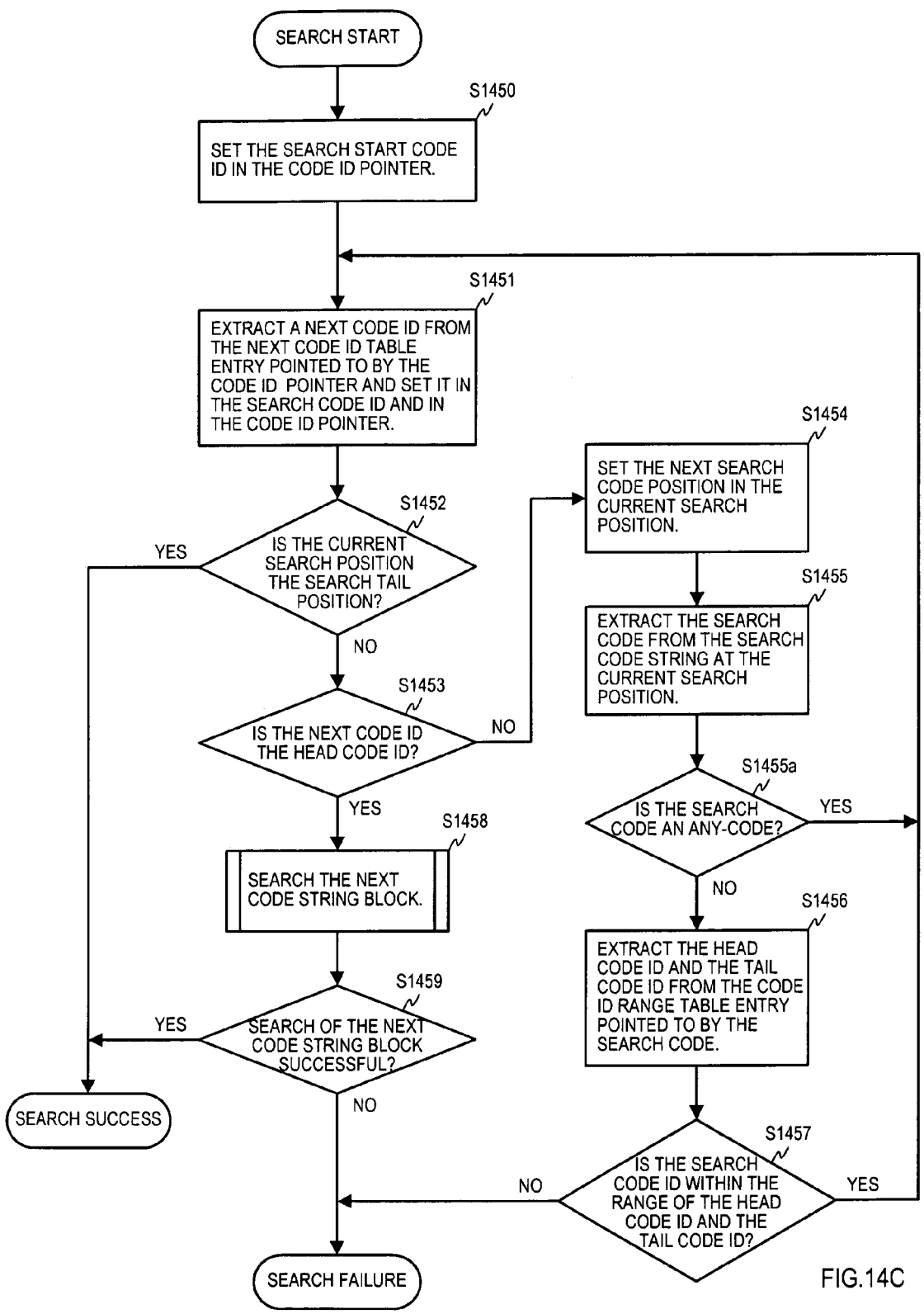
FIG. 14C is a drawing describing the flow of a search that includes an any-code in an embodiment 2 of this invention.

Next, details of the processing of step S1315 shown in FIG. 13B are described referencing FIG. 14A, FIG. 14B, and FIG. 14C. As was noted above, depending on whether the search mode is a full match search or a prefix match search or a search including an any-code, the processing in step S1315 becomes that exemplified in either FIG. 14A, FIG. 14B, or FIG. 14C.

FIG. 14A is a drawing describing the processing flow for a full match search in the embodiment 2 of this invention.

As shown in the drawing, at step S1410, the search start code ID is set in the code ID pointer. This search start code ID is either the ID initialized at step S1306 shown in FIG. 13A or the ID updated and set in step S1322 shown in FIG. 13B. Next, at step S1411, a next code ID is extracted from the next code ID table entry pointed to by the code ID pointer and is set in the search code ID and in the code ID pointer.

Next, at step S1412, a determination is made whether the current search position is the search tail position, and if it is not at the search tail position, processing proceeds to step S1413, and if it is at the search tail position, because the verification for each of the codes has succeeded up to the tail of the search code string, "search success" is returned and processing returns to the processing loop shown in FIG. 13B.

At step S1413, a determination is made whether the next code ID extracted at step S1411 coincides with the head code ID. The head code ID is the ID set at step S1313 shown in FIG. 13B. If the next code ID and head code ID don't coincide, processing proceeds to step S1414, wherein the current search position is advanced to the position of the next search code in the search code string, and at step S1415, the search code is extracted from the search code string pointed to by the current search position, and at step S1416, the head code ID and the tail code ID are extracted from the code ID range table entry pointed to by the extracted search code.

Then in step S1417, a determination is made whether the search code ID set in step S1411 is within the range of the head code ID and tail code ID extracted in step S1416, and if it is within that range, processing returns to step S1411, and if it is not within that range, because a code exists that cannot be verified, "search fail" is returned and processing returns to the processing loop shown in FIG. 13B.

Conversely, at step S1413, when the determination is that the next code ID and the head code ID coincide, processing proceeds to step S1418, and the next code string block is searched. Details of the processing in step S1418 are described hereinafter referencing FIG. 15A and FIG. 15B.

Next, in step S1419, a determination is made whether the search of the next code string block is a success. If it is a success, "search success" is returned, and if it is not a success, "search failure" is returned, and a return is made to the processing loop shown in FIG. 13B.

FIG. 14B is a drawing describing the processing flow of prefix match searches in the embodiment 2 of this invention. Comparing this processing with the processing flow of the full match search shown in FIG. 14A, the processing itself executed in each step of step S1430 to step S1438 shown in FIG. 14B is the same as the processing executed in each step from step S1410 to step S1418 shown in FIG. 14A, where the value 20 is subtracted from each step number in FIG. 14B.

However, instead of a return to the processing shown in FIG. 13B with the return of "search failure" when the determination at step S1417 is that the search code ID is not within the range of the head code ID and tail code ID, even if a determination at step S1437 of the prefix match search shown in FIG. 14B is that the search code ID is not within the range of the head code ID and ID tail code, "search success" is returned and a return is made to the processing loop shown in FIG. 13B.

Also in step S1431, in addition to the next code IDs, code positions can be also successively extracted and set aside from the entries in the next code ID table pointed to by the code ID pointers, and, when a determination is made in step S1437 that the search code ID is not within the range of the head code ID and the tail code ID, the code position last extracted at step S1431 and "search success" can both be returned as search results.

This last extracted code position is the code position included in the same entry in the next code ID table as the next code ID which is the search code ID when the determination is negative in the above step S1437, and, saying it differently, is the code position held in the entry of the next code ID table pointed to by the last search code ID for the last positive determination in step S1437.

Thus the codes in the search target code string coincide with the search codes in the search code string up until this code position. By outputting at step S1320 shown in FIG. 13B the above last extracted code position and the code position extracted from the next code ID table entry pointed to by the search start code as search result code positions, it becomes possible to know a range of code positions in the search target code string wherein the codes have a prefix match with the search code string.

Also instead of making a determination, at step S1419 in the full match search shown in FIG. 14A, whether the next block search is a success after the search of the next code string block at step S1418, and if it is a success, returning "search success," and if it is not a success, returning "search failure", and making a return to the processing loop shown in FIG. 13B, in the prefix match search shown in FIG. 14B, after the search of the next code string block at step S1438, "search success" is immediately returned and a return is made to the processing loop shown in FIG. 13B.

This means that the head search code in the search code string is guaranteed to exist in the search target code string by the determination processing of step S1305 shown in FIG. 13A, and thus, because there is a prefix match between at least the head code of the search code string and the search target code string, "search success" is returned and a return is made to the processing loop shown in FIG. 13B.

Because the processing, other than the processing of the return type after the determination in the above noted step S1437 and the processing of step S1438 and below, is completely the same as that shown in FIG. 14A, as was noted above, the description of that processing is omitted.

FIG. 14C is a drawing describing the flow of a search that includes an any-code in the embodiment 2 of this invention. Here, "any-code" is a code that makes any code in the search target code string acceptable as a match. If a search code string includes an any-code and a code string matching all the codes except the any-code exists in the search target code string, then that search target code string is a hit for the search code string that includes the any-code.

When the flow shown in FIG. 14C is compared with the processing flow for performing the full match search shown in FIG. 14A, the processing executed in each step of steps S1450 to S1459 shown in FIG. 14C (with 40 subtracted from those step numbers) is exactly the same as the processing executed in each step of steps S1410 to S1419 shown in FIG.

14A except for the insertion of the processing of step S1455a between steps S1455 and S1456.

At step S1455a, a determination is made whether the search code extracted at step S1455 is an any-code. When the determination at step S1455a is that of an any-code, processing returns to step S1451 and does not pass through the code ID range determination processing of step S1456 and step S1457. If the determination at step S1455a is not that of an any-code, processing proceeds to step S1456.

Because, as was noted above, all of the processing is the same as that shown in FIG. 14A except for the determination processing of the above step S1455a, that description is omitted.

Next details of the search processing of the next code string block of step S1418 shown in FIG. 14A, step S1438 shown in FIG. 14B, and step S1458, shown in FIG. 14C, is described.

FIG. 15A is a drawing describing the processing flow of the prior stage of a search for the next code string block in the embodiment 2 of this invention.

As shown in the drawing, at step S1501, the position of the next entry in the index data management table is set in the index data management pointer. At this time, the index data management pointer for the search start position has been set in step S1312 shown in FIG. 13B. Next proceeding to step S1502 the entry in the index data management table pointed to by the index data management pointer is extracted, and in step S1503 a determination is made whether the setting indicator for the entry shows "Exists."

If the setting indicator is "Exists", processing proceeds to step S1504, and if the setting indicator is not "Exists", the comparison of every single code is aborted because no more code string blocks exist, and "search failure" is returned and processing returns to the processing shown in FIG. 14A, FIG. 14B, or FIG. 14C.

Conversely, if the determination in step S1503 is that the setting indicator for the entry shows "Exists", when processing proceeds to step S1504, the head code of the entry in the index management table extracted in step S1502 is extracted and is set in the temporary storage area. Next, at step S1505, the current search position is advanced to the position of the next search code in the search code string, and at step S1506, the search code is extracted from the search code string pointed by the current search position, and processing proceeds to step S1507.

At step S1507 a determination is made whether the head code set at step S1504 coincides with the search code extracted at step S1506. This determination is a comparison between the code in the head position in the next code string block and the code at the current search position in the search code string. If the result of this determination is negative, "search failure" is returned and processing returns to the processing shown in FIG. 14A, FIG. 14B, or FIG. 14C. Conversely, if the result of this determination at step S1507 is positive, processing proceeds to the processing in step S1511 and thereafter shown in FIG. 15B, and the comparison of every single code continues.

FIG. 15B is a drawing describing the processing flow of the latter stage of a search for the next code string block in the embodiment 2 of this invention.

At step S1511 a code ID range table and next code ID table stored in the index data storage area pointed to by the index data pointer of the entry previously extracted at step S1502 shown in FIG. 15A.

Next, at step S1512, the head code ID is extracted from the code ID range table entry pointed to by the head code set in step S1504 and is set in the head code ID, which is in the temporary storage area, and at step S1513 the head code ID is set in the search start code ID and processing proceeds to step S1514.

At step S1514, the processing shown in FIG. 14A, FIG. 14B, or FIG. 14C is recursively called out, and a search is performed by comparing each code in the code string block with every single code in the search code string from its head code to its tail code. Then whether the search is a success or a failure is reported.

At step S1515, if the search at step S1514 is successful, "search success" is returned, and if the search at step S1514 is a failure, "search failure" is returned, and processing returns to the processing shown in FIG. 14A, FIG. 14B, or FIG. 14C.

Hereinabove, details of the embodiment 2 of this invention were described. Hereinbelow, in order to facilitate an understanding of this embodiment 2, the flow of processing in a full match search, which is one of the code string searches in the embodiment 2 of this invention, is described referencing FIG. 16A to FIG. 16C. In the examples shown in FIG. 16A to FIG. 16C, the search target code string is taken as that of the code string blocks up to the second block shown in FIG. 9A, and the search code string is taken as "ABC". Hereinafter, that search target code string is taken to be that expressed in the search target code string 10b, just as is shown in FIG. 9A.

Figure 16A:
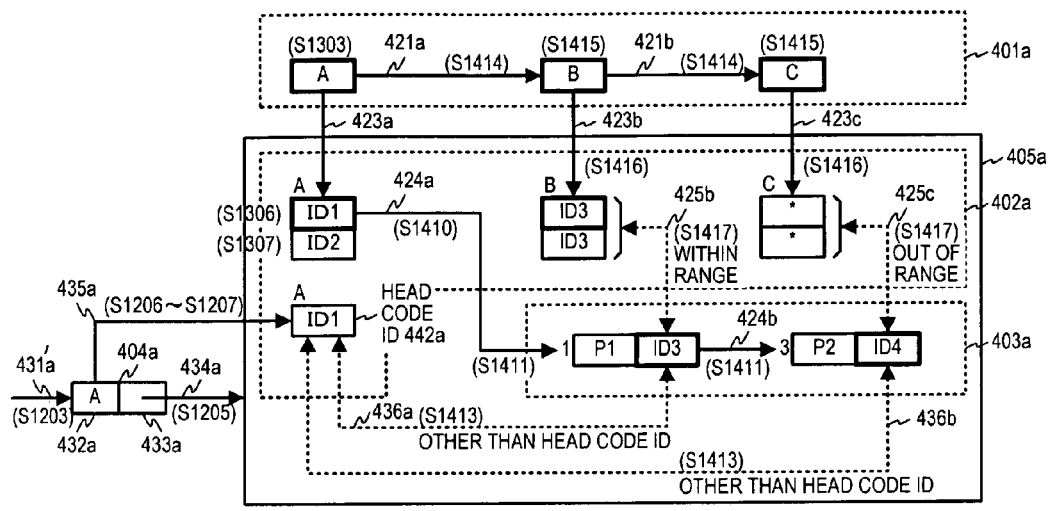
FIG. 16A is a drawing describing the flow of the search processing from the head code string block in an embodiment 2 of this invention.
Figure 16B:
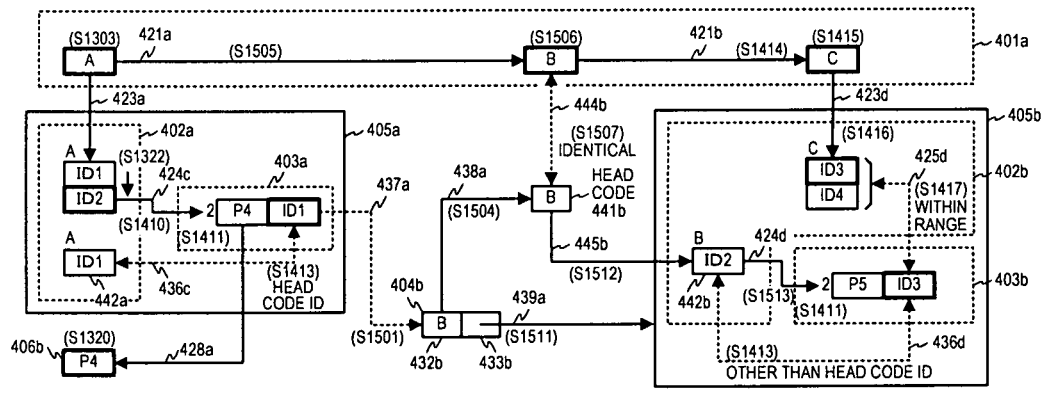
FIG. 16B is a drawing describing the flow of the transition to a search in the next code string block in an embodiment 2 of this invention.

FIG. 16A and FIG. 16B are drawings describing the flow of processing from the head code string block of a search target code string, and, regarding the outermost processing loop shown in FIG. 12, is equivalent to the first processing loop.

FIG. 16A describes the flow of a search that takes as its target the head code string block among all the code string blocks.

The block to which the reference numeral 401a is affixed delineates the flow of the processing of each of the search codes in the search code string ABC from its head. In other words, block 401a shows the changes in the code at the current search position. The block enclosed in a dotted line to which the reference numeral 402a is affixed delineates the code ID range in the code ID range table 309a entry pointed to by the code at the current search position and ID 1, which is the head code ID in the code ID range table 309a entry pointed to by code A, which is at the head position in the code string block. The block to which the reference numeral 403a is affixed delineates the flow of obtaining in sequence next codes from the next code ID table 310.

Also, the step reference numbers enclosed in parentheses indicate processing steps shown in FIG. 12 to FIG. 15B that are related to the flow of processing shown in the drawing.

For the processing before a search starts, as shown by the arrow 431a in the drawing, at step S1203 in FIG. 12 (in the description hereinafter the notation of the figure number is omitted) the head entry 404a in the index data management table is extracted. Then, as shown by arrow 434a, at step S1205, the code ID range table 309a and next code ID table 310a stored in the index data storage area 405a are extracted based on the index data pointer 433a for that entry. Then, as shown by arrow 435a, at steps S1206 and S1207, entry 309a (A) in the code ID range table 309a that corresponds to the code A stored in the head code 432a of entry 404a is read out, and ID 1, which is the head code ID, is read out and is set in the head code ID 442a.

First, as shown in 401a, the code A located at the head of the search code is extracted at step S1303 and, as shown by the arrow 423a to 402a, ID 1, which is the head code ID in the code ID range table entry pointed to by code A, is extracted at step S1306 and is set in the search start code ID. And ID 1, which is the tail code, is extracted at step S1307 and set in the search termination code ID.

Next, as shown by the arrow 424*a* from ID1 in block 402*a* to block 403*a*, ID 3, which is the next code ID in the next code ID table 310 entry pointed to by ID 1, is extracted at step S1410 and step S1411. Then, as shown by the bi-directional dotted-line arrow 436*a* between ID 3, which is the next code ID in the next code ID table 310 entry pointed to by ID 1 in block 403*a*, and head code ID 442*a* in block 402*a*, in step S1413, a determination is made that ID 3, which is the next code ID, is different than ID 1, which is the head code ID.

Hence, as shown by the arrow 421*a* to the codes from A to B in 401*a*, at step S1417 the code at the next code position becomes the target of processing, and at step S1415 code B is extracted. As shown by the arrow 423*b* to 402*a*, ID 3, which is the head code ID for the code ID range table 309 entry pointed to by code B, and ID 3, which is the tail code ID, are extracted as the code ID range.

Then, as shown by the bi-directional dotted-line arrow 425*b* between ID 4, which is the next code ID in the next code ID table 310 entry pointed to by ID 1 in 403*a* and the range in the code ID range table 309 pointed to by code B in 402*a*, in step S1417, a determination is made that ID 4, which is the next code ID in the next code ID table 310 entry pointed to by ID 1, is within the code ID range in the code ID range table 309 entry pointed to by code B.

Hence, next, as shown by the arrow 424*b* in 403*a*, ID 8, which is the next code ID in the next code ID table 310 entry pointed to by ID 4, is extracted at step S1411. Then, as shown by the bi-directional dotted-line arrow 436*b* between ID 4, which is the next code ID in the next code ID table 310*a* entry pointed to by ID 3 in block 403*a*, and head code ID 442*a* in block 402*a*, in step S1413 a determination is made that ID 4, which is the next code ID, is different than ID 1, which is the head code ID.

Furthermore, as shown by the arrow 421*b* from code B to code C in 401*a*, at step S1414, the code at the next code position becomes the target of processing and at step S1415 the code C is extracted. As shown by the arrow 423*c* to 402*a*, at step S1416, ID *, which is the head code ID in the code ID range table 309 entry pointed to by code C, and ID *, which is its tail code, are extracted as the code ID range. However, as shown in the drawing, because code C does not exist in the head code string block, and a significant code ID is not stored in the head code ID and tail code ID (the IDs are set as "undefined" at step S1128*a* shown in FIG. 11B), the determination at step S1413 shown by bi-directional dotted-line arrow 425*c* is that the next code ID is outside the code range, and the search fails. At that point, "search failure" is returned and processing returns to the processing loop shown in FIG. 13B.

In other words, this shows that the code string starting from the code A for which the code ID is ID 1 in search target code string 10*a* does not match the search code string ABC. This code string from the code A for which the code ID is ID 1 in search target code string 10*a* is ABE, as shown in FIG. 9A, and thus does not match ABC.

FIG. 16B shows the flow of a search wherein ID 2, which is the next code ID after the ID 1 of code A, is made the search start code ID for the search code string ABC at step S1322. The processing loop shown in FIG. 13B consists of the first time processing shown in FIG. 16A and the second time processing shown in FIG. 16B.

Then, in this second time processing, the comparison between the search target code string and the search code string spans across to the next code string block after the head code string block.

As shown by the arrow in block 402*a* of FIG. 10B, in the processing loop of step S1322 shown in FIG. 13B, the search start code ID is updated from ID 1 to ID 2. Then, as shown by the arrow 424*c* from ID 2 of block 402*a* to block 403*a*, ID 1, which is the next code ID in the next code ID table 310*a* entry pointed to by ID 2, is extracted by step S1410 and step S1411. Also, as shown by the bi-directional dotted-line arrow 436*c* between ID 1, which is the next code ID in the next code ID table 310 entry pointed to by ID 2 in block 403*a*, and head code ID 442*a* in block 402*a*, in step S1413, a determination is made that ID 1, which is the next code ID, coincides with ID 1, which is the head code ID.

As a result, as shown by the dotted-line arrow 434*a*, in step S1501, entry 404*b*, which is the next entry in the index data management table after the head entry 404*a*, is extracted. Then, at step S1504, as shown by arrow 438*a* in the drawing, code B, which is stored in head code 432*b* of the entry 404*b*, is set in head code 441*b*.

Also, as shown by the arrow 421*a* from code A to code B in block 401*a*, at step S1505, the code at the next code position becomes the target of processing and at step S1506 the code B, which is the code next after the head code A, is extracted from the search code string. Then, as shown by the bi-directional dotted-line arrow 444*b*, in step S1504, a determination is made that the code B that is the code located next after code A coincides with the code B set in head code 441. Hence, as shown by arrow 439*a* in the drawing, at step S1511, the code ID range table 309*b* and next code ID table 310*b* stored in the index data storage area 405*b* are obtained based on the index data pointer 433*b* of entry 404*b*.

Next, as shown by arrow 445*b*, in step S1512, ID 2, which is the head code ID, is extracted from the code ID range table 309*b* entry pointed to by the code B that was set in the head code 441*b*, and it is set in head code ID 442*b*.

Continuing, as shown by arrow 424*d*, ID 3, which is the next code ID in the next code ID table 310*b* entry pointed to by ID 2, is extracted by the processing of step S1513 and the processing of step S1411 shown in FIG. 14A which is recursively called out. Then, as shown by the bi-directional dotted-line arrow 436*d* between ID 3, which is the next code ID in the next code ID table 310 entry pointed to by ID 2 in block 403*b*, and head code ID 442*b* in block 402*b*, in step S1413, a determination is made that ID 3, which is the next code ID, is different than ID 2, which is the head code ID.

Next, as shown by arrow 421*b* from code B in block 401*a* to code C, at step S1417 the code at the next code position becomes the target of processing, and code B is extracted at step S1415. As shown by arrow 423*d* to block 402*b*, at step S1416, the ID 3 that is the head code ID in the code ID range table 309*b* entry pointed to by code C and the ID 4 that is its tail code are extracted as the code ID range.

Then, as shown by the bi-directional dotted-line arrow 425*b* between ID 3, which is the next code ID in the next code ID table 310*b* entry pointed to by ID 2 in 403*b* and the range in the code ID range table 309*b* entry pointed to by code C in 402*b*, in step S1417, a determination is made that ID 5, which is the next code ID in the next code ID table 310 entry pointed to by ID 2, is within the code ID range in the code ID range table 309*b* entry pointed to by code C.

In other words, this shows that the code string from the code A for which the code ID is ID 2 in search target code string 10*a* matches the search code string ABC. This agrees with the fact that the code string from the code A for which the code ID is ID 2 in search target code string 10*a* is ABC, as shown in FIG. 9A.

Then at step S1320, as shown by arrow 428*a*, the code position P4 for the next code ID table 310*a* entry pointed to by ID 2, which is the search start code ID, is set in the search result code position shown by reference numeral 406*b*.

Then, because ID 2, which is the search start code ID, is the search termination code ID specified in step S1307, the search of the head code string block with that search start position is terminated and a return is made to the processing loop shown in FIG. 12, wherein the search start position is incremented by 1, in other words, a search is performed from the top of the second code string block.

Figure 16C:
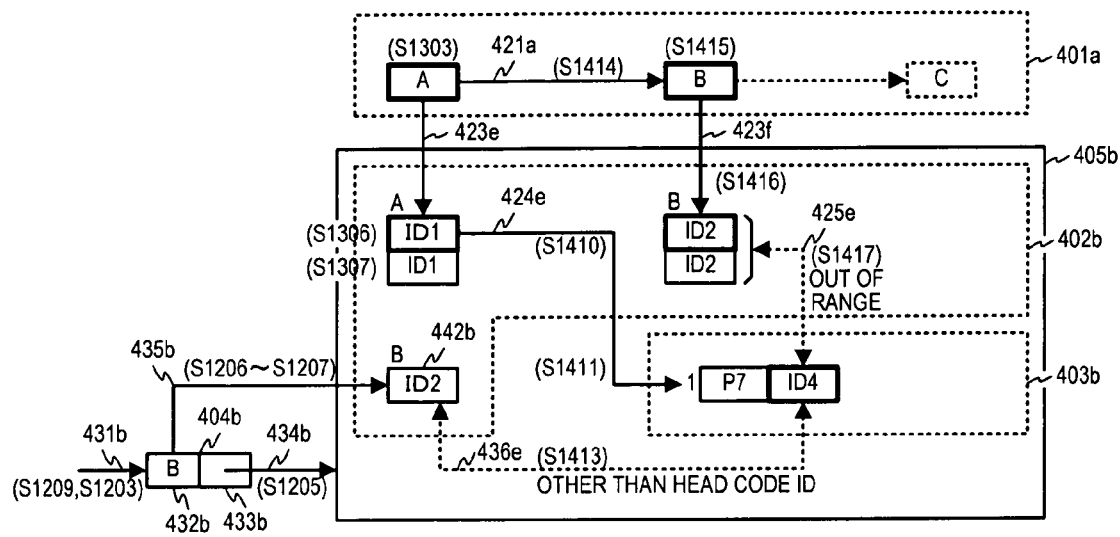
FIG. 16C is a drawing describing the flow of the search processing from the second code string block after the head code string block in an embodiment 2 of this invention.

FIG. 16C is a drawing describing the flow of processing from the second code string block in the search target code string, and, regarding the outermost processing loop shown in FIG. 12, is equivalent to the processing of the second time through the loop. The flow of processing described hereinafter is the same as that described above referencing FIG. 16A. As shown by arrow 431b in the drawing, the value of the index data management pointer for the search start position has been updated in step S1209 in the processing before the start of the search, and at step S1203 the top entry 404b in the index data management table is extracted. Then, as shown by the arrow 434b, at step S1205, based on the index data pointer 433b of that entry, the code ID range table 309b and next code ID table 310b stored in the index data storage area 405b are extracted. Also, as shown by the dotted-line arrow 435b, at steps S1206 and S1207, the entry 309b (B) in code ID range table 309b corresponding to the code B stored in the head code 432b of that entry 404b is read out and ID 2 that is its head code ID is read out and is set in head code ID 442b.

At the beginning of the search from the second code string block in step S1303, the code A, which is located at the head of the search code string, is extracted again, as shown in block 401a. Then, as shown by the arrow 423e to block 402b, the ID 1 that is the head code ID in the entry in code ID range table 309b entry pointed to by code A is extracted at step S1306 and set in the search start code ID. Also, at step S1307 the ID 1 that is the tail code is extracted and set in the search termination code ID.

Next, as shown by arrow 424e from the ID 1 of block 402b to block 403b, ID 4, which is the next code ID in the next code ID table 310 entry pointed to by ID 1, is extracted by steps S1410 and S1411. Then, as shown by the bi-directional dotted-line arrow 436e between ID 4, which is the next code ID in the next code ID table 310 entry pointed to by ID 1 in block 403b, and head code ID 442b in block 402b, in step S1413, a determination is made that ID 3, which is the next code ID, is different than ID 1, which is the head code ID.

As a result, as shown by arrow 421a from code A in block 401a to code B, at step S1417, the code at the next code position becomes the target of processing, and code B is extracted at step S1415. As shown by arrow 423f to block 402b, at step S1416, the ID 2 that is the head code ID in the code ID range table 309b entry pointed to by code B and the ID 2 that is its tail code are extracted as the code ID range.

Then, as shown by the bi-directional dotted-line arrow 436e between ID 4, which is the next code ID in the next code ID table 310b entry pointed to by ID 1 in block 403b, and the code ID range in the code ID range table entry pointed to by code B, in step S1417, a determination is made that ID 4, which is the next code ID in the next code ID table 310b entry pointed to by ID 1, is outside the code ID range in the code ID range table entry pointed to by code B, and the search fails. At that point, "search failure" is returned and processing returns to the processing loop shown in FIG. 13B.

Then, because ID 1, which is the search start code ID, coincides with the search termination code ID, processing becomes terminated by the determination in step S1321 shown in FIG. 13B, and processing again returns to the processing loop shown in FIG. 12, and, in the example shown in FIG. 16A to FIG. 16C, because the search target code string was made to be up to the second code string block, in step S1207 a determination is made that the overall search processing has finished.

Hereinbelow, the embodiment 3 of this invention is described. However, because an index data structure in the embodiment 3 is similar to that in the embodiment 2 of this invention, descriptions concerning the index data structure, creation of the index data structure, and so on are omitted.

Figure 17:
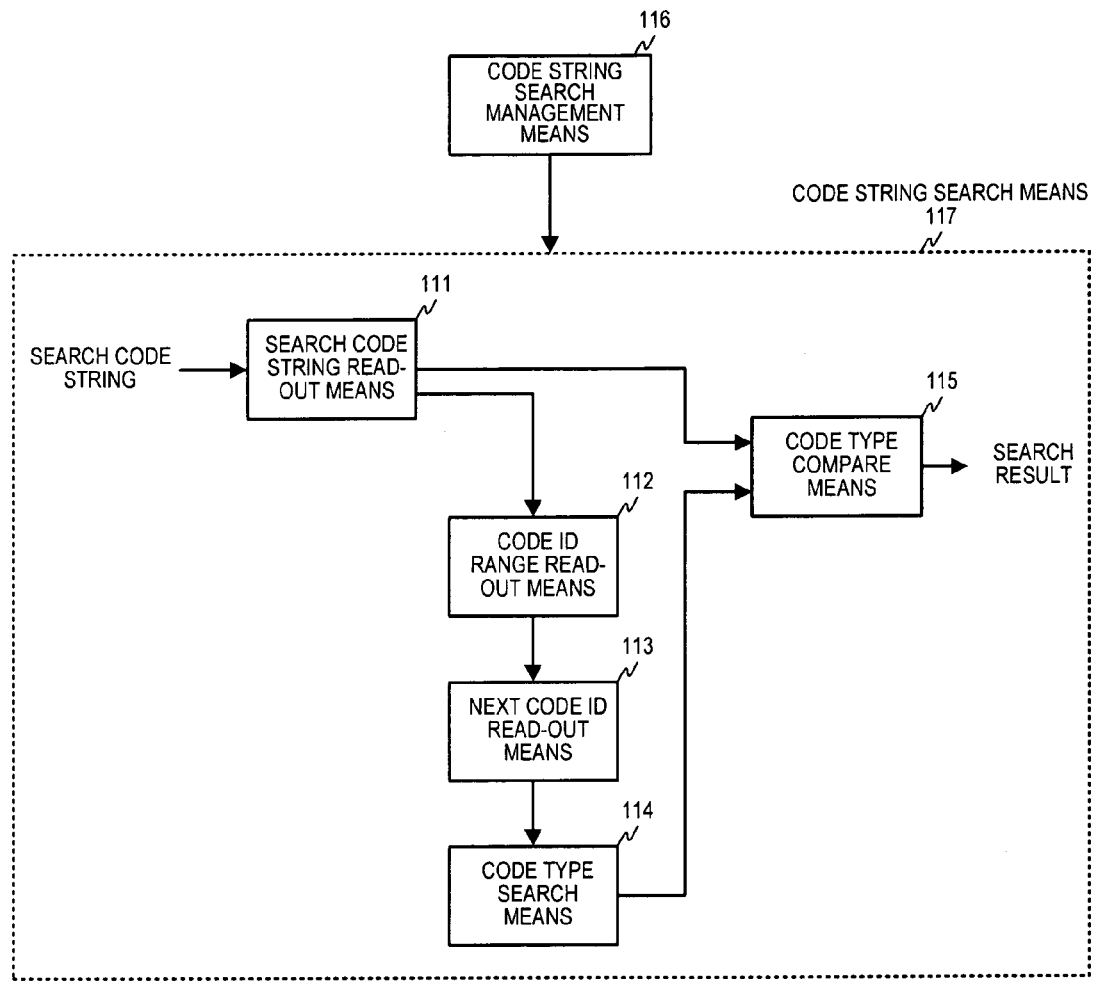
FIG. 17 is a drawing describing function blocks for performing a code string search in an embodiment 3 of this invention.

FIG. 17 is a drawing describing function blocks for performing a code string search in the embodiment 3 of this invention. As noted above, description of function blocks for creating the data structure for an index in the embodiment 3 is omitted.

Code string search management means 116 manages the search, by code string search means 117, for each code string block in the search target code string. Code string search means 117 includes search code string read-out means 111, code ID range read-out means 112, next code ID read-out means 113, code type search means 114, and code ID verify means 115.

First, a search code string is read out by search code string read-out means 111 and is passed to the code ID range read-out means 112. The code ID range read-out means 112 reads out the range of the code IDs for the head code passed from search code string read-out means 111 using the code ID range table created by the code ID range table creation means 102, and passes them to the next code ID read-out means 113.

The next code ID read-out means 113 reads out the next code ID stored in association with a code ID included in the code ID range of the leading code in the search code string passed by the code ID range read-out means 112 from the next code ID table created by the next code ID table creation means 103 and at the same time successively reads out from the next code ID table a next code ID stored in correspondence with that next code and passes it to the code type search means 114. The code type search means 114 uses the code ID range table to search for a code type included in the range for the next code passed from the next code ID read-out means 113 and passes it to the code type verify means 115. The code type verify means 115 compares the code type read out by the search code string read-out means 111 with the code type found by the code type search means 114 and outputs the search result.

Next, a code string search in the embodiment 3 of this invention is described. The descriptions for an exemplary hardware configuration and an index data structure in the embodiment 3 of this invention are omitted for the above noted reason.

Figure 18:
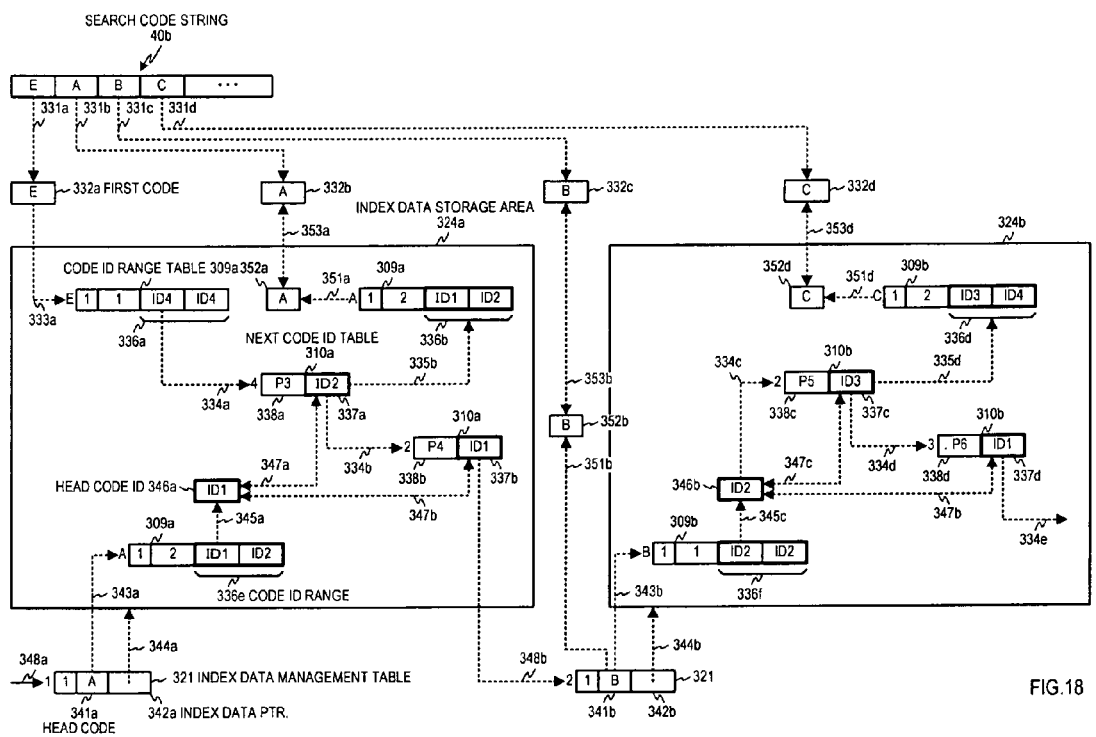
FIG. 18 is a drawing describing conceptually a code string search in an embodiment 3 of this invention.

FIG. 18 is a drawing describing conceptually a code string search in the embodiment 3 of this invention.

The search target code string is taken to be search target code string 10b shown in FIG. 9A, and it is taken to be partitioned into the code string blocks shown in FIG. 9A. Also a search code string is described conceptually by the search code string 40b shown in FIG. 18. Code ID range tables 309 and next code ID tables 310 are taken to be created corresponding to the code string blocks of the search target code string, and index data management table 321 is also taken to be created.

Before starting a search, the head entry 321 (1) of the index data management table shown by arrow 348a is read out, and, as shown by the arrow with a dotted line 344a, code ID range table 309a and next code ID table 310a stored in index data storage area 324a are obtained by index data pointer 342a. Furthermore, as shown by the dotted-line arrow 343a, entry 309a (A) of the code ID range table 309a corresponding to the code A stored in the head code 341a is read out, and, as shown by the arrow with a dotted line 345*a*, ID 1, which is the head code ID, is read out, and is set in the head code ID 346*a* in a temporary storage area.

As shown in the drawing, code E, code A, code B, and code C are located in search code string 40*b*, starting from its head. Then as shown in the drawing by dotted-line arrow 331*a*, code E, which is the first code, code 332*a*, is read out. Next, as shown by dotted-line arrow 333*a*, entry 309*a* (E) corresponding to code E in code ID range table 309*a* corresponding to the head code string block is read out. (If the head code of search code string 40*b* does not exist in the head code string block, processing skips to the index data associated with a code string block wherein the head code exists.)

Then, as shown by dotted-line arrow 334*a*, the code ID included in ID range 336*a*, in the example in the drawing, ID 4, is read out from entry 309*a* (E), and entry 310*a* (4) corresponding to the read out code ID 4 is read out from next code ID table 310.

Also, code ID1, which is the head code ID set in the entry of the code ID range table 309*a* pointed to by a code type of code A located in the head position of the leading code string block, is set in head code ID 346*a* in a temporary storage area.

Then as shown by the bi-directional dotted-line arrow 347*a*, ID 2, which is the next code ID in entry 310*a* (4) corresponding to code ID 4, and ID 1, which is set in head code ID 346*a* are compared and a determination is made that the next code ID is other than the head code ID.

As a result, next, as shown by dotted-line arrow 331*b*, code A, which is the second code, code 332*b*, is read out. Also, as shown by the bi-directional dotted-line arrow 335*b*, a determination is made that ID 2, which is next code ID 337*a* of entry 310*a* (4) that corresponds to code ID 4 in next code ID table 310*a*, is included in the code ID range 336*b* (ID 1 to ID 2) pointed to by code A in code ID range table 309*a*. As shown by dotted-line arrow 351*a* in the drawing, the code A (hereinafter this may be called the index code) pointed to by the entry in code ID range table 309*a* that includes in its code ID range ID 2, which is the next code ID 337*a*, is set in temporary storage area 352*a* and as shown by the bi-directional dotted-line arrow 333*a* a determination is made that the code A that is the index code set in temporary storage area 352*a* is identical to the code A that is the second code 332*b*. This means that the sequence code E-A exists in the head code string block in search target code string 10*a*. Also, because the code position 338*a* of entry 310*a* (4), which corresponds to code ID 4 read out from next code ID table 310*a*, is P3, it can be understood that the leading position of the code sequence E-A is P3.

Furthermore, as shown by dotted-line arrow 334*b*, ID 1, which is the next code ID 337*b* in entry 310*a* (2) corresponding to ID 2 in next code ID 337*a*, is read out. Then as shown by the bi-directional dotted-line arrow 347*b*, a comparison is made between the read-out ID 1 and the ID 1 set previously in the head code ID 346*a*, and a determination is made whether the next code ID coincides with the head code ID. In other words, a determination is made that the code A whose code ID is ID 2 and which is included in the head code string block and coincides with the code A, which is the second code 332*b* in the search code string, is located in the tail position of the head code string block.

Then, entry 321 (2), which is the second entry in the index data management table shown by dotted-line arrow 348*b*, is read out, and, as shown by the dotted-line arrow 351*b*, the code B stored in that head code 341*b* is set in temporary storage area 352*b*. Then, as shown by the dotted-line arrow 331*c*, when code B is read out as the third code 332*c*, a determination is made whether it coincides with the code set in the temporary storage area 352*b*, as shown by the bi-directional dotted-line arrows 353*b*. In other words, a determination is made whether the code B that is the third code 332*c* coincides with the code B that is the head code of the second code string block. In the example in the drawing, an affirmative determination result is obtained. Thus the search target code string 10*a* produces a hit for the search code string EAB.

Then as shown by the dotted-line arrow 344*b*, index storage area 324*b* is accessed by means of the index data pointer 342*b*, and, as shown by the dotted-line arrow 343*b*, entry 309*b* (B) of the code ID range table 309*b* corresponding to the code B stored in the head code 341*b* is read out. As shown by the dotted-line arrow 345*c*, ID 2, which is the head code ID in the range 336*f* for that code ID, is read out and is set in the head code ID 346*b* in a temporary storage area.

Next, as shown by the dotted-line arrow 334*c*, ID 3, which is the next code ID 337*c* in entry 310*b* (2) corresponding to ID 2, which is the head code ID 346*b*, is read out. Then as shown by the bi-directional dotted-line arrow 347*c*, a comparison is done between the read-out ID 3 and the ID 2 set previously in the head code ID 346*b*, and a determination is made that the next code ID is other than the head code ID.

As a result, next, as shown by the next dotted-line arrow 331*d*, code C, which is the fourth code 332*d*, is read out.

Also as shown by the bidirectional dotted-line arrow 335*d*, a determination is made that ID 3, which is next code ID 337*c* of entry 310*b* (2) that corresponds to code ID 2 in next code ID table 310 is included in the code ID range 336*d* (ID 3 to ID 4) in code ID range table 309*b* pointed to by code C. In other words the code that points to an entry in the code ID range table 309*b* entry that includes ID 3 within its range is found to be code C.

Thus it can be understood that search target code string 10*b* produces a hit on the search code string EABC.

Following that determination, as shown by the dotted-line arrow 334*d*, ID 1, which is the next code ID 337*d* in entry 310*b* (3) corresponding to ID 3, which is the next code ID 337*c*, is read out. Then as shown by the bi-directional dotted-line arrow 347*d*, a comparison is done between the read-out ID 1 and the ID 2 set previously in the head code ID 346*b*, and a determination is made that the next code ID does not coincide with the head code ID.

Then because the code position 338*b* of the entry 310*a* (2) corresponding to the code ID 2 read out from next code ID table 310*a* is P4, and the code position 338*c* of the entry 310*b* (2) corresponding to the code ID 2 read out from next code ID table 310*b* is P5, the code position 338*d* of the entry 310*b* (3) corresponding to the code ID 3 is P6, it can be understood that the above noted hit positions are code positions P3, P4, P5, and P6.

Even for the fifth code, not shown in the search code string 40*b*, as shown by the dotted-line arrow 334*e*, the process of reading out the next code ID of the entry in the code ID range table corresponding to ID 1, which is the next code ID 337*d*, and determining whether it is within the ID code range of the entry in the code ID range table 309 pointed to by the code type of the fifth code is repeated.

By doing the above, a code string search according to the embodiment 3 of this invention is implemented.

Because the process for creating index data in the embodiment 3 is similar to those in the embodiment 2, descriptions concerning the process for creating index data in the embodiment 3 are omitted. Therefore, the processing of a code string search in the embodiment 3 is described below, but the description concerning an overview of the code string search processing flow in the embodiment 3 is similar to those in the embodiment 2 as was described above, and only control flows of the innermost loop for full match searches, prefix match searches, and searches including an any-code differ between the embodiment 2 and the embodiment 3 in the code verification process.

Figure 19A:
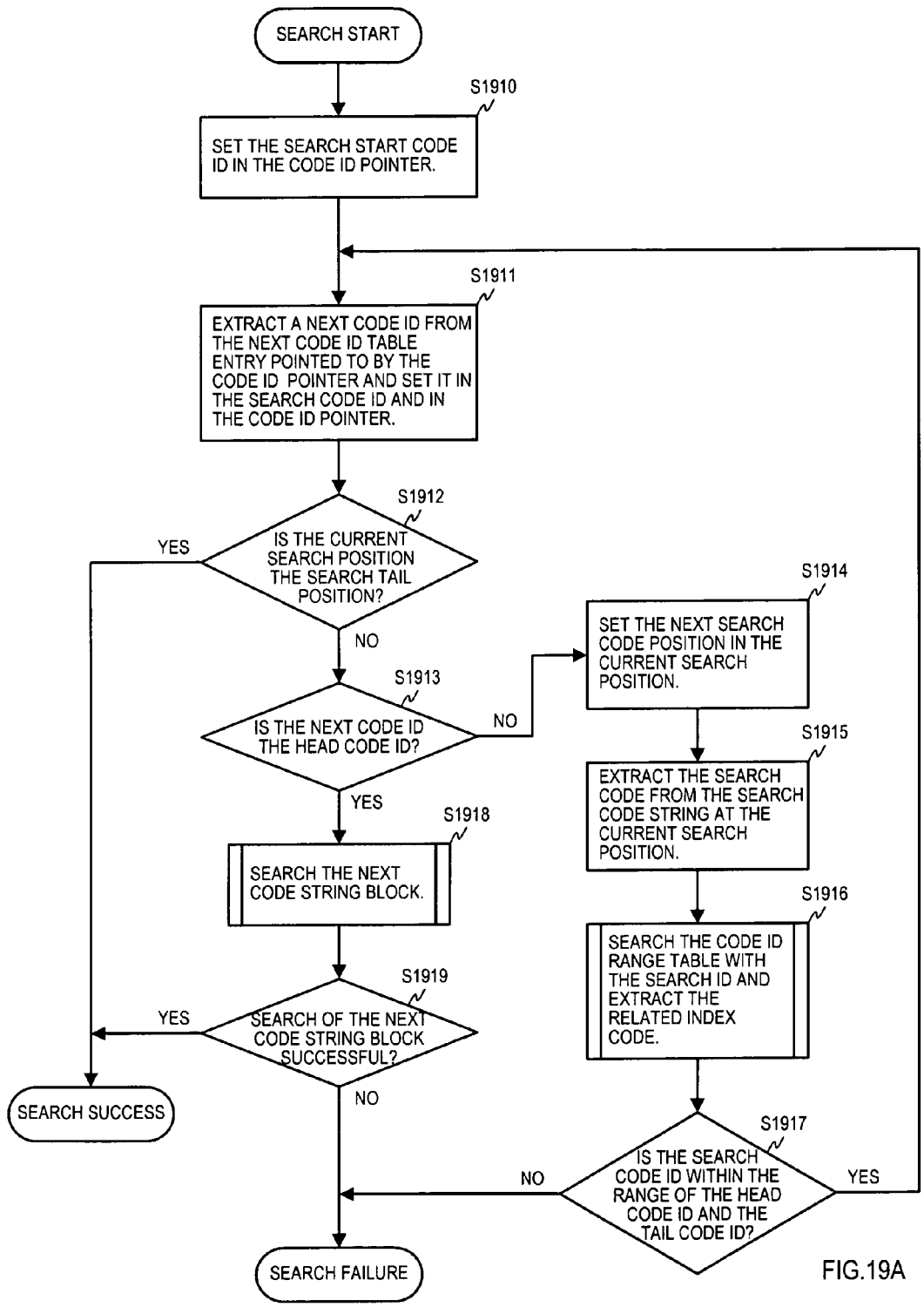
FIG. 19A is a drawing describing the flow of a full match search in an embodiment 3 of this invention.
Figure 19B:
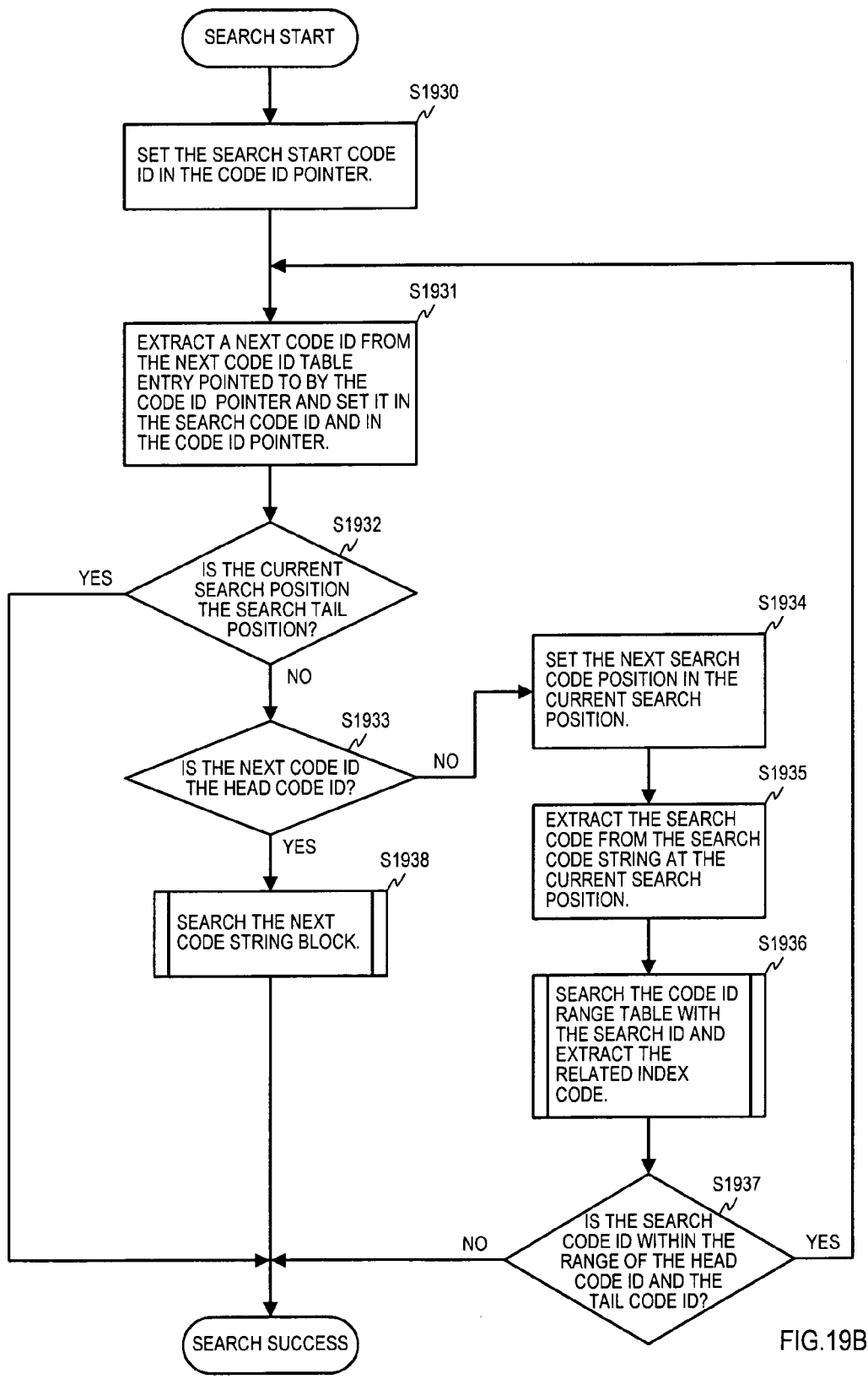
FIG. 19B is a drawing describing the flow for a prefix match search in an embodiment 3 of this invention.
Figure 19C:
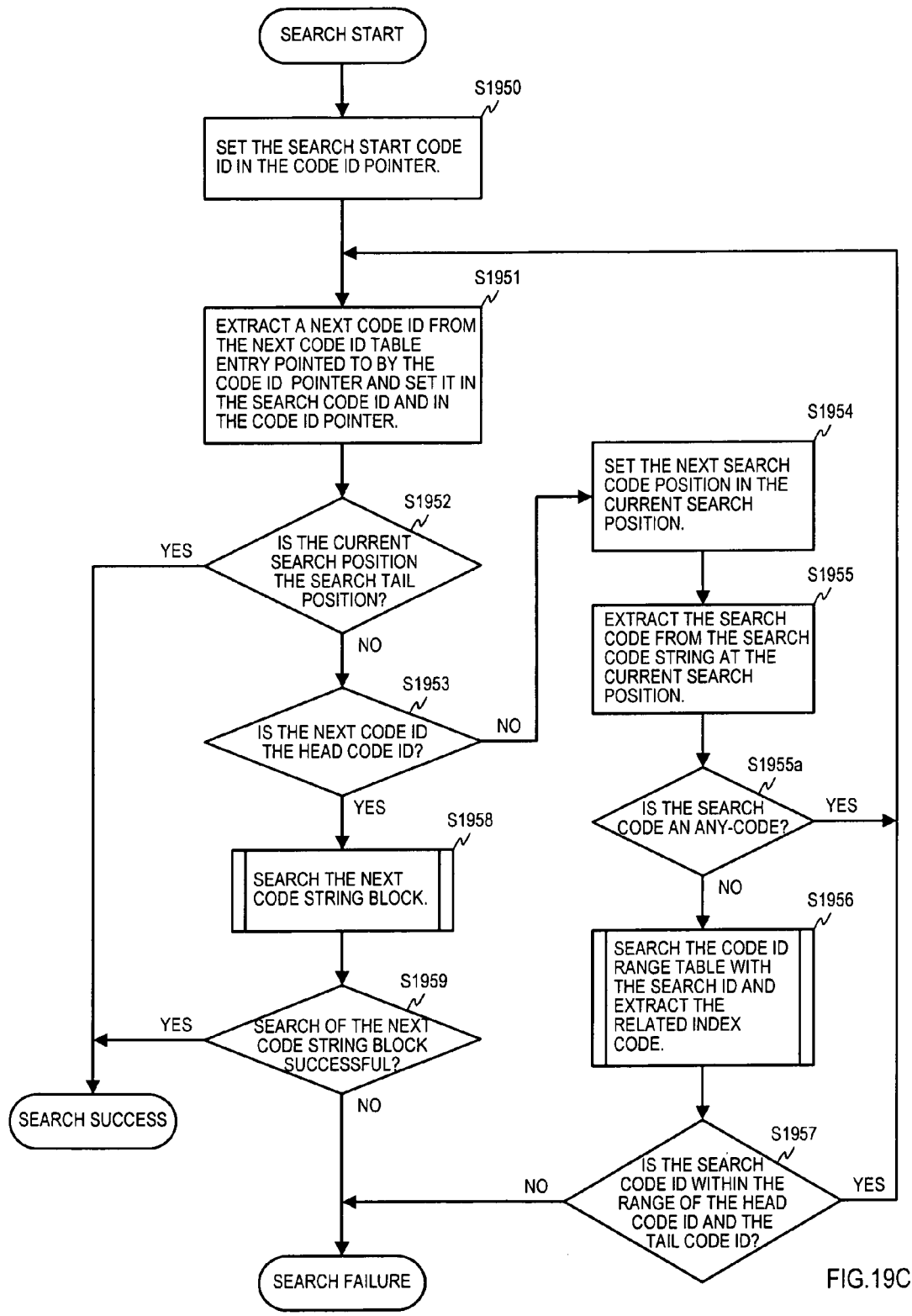
FIG. 19C is a drawing describing the flow of a search that includes an any-code in an embodiment 3 of this invention.

As is described above, next, details of the processing of full match search, prefix match search, and search including an any-code are described referencing FIG. 19A, FIG. 19B, and FIG. 19C, and also FIG. 12 to FIG. 13B, FIG. 15A and FIG. 15B in which the control flows of the next inner loop and the outermost loop and the processing flow of a search for the next code string block are shown.

FIG. 19A is a drawing describing the processing flow for a full match search in the embodiment 3 of this invention.

As shown in the drawing, at step S1910, search start code ID is set in the code ID pointer. This search start code ID is either the ID initialized at step S1306 shown in FIG. 13A or the ID updated and set in step S1322 shown in FIG. 13B. Next, at step S1911, a next code ID is extracted from the next code ID table entry pointed to by the code ID pointer and is set in the search code ID and in the code ID pointer.

Next, at step S1912, a determination is made whether the current search position is the search tail position, and if it is not at the search tail position, processing proceeds to step S1913, and if it is at the search tail position, because the verification for each of the codes has succeeded up to the tail of the search code string, "search success" is returned and processing returns to the processing loop shown in FIG. 13B.

At step S1913, a determination is made whether the next code ID extracted at step S1911 coincides with the head code ID. The head code ID is the ID set at step S1313 shown in FIG. 13B. If the next code ID and head code ID don't coincide, processing proceeds to step S1914, wherein the current search position is advanced to the position of the next search code in the search code string, and at step S1915, the search code is extracted from the position in the search code string pointed to by the current search position, and processing proceeds to step S1916.

At step S1916 the code ID range table is searched using the next code ID and a index code is extracted. Because the index code is that noted in the description referencing FIG. 18 above, it is a code holding the next code ID as a code ID. The next code ID is included within the range of code IDs in the code ID range table entry pointed to by the index code. Details about the processing in step S1916 is explained later referencing FIG. 19D.

Then in step S1917, a determination is made whether the search code ID extracted in step S1915 coincides with the index code extracted in step S1916, and if it coincides, processing returns to step S1911, and if it does not coincide, because a code exists that cannot be verified, "search fail" is returned and processing returns to the processing loop shown in FIG. 13B.

Conversely, at step S1913, when the determination is that the next code ID and the head code ID coincide, processing proceeds to step S1918, and the next code string block is searched. Details of the processing in step S1918 have been described before referencing FIG. 15A and FIG. 15B.

Next, in step S1919, a determination is made whether the search of the next code string block is a success. If it is a success, "search success" is returned, and if it is not a success, "search failure" is returned, and a return is made to the processing loop shown in FIG. 13B.

FIG. 19B is a drawing describing the processing flow of prefix match searches in the embodiment 3 of this invention. Comparing this processing with the processing flow of the full match search shown in FIG. 19A, the processing itself executed in each step of step S1930 to step S1938 shown in FIG. 19B is the same as the processing executed in each step from step S1910 to step S1918 shown in FIG. 19A, where the value 20 is subtracted from each step number in FIG. 19B.

However, instead of the determination that when the search code does not coincide with the index code at step S1917 shown in the full match search shown in FIG. 19A and "search failure" is returned and a return is made to the processing shown in FIG. 13B, even if a determination that the search code does not coincide with the index code at step S1937 of the prefix match search shown in FIG. 19B, "search success" is returned and a return is made to the processing loop shown in FIG. 13B.

Also in step S1931, in addition to the next code IDs, code positions are also successively extracted and set aside using the entries in the next code ID table entry pointed to by the code ID pointers, and, when a determination is made in step S1937 that the search code ID is not within the range of the head code ID and the tail code ID, the code position last extracted at step S1931 and "search success" can both be returned as search results. This last extracted code position is the code position stored in the same entry in the next code ID table as the next code ID which is the next code ID included in the code ID range for the index code. The codes in the search target code string coincide with the search codes in the search code string up until this code position. By outputting at step S1320 shown in FIG. 13B the above last extracted code position and the code position extracted from the next code ID table entry pointed to by the search start code as search result code positions, it becomes possible to know a range of code positions in the search target code string wherein the codes have a prefix match with the search code string.

Also instead of making a determination, at step S1919 in the full match search shown in FIG. 19A, whether the next block search is a success after the search of the next code string block at step S1918, and if it is a success, returning "search success", and if it is not a success, returning "search failure", and making a return to the processing loop shown in FIG. 13B, in the prefix match search shown in FIG. 19B, after the search of the next code string block at step S1938, "search success" is immediately returned and a return is made to the processing loop shown in FIG. 13B.

This means that the head search code in the search code string is guaranteed to exist in the search target code string by the determination processing of step S1305 shown in FIG. 13A, and thus, because there is a prefix match between at least the head code of the search code string and the search target code string, "search success" is returned and a return is made to the processing loop shown in FIG. 13B.

Because the processing, other than the processing of the return type after the determination in the above noted step S1937 and the processing of step S1938 and below, is completely the same as that shown in FIG. 19A, as was noted above, the description of that processing is omitted.

FIG. 19C is a drawing describing the flow of a search that includes an any-code in the embodiment 3 of this invention. Here, "any-code" is a code that makes any code in the search target code string acceptable as a match. If a search code string includes an any-code and a code string matching all the codes except the any-code exists in the search target code string, then that search target code string is a hit for the search code string that includes the any-code.

When the flow shown in FIG. 19C is compared with the processing flow for performing the full match search shown in FIG. 19A, the processing executed in each step of steps S1950 to S1959 shown in FIG. 19C (with 40 subtracted from those step numbers) is exactly the same as the processing executed in each step of steps S1910 to S1919 shown in FIG. 19A except for the insertion of the processing of step S1955a between steps S1955 and S1956.

At step S1955a, a determination is made whether the search code extracted at step S1955 is an any-code. When the determination at step S1955a is that of an any-code, processing returns to step S1951 and does not pass through the determination processing of step S1956 and step S1957 as to whether the search code coincides with the index code.

If the determination at step S1955a is not that of an any-code, processing proceeds to step S1956. Because, as was noted above, all of the processing is the same as that shown in FIG. 19A except for the determination processing of the above step S1955a, that description is omitted.

Next, the processing, shown in step S1916 of FIG. 19A, step S1936 of FIG. 19B, or step S1956 of FIG. 19C, to search the code ID range table by means of the next code ID and to extract the related index code, that is to say, the processing to convert the code ID to a code, is described in detail.

Figure 19D:
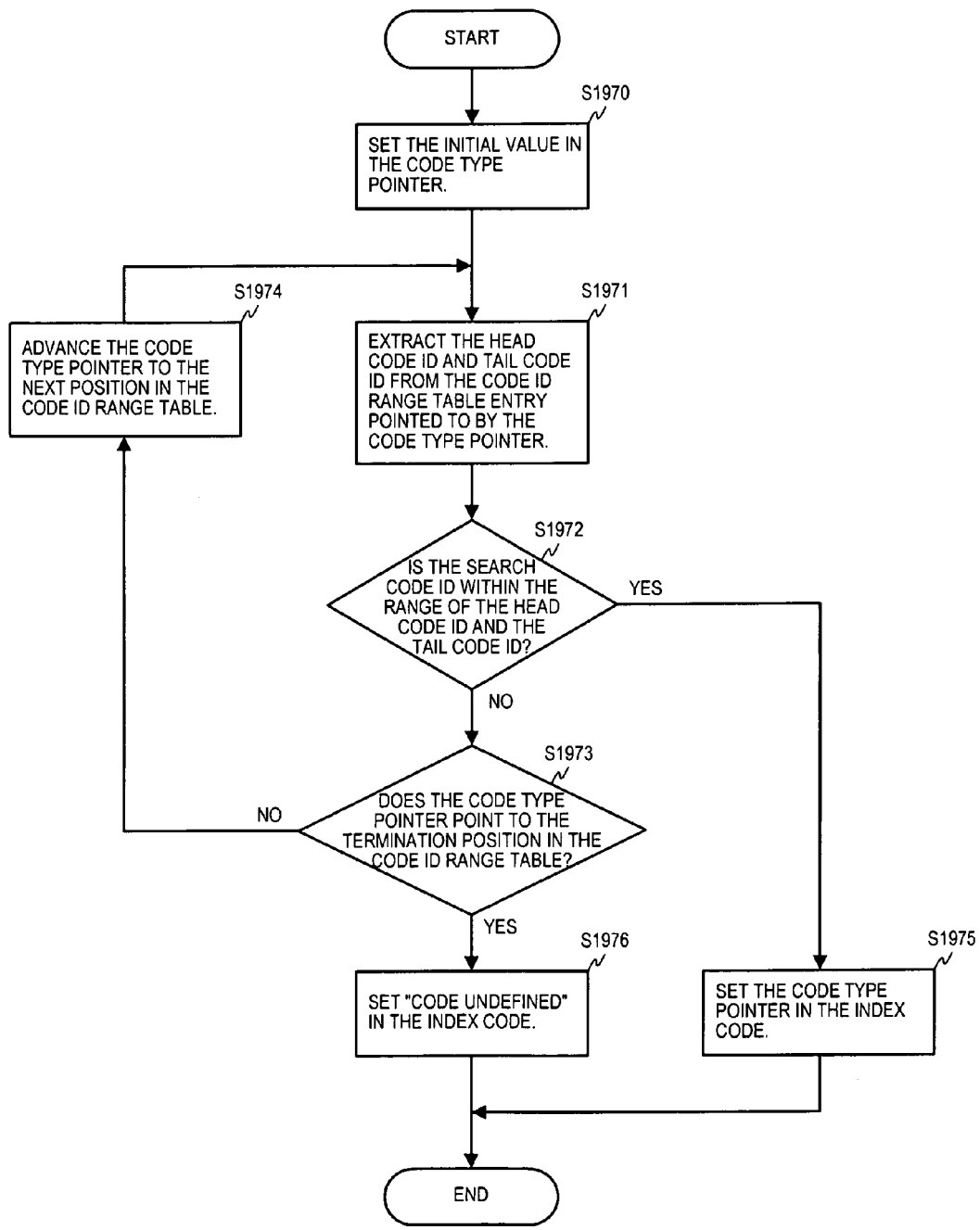
FIG. 19D is a drawing describing the processing flow that converts a code ID into a code in an embodiment 3 of this invention.

FIG. 19D is a drawing describing the processing to convert the code ID to a code in the embodiment 3 of this invention.

As shown in the drawing, at step S1970, the code type pointer is set to its initial value. The code type pointer is the pointer described above referencing FIG. 9A in the description for the embodiment 2. For example, as shown in FIG. 3A, code type pointer 311a points to an entry in code ID range table 309a stored in the index data storage area 324a. The code type pointer that has its initial value set at step S1970 is used for the code ID range table acquired in step S1205 shown in FIG. 12 or in step S1511 in shown in FIG. 15B.

Next, in step S1971, the head code ID and the tail code ID are extracted from the code ID range table entry pointed to by the code type pointer, and at step S1972, a determination is made whether the search code ID is within the range of the head code ID and the tail code ID.

If the search code ID is not within the range of the head code ID and the tail code ID, in step S1973 a determination is made that the code type pointer is at the termination position in the code ID range table and if it is not at the termination position, at step S1974, the code type pointer is advanced to the next position in the code ID range table and processing returns to step S1971. When a determination is made at step S1973 that the code type pointer is at the termination position in the code ID range table, processing proceeds to step S1976, "code undefined" is set in the index code, and processing is terminated.

Conversely, if the determination at step S1972 is that the search code ID is within the range of the head code ID and the tail code ID, processing proceeds to step S1975.

At step S1975, the code type pointer is set in the index code and processing is terminated. As can be understood by the conceptual description noted above of the code string search described in FIG. 3B, because the value of code type pointer is associated with a specific code type and a code set, what is meant here by setting the code type pointer in the index code is that a specific code type associated with the value in the code type pointer is set in the index code, which is one of temporary storage areas.

Hereinabove, a search for an index code was described with an example wherein matching was performed between the search code IDs and code ID ranges while successively updating the code type pointer from its initial value, in other words, in accordance with a linear search method. However, the search method is not limited to this, and it is clear that arbitrary search methods such as binary searches and so forth can be used.

Hereinabove, details of the embodiment 3 of this invention was described. Hereinbelow, in order to facilitate and understanding of the embodiment 3, the flow of processing in a full match search, which is one of the code string searches in the embodiment 3 of this invention, is described referencing FIG. 20A to FIG. 20C. In the examples shown in FIG. 20A to FIG. 20C, the search target code string is taken as that of the code string blocks up to the second block shown in FIG. 9A, and the search code string is taken as "ABC". Hereinafter, that search target code string is taken to be that expressed in the search target code string 10b, just as is shown in FIG. 9A.

Figure 20A:
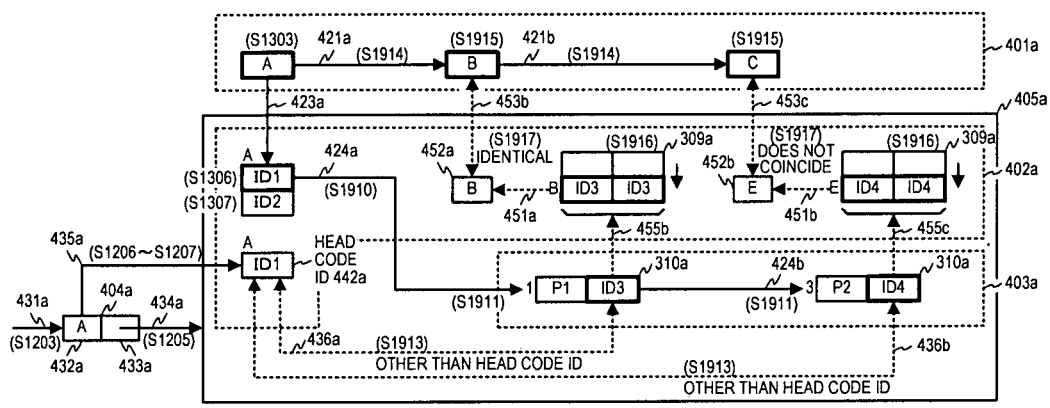
FIG. 20A is a drawing describing the flow of the search processing from the head code string block in an embodiment 3 of this invention.
Figure 20B:
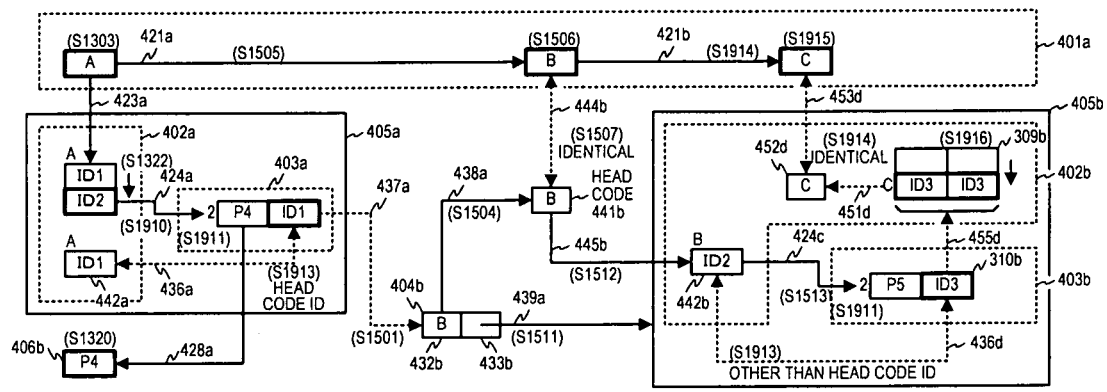
FIG. 20B is a drawing describing the flow of the transition to a search in the next code string block in an embodiment 3 of this invention.

FIG. 20A and FIG. 20B are drawings describing the flow of processing from the head code string block of a search target code string, and, regarding the outermost processing loop shown in FIG. 12, is equivalent to the first processing loop.

FIG. 20A describes the flow of a search that takes as its target the head code string block among all the code string blocks.

The block to which the reference numeral 401a is affixed delineates the flow of the processing of each of the search codes in the search code string ABC from its head. In other words, block 401a shows the changes in the code at the current search position. The block enclosed in a dotted line to which the reference numeral 402a is affixed delineates the code ID range in the code ID range table 309a entry pointed to by the code at the current search position and ID 1, which is the head code ID in the code ID range table 309a entry pointed to by code A, which is at the head position in the code string block. The block to which the reference numeral 403a is affixed delineates the flow of obtaining in sequence next codes from the next code ID table 310.

Also, the step reference numbers enclosed in parentheses indicate processing steps shown in FIG. 12 to FIG. 15B that are related to the flow of processing shown in the drawing.

For the processing before a search starts, as shown by the arrow 431a in the drawing, at step S1203 in FIG. 12 (in the description hereinafter the notation of the figure number is omitted) the head entry 404a in the index data management table is extracted. Then, as shown by arrow 434a, at step S1205, the code ID range table 309a and next code ID table 310a stored in the index data storage area 405a are extracted based on the index data pointer 433a for that entry. Then, as shown by arrow 435a, at steps S1206 and S1207, entry 309a (A) in the code ID range table 309a that corresponds to the code A stored in the head code 432a of entry 404a is read out, and ID 1, which is the head code ID, is read out and is set in the head code ID 442a.

First, as shown in 401a, the code A located at the head of the search code is extracted at step S1303 and, as shown by the arrow 423a to 402a, ID 1, which is the head code ID in the code ID range table entry pointed to by code A, is extracted at step S1306 and is set in the search start code ID. And ID 2, which is the tail code, is extracted at step S1307 and set in the search termination code ID.

Next, as shown by the arrow 424a from ID1 in block 402a to block 403a, ID 3, which is the next code ID in the next code ID table 310 entry pointed to by ID 1, is extracted at step S1910 and step S1911. Then, as shown by the bi-directional dotted-line arrow 436a between ID 3, which is the next code ID in the next code ID table 310 entry pointed to by ID 1 in block 403a, and head code ID 442a in block 402a, in step S1913, a determination is made that ID 3, which is the next code ID, is different than ID 1, which is the head code ID.

Hence, as shown by the arrow 421a to the codes from A to B in 401a, at step S1914 the code at the next code position becomes the target of processing, and at step S1915 code B is extracted. At step S1916, as shown by the dotted arrow 455b in block 402*a* between ID 3, which is the next code ID in next code ID code table 310*a* pointed to by ID 1 in block 403*a*, and the code ID range table 309*a*, it is found that that entry in code ID range table 309*a* includes ID 3 within in its code ID range and, in the example in the drawing, as shown by dotted-line arrow 451*a*, code B, which is the code pointing to that entry, is set in temporary storage area 452*a*.

Then, as shown by the bi-directional dotted-line arrow 453*b*, in step S1917, a determination is made that the code B set in the temporary storage area 452*a* and the code B extracted at step S1915 coincide.

Hence, next, as shown by the arrow 424*b* in 403*a*, ID 4, which is the next code ID in the next code ID table 310 entry pointed to by ID 3, is extracted at step S1911. Then, as shown by the bi-directional dotted-line arrow 436*b* between ID 4, which is the next code ID in the next code ID table 310*a* entry pointed to by ID 3 in block 403*a*, and head code ID 442*a* in block 402*a*, in step S1913 a determination is made that ID 4, which is the next code ID, is different than ID 1, which is the head code ID.

Furthermore, as shown by the arrow 421*b* from code B to code C in 401*a*, at step S1914, the code at the next code position becomes the target of processing and at step S1915 the code C is extracted. At step S1916, as shown by the dotted arrow 455*c* in block 403*a* between ID 4, which is the next code ID in next code ID code table 310*a* pointed to by ID 3 in block 403*a*, and the code ID range table 309*a* in block 402*a*, it is found that that entry in code ID range table 309*a* includes ID 4 within in its code ID range and, in the example in the drawing, as shown by dotted-line arrow 451*b*, code E, which is the code pointing to that entry, is set in temporary storage area 452*b*.

Then, as shown by bi-directional dotted-line arrow 453*c*, in step S1917, a determination is made that the code E set in the temporary storage area 452*b* and the code C extracted at step S1917 do not coincide and the search fails. At that point, "search failure" is returned and processing returns to the processing loop shown in FIG. 13B.

In other words, this shows that the code string starting from the code A for which the code ID is ID 1 in search target code string 10*b* does not match the search code string ABC. This code string from the code A for which the code ID is ID 1 in search target code string 10*b* is ABE, as shown in FIG. 9A, and thus does not match ABC.

FIG. 20B shows the flow of a search wherein ID 2, which is the following code ID after the ID 1 of code A, is made the search start code ID for the search code string ABC at step S1322. The processing loop shown in FIG. 13B consists of the first time processing shown in FIG. 20A and the second time processing shown in FIG. 20B.

Then, in this second time processing, the comparison between the search target code string and the search code string spans across to the next code string block after the head code string block.

As shown by the arrow in block 402*a* of FIG. 20B, in the processing loop of step S1322 shown in FIG. 13B, the search start code ID is updated from ID 1 to ID 2. Then, as shown by the arrow 424*b* from ID 2 of block 402*a* to block 403*a*, ID 1, which is the next code ID in the next code ID table 310*a* entry pointed to by ID 2, is extracted by step S1910 and step S1911. Also, as shown by the bi-directional dotted-line arrow 436*c* between ID 1, which is the next code ID in the next code ID table 310 entry pointed to by ID 2 in block 403*a*, and head code ID 442*a* in block 402*a*, in step S1913, a determination is made that ID 1, which is the next code ID, coincides with ID 1, which is the head code ID.

As a result, as shown by the dotted-line arrow 437*a*, in step S1501, entry 404*b*, which is the next entry in the index data management table after the head entry 404*a*, is extracted. Then, at step S1504, as shown by arrow 438*a* in the drawing, code B, which is stored in head code 432*b* of the entry 404*b*, is set in head code ID 441*b*.

Also, as shown by the arrow 421*a* from code A to code B in block 401*a*, at step S1505, the code at the next code position becomes the target of processing and at step S1506 the code B, which is the code next after the head code A, is extracted from the search code string. Then, as shown by the bi-directional dotted-line arrow 444*b*, in step S1507, a determination is made that the code B that is the code located next after code A coincides with the code B set in head code 441.

Hence, as shown by arrow 439*a* in the drawing, at step S1511, the code ID range table 309*b* and next code ID table 310*b* stored in the index data storage area 405*b* are obtained based the index data pointer 433*b* of entry 404*b*.

Next, as shown by arrow 445*b*, in step S1512, ID 2, which is the head code ID, is extracted from the code ID range table 309*b* entry pointed to by the code B that is set in the head code 441*b*, and it is set in head code ID 442*b*.

Continuing, as shown by arrow 424*c*, ID 3, which is the next code ID in the next code ID table 310*b* entry pointed to by ID 2, is extracted by the processing of step S1513 and the processing of step S1911 shown in FIG. 19A which is recursively called out. Then, as shown by the bi-directional dotted-line arrow 436*d* between ID 3, which is the next code ID in the next code ID table 310 entry pointed to by ID 2 in block 403*b*, and head code ID 442*b* in block 402*b*, in step S1913, a determination is made that ID 3, which is the next code ID, is different than ID 2, which is the head code ID.

Next, as shown by arrow 421*b* from code B in block 401*a* to code C, at step S1914 the code at the next code position becomes the target of processing, and code C is extracted at step S1915. At step S1916, as shown by the dotted arrow 455*d* between ID 3 in block 403*b*, which is the next code ID in next code ID code table 310*a* in block 402*b* pointed to by ID 2, and the code ID range table 309*a* in block 402*a*, it is found that that entry in code ID range table 309*a* includes ID 3 within in its code ID range and, in the example in the drawing, as shown by dotted-line arrow 451*d*, code C, which is the code pointing to that entry, is set in temporary storage area 452*d*.

Then as shown by the bidirectional dotted-line arrow 453*d*, in step S1917, a determination is made that the code C set in temporary storage area 452*d* coincides with the code C extracted at step S1915.

In other words, this shows that the code string from the code A for which the code ID is ID 2 in search target code string 10*b* matches the search code string ABC. This agrees with the fact that the code string from the code A for which the code ID is ID 2 in search target code string 10*b* is ABC, as shown in FIG. 9A.

Then at step S1320, as shown by arrow 428*a*, the code position P4 for the next code ID table 310*a* entry pointed to by ID 2, which is the search start code ID, is set in the search result code position shown by reference numeral 406*b*.

Then, because ID 2, which is the search start code ID, is the search termination code ID specified in step S1307, the search of the head code string block with that search start position is terminated and a return is made to the processing loop shown in FIG. 12, wherein the search start position is incremented by 1, in other words, a search is performed from the second code string block.

Figure 20C:
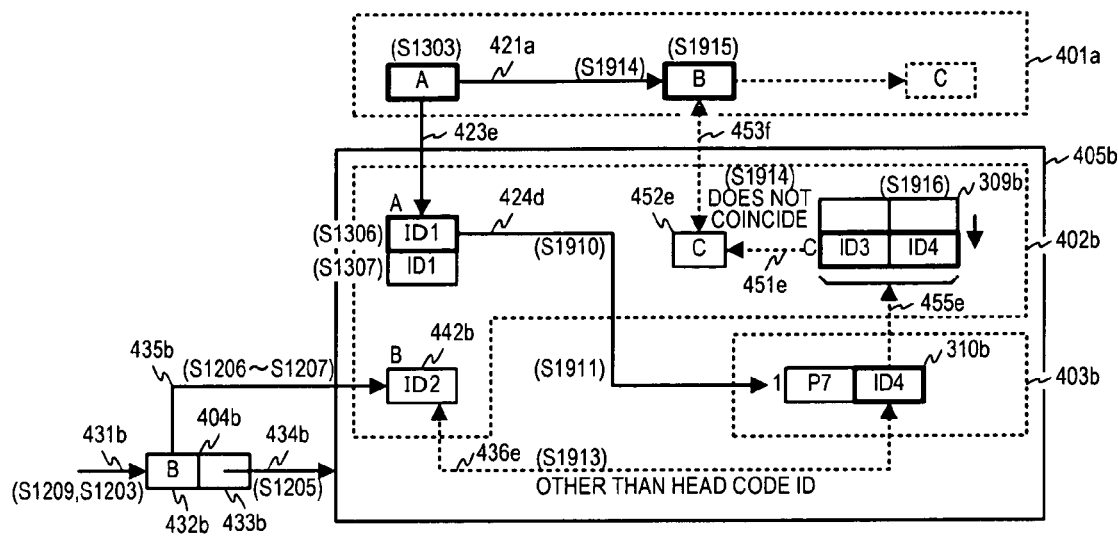
FIG. 20C is a drawing describing the flow of the search processing from the second code string block after the head code string block in an embodiment 3 of this invention

FIG. 20C is drawing describing the flow of processing from the second code string block in the search target code string, and, regarding the outermost processing loop shown in FIG.

12, is equivalent to the processing of the second time through the loop. The flow of processing described hereinafter is the same as that described above referencing FIG. 20A.

As shown by arrow 431b in the drawing, the value of the index data management pointer for the search start position has been updated in step S1209 in the processing before the start of the search, and at step S1203 the second entry 404b in the index data management table is extracted. Then, as shown by the arrow 434b, at step S1205, based on the index data pointer 433b of that entry, the code ID range table 309b and next code ID table 310b stored in the index data storage area 405b are extracted.

At the beginning of the search from the second code string block in step S1303, the code A, which is located at the head of the search code string, is extracted again, as shown in block 401a. Then, as shown by the arrow 423e to block 402b, the ID 1 that is the head code ID in the entry in code ID range table 309b pointed to by code A is extracted at step S1306 and set in the search start code ID. Also, at step S1307 the ID 1 that is the tail code is extracted and set in the search termination code ID.

Next, as shown by arrow 424d from the ID 1 of block 402b to block 403b, ID 4, which is the next code ID in the next code ID table 310 entry pointed to by ID 1, is extracted by steps S1910 and S1911. Then, as shown by the bi-directional dotted-line arrow 436e between ID 4, which is the next code ID in the next code ID table 310 entry pointed to by ID 1 in block 403b, and head code ID 442b in block 402b, in step S1913, a determination is made that ID 4, which is the next code ID, is different than ID 2, which is the head code ID.

As a result, as shown by arrow 421a from code A in block 401a to code B, at step S1914, the code at the next code position becomes the target of processing, and code B is extracted at step S1915. At step S1916, as shown by the dotted arrow 455e between ID 4 in block 403b, which is the next code ID in next code ID code table 310a pointed to by ID 1, and the code ID range table 309a in block 402b, it is found that that entry in code ID range table 309a includes ID 4 within in its code ID range and, in the example in the drawing, as shown by dotted-line arrow 451e, code C, which is the code pointing to that entry, is set in temporary storage area 452e.

Then, as shown by bi-directional dotted-line arrow 453f, in step S1917, a determination is made that the code C set in the temporary storage area 452e and the code B extracted at step S1915 do not coincide and the search fails. At that point, "search failure" is returned and processing returns to the processing loop shown in FIG. 13B.

Then, because ID 1, which is the search start code ID, is also the search termination code ID, processing becomes terminated by the determination in step S1321 shown in FIG. 13B, and processing again returns to the processing loop shown in FIG. 12, and, in the example shown in FIG. 20A to FIG. 20C, because the search target code string is made to be up to the second code string block, in step S1207 a determination is made that the overall search processing has finished.

Hereinbelow, the embodiment 4 of this invention is described. In the embodiment 4, design and creation processing of a code string block is different from those in the embodiment 2 and embodiment 3, and also the structure of the index data management table in the embodiment 4 that contains a head code ID instead of a head code is different from those in the embodiment 2 and embodiment 3.

However, a search processing is almost similar to those of the embodiment 2.

First, an overview is described of a search method in the embodiment 4 of this invention.

Figure 21A:
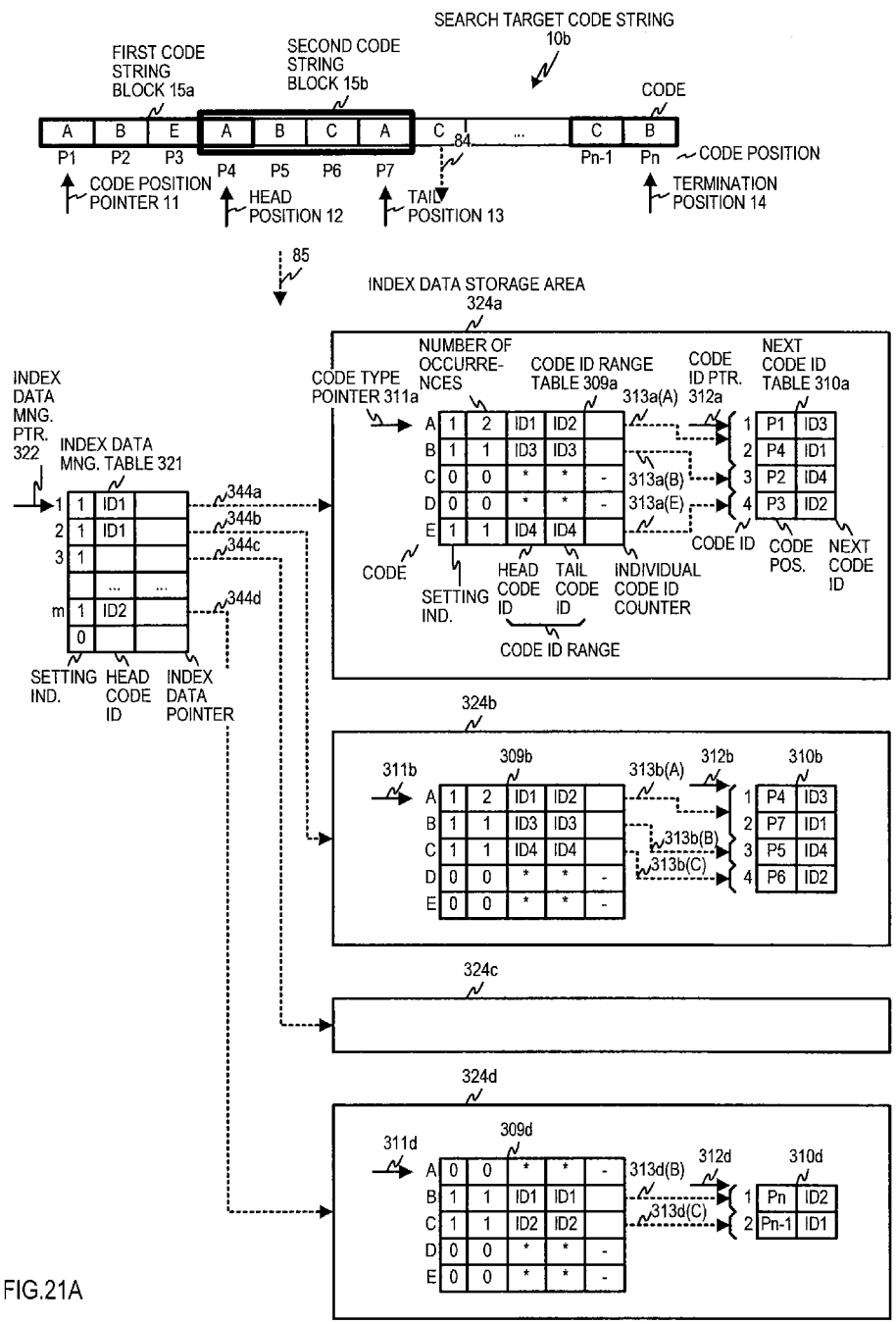
FIG. 21A is a drawing describing an index data structure in an embodiment 4 of this invention.

FIG. 21A is a drawing describing an index data structure in the embodiment 4 of this invention. FIG. 21A depicts the search target code string 10b as an example of a code string that forms the target of index data creation. The exemplified search target code string 10b consists of the alphabetic character codes A, B, E, A, B, C, A, . . . C, B. The P1 to P8 . . . Pn–1, Pn depicted below each of those alphabetic codes indicate the position of the code in search target code string 10b. The code position pointer 11 is a pointer that indicates the position of a code in search target code string 10b and in the example in the drawing it points to code position P1.

In the example shown in the drawing, search target code string 10b is partitioned into strings of 4 codes each, with the tail end code position of each code string block being duplicated in the head code position in the following code string block. Thus, the first code string block 15a consists of the code A located in code position P1, pointed to by the code string pointer 11, the code B located in code position P2, the code E located in code position P3, and the code A located in code position P4. As shown by the arrow 12, the head position in the second code string block 15b has the identical P4 as the tail position in the first code string block 15a, and code A is included in both the first code string block 15a and the second codes string block 15b. As shown in the drawing with the box with thick lines, the second code string block 15b consists of the code A located in code position P4, the head position pointed to by the code string pointer 12, the code B located in code position P5, the code C located in code position P6, and the code A located in code position P7, the tail position pointed to by arrow 13. Code position Pn shown by arrow 14 is defined as the termination position. Only the last code string block is configured by 2 codes.

A code ID range table and a next code ID table are created as the index data for any code string block that is the target of a search.

Furthermore FIG. 21A depicts an exemplary index data structure for a code string search corresponding to the search target code string 10b, as shown by dotted-line arrow 85. It exemplifies the search target code string 10b, and the index data management table 321 that is created corresponding to the code strings blocks for that string, and an index data storage area 324a corresponding to the head code string block 15a and holding a code ID range table 309a and a next code ID table 310a, an index data storage area 324b corresponding to the second code string block 15b and holding a code ID range table 309b and a next code ID table 310b, an index data storage area 324c corresponding to the third code string block and holding a code ID range table 309c and a next code ID table 310c, and an index data storage area 324d corresponding to the final code string block and holding a code ID range table 309d and a next code ID table 310d. Depiction of the index data stored in index data storage area 324c is omitted. Also, hereinbelow, items in common may be expressed as "code ID range table 309" and "next code ID table 310". And the same applies to expressing other reference numerals.

The entries of the code ID range table 309 are created for each code type of the differing codes that occur in the search target code string, which is the target for making index data. As is shown on the left side of the code ID range table 309, in the example shown in the drawing, of all the letters in the alphabet, the search target code string with the code strings consisting of codes A to E is the target for making the index data, and an entry is made corresponding to each code. The code type pointer 311 is a pointer to the entries in code ID range table 309. In the example in the drawing of the code ID range table 309a corresponding to the head code string block, code type pointer 311a points to the entry corresponding to code A. In the same way, in the example of the code ID range table 309*b* corresponding to the second code string block, code type pointer 311*b* points to the entry corresponding to code A. Also, in the example of the code ID range table 309*d* corresponding to the last code string block, code type pointer 311*d* points to the entry corresponding to code A.

Also, because each code is composed of bit strings, each code holds a value that can be expressed by the bit values of that bit string. Thus, it is clear that a position of an entry corresponding to each code in code ID range table 309 can be associated with the value of each such code. In other words, the value taken by the code type pointer 311 can be made the code itself. Consequently, in the description below, an entry corresponding to a given code may be expressed as an entry being pointed to by that code.

As shown in the information beneath the code ID range table 309*a*, an entry in the code ID range table 309*a* consists of a setting indicator, a number of occurrences, a head code ID, a tail code ID, and an individual code ID counter.

The setting indicator shows with a 0 or 1 whether that code occurs in the search target code string. In the example of code ID range table 309*a*, because the codes C and D do not occur in the head code string block, the entries for codes C and D have a 0, and all the other entries have a 1. In the example of code ID range table 309*b*, because the codes D and E do not occur in the second code string block, the entries for codes D and E have a 0, and all the other entries have a 1. In the example of code ID range table 309*d*, because the codes B and C do not occur in the last code string block, the entries for codes B and C have a 0, and all the other entries have a 1.

The number of occurrences is the number of times that code occurs in the search target code string. In the example of code ID range table 309*a*, 2, 1, 0, 0, and 1 are stored for the codes A to E. In the example of code ID range table 309*b*, 2, 1, 1, 0, 0, and 0 are stored for the codes A to E. In the example of code ID range table 309*d*, 0, 1, 1, 0, and 0 are stored for the codes A to E.

The head code ID and the tail code ID indicate the range for that code ID for each code. The code ID is assigned in the order of appearance of each unique code in the search target code string in order that there is no overlap between codes.

In the example of code ID range table 309*a*, because the number of occurrences for code A is 2, it has the range of ID 1 to ID 2, and because the number of occurrences for the next code B is 1, the head code and the tail code are both ID 3. Because the number of occurrences for code C and code D is 0, the head code IDs and the tail code IDs are not set. Because the number of occurrences for code E is 1, the head code and the tail code are both ID 4.

In the same way below, in the example of code ID range table 309*b*, the head code of code A is ID 1 and its tail code is ID 2, the head code and tail code of code B are both ID 3, the head code and tail code of code C are both ID 4.

Also, in the example of code ID range table 309*d*, the head code and tail code of code B are both ID 1, and the head code and tail code of code C are both ID 2.

Also, although it preferable that the value of ID 1 and so forth be an integer value beginning concretely from 1, it is not limited to that technique and it is sufficient that the ID ranges for each code be differentiated. Also, although the code ID range is expressed by a head code ID and a tail code ID in the example in the drawing, it can be expressed by enumerating all the code IDs if one does not mind that the code ID range has a variable data length.

The individual code ID counter is a counter needed when a next code ID table is to be created at the same time that a code ID range table is being created, and it is not necessary as index data. Thus it can be set up as a counter separate from that of the code ID range table, for each of the differing code types.

An entry in the next code ID table 310 is created for each code ID assigned to a code in a code string block. As shown on the left side of next code ID table 310, in the example shown in the drawing, except for the next code ID table 310*d* for the last code string block, entries are created corresponding to code ID 1 to code ID 4. Each entry consists of the items code position and next code ID. Code ID pointer 312 is a pointer pointing to an entry in next code ID table 310, and in the example in the drawing it points to ID 1 in each of the next code ID tables 310.

The code position in the entry for each code ID is a code position that is the position of the code with that code ID in search target code string 10*b*, and in the example shown in the drawing P1 is stored for ID 1, P4 is stored for ID 2, P2 is stored for ID 3, and P3 is stored for ID 4.

As shown by the dotted line of arrow 313*a* (A) in the drawing, the first and second entries in next code ID table 310*a* correspond to the code A. In the same way, as shown by the dotted line of arrow 313*a* (B) in the drawing, the third entry corresponds to the code B; and, as shown by the dotted line of arrow 313*a* (E) in the drawing, the fourth entry corresponds to the code E.

The next code ID for each code ID entry is the code ID for the code located next in the code string block after the code for that code ID entry. Also, the code ID for the code that is at the head of a code string block is stored as the next code ID of the tail end of the string. Thus in next code ID table 310*a*, for ID 1 the stored next code ID is ID 3, for ID 2 it is ID 1, for ID 3 it is ID 4, for ID 4 it is ID 2.

In next code ID table 310*b*, P4 is stored for ID 1, P7 is stored for ID 2, P5 is stored for ID 3, and P3 is stored for ID 4.

As shown by the dotted-line arrow 313*b* (A), the first and second entries in the next code ID table 310*b* correspond to the code A. In the same way, as shown by the dotted-line arrow 313*b* (B), the third entry corresponds to the code B; and as shown by the dotted-line arrow 313*b* (C), the fourth entry corresponds to the code C.

Also, the stored next code ID for ID 1 is ID 3, for ID 2 it is ID 1, for ID 3 it is ID 4, and for ID 4 it is ID 2.

In next code ID table 310*d*, Pn is stored for ID 1, and Pn−1 is stored for ID 2.

As shown by the arrow with the dotted line 313*d* (B), the first entry in the next code ID table 310*d* corresponds to the code B. In the same way, as shown by the dotted-line arrow 313*d* (C), the second entry corresponds to the code C. Also, the stored next code ID for ID 1 is ID 2, and for ID 2 it is ID 1.

Next code ID table 310 keeps, as index data, the fact that 2 codes, expressed in code IDs, have a contiguous position relationship in the search target code string. The duplication relationship between the code in the tail position in a preceding code string block and the code in the head position in a following code string block is managed by the fact that the index data management table holds the head code IDs of each code string block.

As shown in the drawing, index data management table 321 has an entry for each code string block, and consists of the items: a setting indicator, a head code ID, and an index data pointer. Index data management pointer 322 is a pointer pointing to an entry in the index data management table. In the example in the drawing, index data management pointer 322 points to entry 1, which corresponds to the head code string block 15*a*.

A setting indicator indicates whether the entry of the index data management table in which the setting indicator is stored is empty or not. In the example shown in FIG. 21A, a 1 is set in the setting indicator of index data management table 321 for the entries from entry 1 to entry m, and 0 is set in all the other entries. Entry m corresponds to the last code string block.

A head code ID is a code ID for a code that is positioned in the head position of the associated code string block. In the example shown in FIG. 21A, ID 1 is set in entry 1 of the index data management table 321 as the head code ID, ID 1 is set in entry 2 as the head code ID, and ID 2 is set in entry m as the head code ID.

As shown by the dotted-line arrows 344a, 344b, 344c, and 344d, the index data pointers point to the index data storage areas 324a, 324b, 324c, and 324d that correspond to those code string blocks.

Figure 1B:
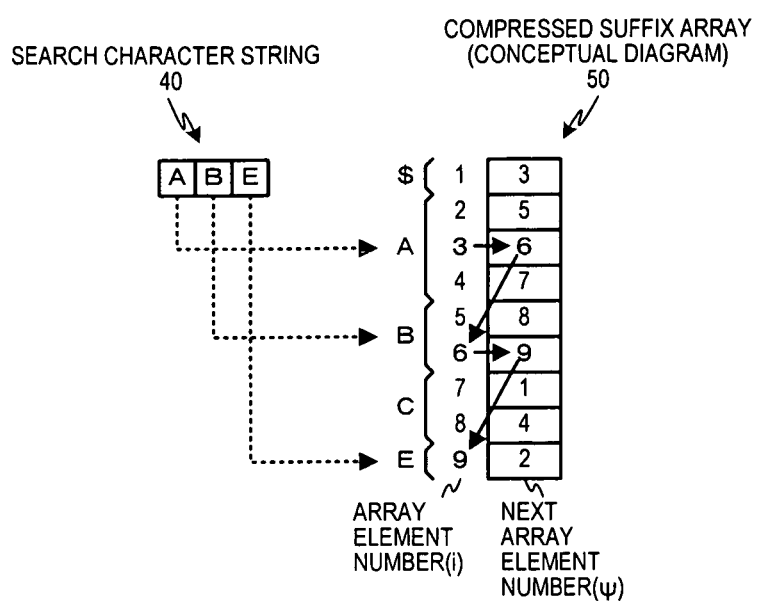
FIG. 1B is a drawing describing an example of a compressed suffix array in previous search methods.

When next code ID table 310 is compared with compressed suffix array 50 in the example of previous art shown in FIG. 1B, whereas, in compressed suffix array 50, the next array element number for each character is sorted, in next code ID table 310, the code position is sorted for the code type of each differing code. Thus if a successive search is made for the same code, the cache effect can be expected to provide faster processing.

Figure 21B:
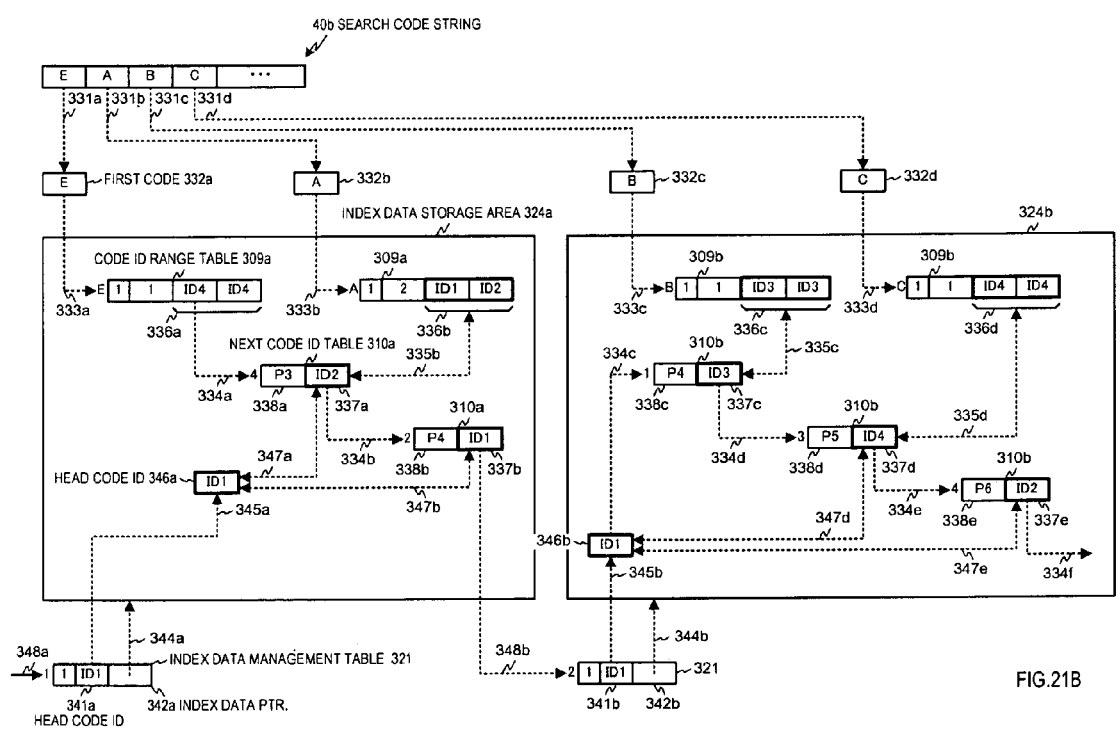
FIG. 21B is a drawing describing conceptually a code string search in an embodiment 4 of this invention.

FIG. 21B is a drawing describing conceptually a code string search in the embodiment 4 of this invention.

The search target code string is taken to be search target code string 10b shown in FIG. 21A, and it is taken to be partitioned into the code string blocks shown in FIG. 21A. Also a search code string is described conceptually by the search code string 40b shown in FIG. 21B. Code ID range tables 309 and next code ID tables 310 are taken to be created corresponding to the code string blocks of the search target code string, and index data management table 321 is also taken to be created.

Before starting a search, the head entry 321 (1) of the index data management table shown by arrow 348a is read out, and, as shown by the arrow with a dotted line 344a, code ID range table 309a and next code ID table 310a stored in index data storage area 324a are obtained by index data pointer 342a. Furthermore, as shown by the dotted-line arrow 345a, ID 1, which is stored in the head code 341a is read out, and, as shown by the arrow with a dotted line 345a, is set in the head code ID 346a in a temporary storage area.

As shown in the drawing, code E, code A, code B, and code C are located in search code string 40b, starting from its head. Then as shown in the drawing by dotted-line arrow 331a, code E, which is the first code, code 332a, is read out. Next, as shown by dotted-line arrow 333a, entry 309a (E) corresponding to code E in code ID range table 309a corresponding to the head code string block is read out. (If the head code of search code string 40b does not exist in the head code string block, processing skips to index data associated with a code string block wherein the head code exists.)

Then, as shown by dotted-line arrow 334a, the code ID included in ID range 336a, in the example in the drawing, ID 4, is read out from entry 309a (E), and entry 310a (4) corresponding to the read out code ID 4 is read out from next code ID table 310a.

Also, code ID1, which is stored in the entry (1) in the index data management table 321, is set in head code ID 346a in a temporary storage area.

Then as shown by the bidirectional dotted-line arrow 347a, ID 2, which is the next code ID in entry 310a (4) corresponding to code ID 4, and ID 1, which is set in head code ID 346a are compared and a determination is made that the next code ID is other than the head code ID.

Next, as shown by dotted-line arrow 331b, code A, which is the second code, code 332b, is read out. Because the determination by the bi-directional dotted arrow 347a noted above is that the next code ID is other than the head code ID, as shown by dotted-line arrow 333b, entry 309a (A) corresponding to code A in code ID range table 309a that is the same as that for the first code E is read out. Then as shown by the bidirectional dotted-line arrow 335b, a determination is made whether ID 2, which is next code ID 337a of entry 310a (4) that corresponds to code ID 4 read-out from next code ID table 310a, is included in the code ID range 336b (ID 1 to ID 2) of entry 309a (A), which corresponds to the read-out code A in code ID range table 309a. In the example shown in the drawing, the result of the determination is "yes". This means that the code sequence E to A exists in the head code string block in search target code string 10b. Also, because the code position 338a of entry 310a (4), which corresponds to code ID 4 read out from next code ID table 310a, is P3, it can be understood that the leading position of the code sequence E to A is P3.

Furthermore, as shown by dotted-line arrow 334b, ID 1, which is the next code ID 337b in entry 310a (2) corresponding to ID 2 in next code ID 337a, is read out. Then as shown by the bidirectional dotted-line arrow 347b, a comparison is made between the read-out ID 1 and the ID 1 set previously in the head code ID 346a, and a determination is made whether the next code ID coincides with the head code ID. In other words, a determination is made that the code A of the head code string block, whose code ID is the code ID 2 and which is being compared with the code A, which is the second code 332b in the search code string, is located in the tail position of the head code string block.

Then, as shown by arrow 348b, entry 321 (2), which is the second entry in the index data management table, is read out, and, as shown by the dotted-line arrow 344b, the index storage area 324b is accessed by means of the index pointer 342b, and the code ID range table 309b and the next code ID table 310b are obtained.

Also, the ID 1 stored in head code ID 341b of entry 321 (2), which is the second entry in the index data management table, is set in the head code ID 346b, which is a temporary storage area, as shown by the dotted-line arrow 345b. Then, as shown by the dotted-line arrow 334c, the entry 310b (1) corresponding to the ID 1 set in the head code ID 346b is read out from the next code ID table 310b.

Furthermore, as shown by dotted-line arrow 331c, code B is read out as the third code 332c, and, as shown by dotted-line arrow 333c, the entry 309b (B) corresponding to code B in the code ID range table 309b is read out. Then as shown by the bi-directional dotted-line arrow 335c, a determination is made whether ID 3, which is next code ID 337c of entry 310b (1) that corresponds to code ID 1 in next code ID table 310b, is included in the code ID range 336c (ID 3 to ID 3) of entry 309b (B), which corresponds to the read-out code B in code ID range table 309b. In the example in the drawing, the determination becomes "yes". Thus it can be understood that the search target code string 10b produces a hit for the search code string EAB.

Following this determination, as shown by the dotted-line arrow 334d, ID 4, which is the next code ID 337d in entry 310b (3) corresponding to ID 3, which is the next code ID 337c, is read out. Then as shown by the bi-directional dotted-line arrow 347d, a comparison is done between the read-out ID 4 and the ID 1 set previously in the head code ID 346*b*, and a determination is made that the next code ID does not coincide with the head code ID.

At that point, as shown next by dotted arrow 331*d*, code C, which is the fourth code 332*d*, is read out. Also, as shown by the dotted-line arrow 333*d*, the table entry 309*b* (C) corresponding to code C in the code ID range table 309*b* is read out, just as is done for the third code B. Then as shown by the bidirectional dotted-line arrow 335*d*, a determination is made whether ID 4, which is next code ID 337*d* of entry 310*b* (3) that corresponds to code ID 3 in next code ID table 310*b*, is included in the code ID range 336*d* (ID 4 to ID 4) of entry 309*b* (C), which corresponds with the read-out code C shown by dotted-line arrow 333*d*. In the example shown in the drawing, because the determination is "yes", it can be understood that search target code string 10*b* produces a hit on the search code string EABC.

Following that determination, as shown by the dotted-line arrow 334*e*, ID 2, which is the next code ID 337*e* in entry 310*b* (4) corresponding to ID 4, which is the next code ID 337*d*, is read out. Then as shown by the bi-directional dotted-line arrow 347*e*, a comparison is done between the read-out ID 2 and the ID 1 set previously in the head code ID 346*b*, and a determination is made that the next code ID does not coincide with the head code ID.

Then because the code position 338*b* of the entry 310*a* (2) corresponding to the code ID 2 read out from next code ID table 310*a* is P4, and the code position 338*d* of the entry 310*b* (3) corresponding to the code ID 3 read out from next code ID table 310*b* is P5, and the code position 338*e* of the entry 310*b* (4) corresponding to the code ID 4 is P6, it can be understood that the above noted hit positions are code positions P3, P4, P5, and P6.

Even for the fifth code, not shown in the search code string 40*b*, as shown by the dotted-line arrow 334*f*, the process of reading out the next code ID of the entry in the code ID range table corresponding to ID 2, which is the next code ID 337*e*, and determining whether it is within the ID code range of the entry in the code ID range table 309 pointed to by the code type of the fifth code is repeated.

By doing the above, a code string search according to one embodiment of this invention is implemented.

Next the process for creating index data in the embodiment 4 of this invention is described. In the general flow of processing that creates index data in the embodiment 4 of this invention, the initialization processing of the block index data corresponding to each code string block, which is the processing of the prior stage, is similar to that of the embodiment 2, whose processing flow is described referencing FIG. 10A. Therefore, here, the processing flow of the latter stage that creates successively block index data corresponding to each code string block.

Figure 22:
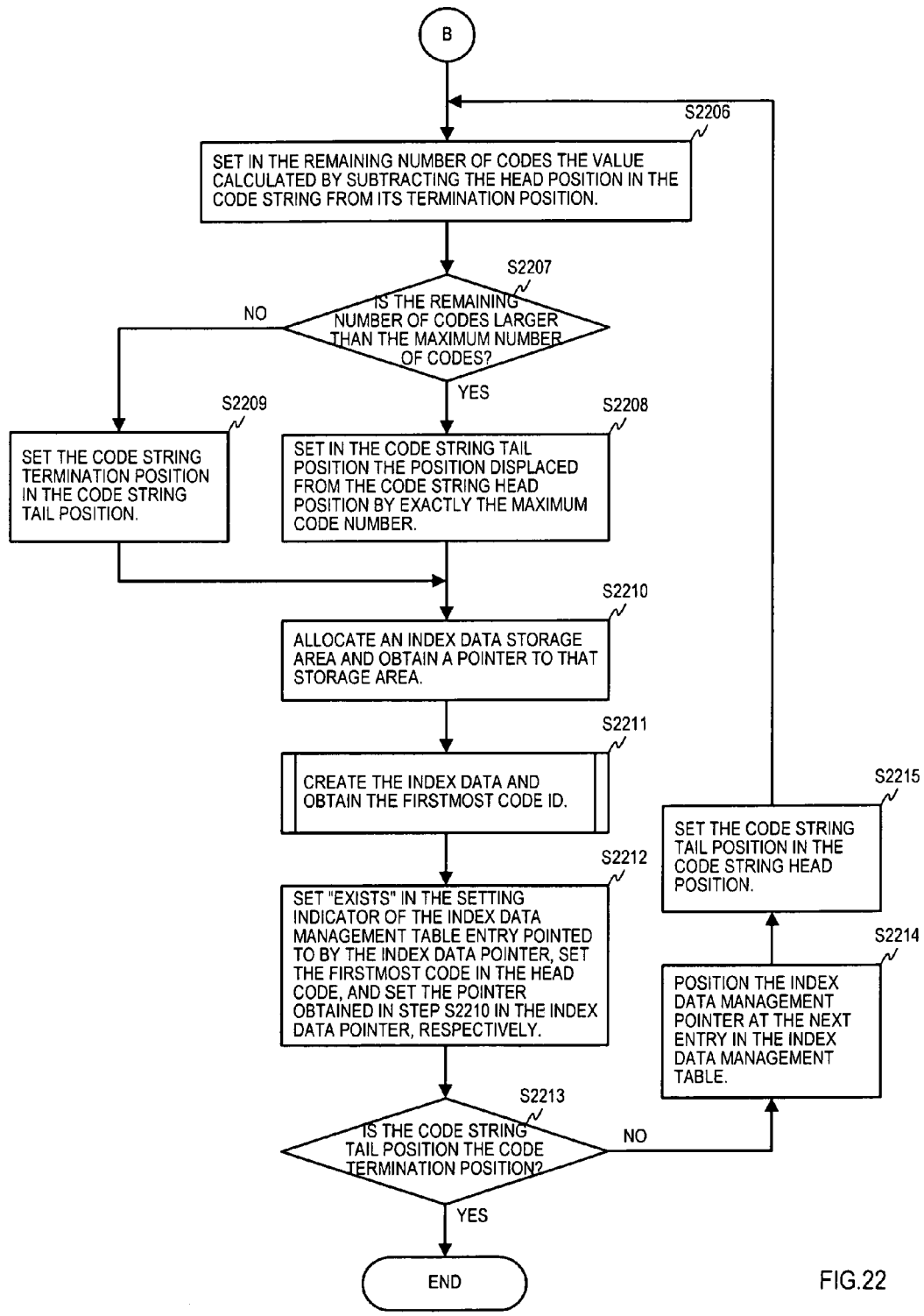
FIG. 22 is a drawing describing the processing flow of the latter stage that creates index data for a code string block in an embodiment 4 of this invention.

FIG. 22 is a drawing describing the processing flow of the latter stage that creates successively block index data corresponding to each code string block in the embodiment 4.

As shown in the drawing, in step S2206, the value computed by subtracting the head position of the code string from the termination position of the code string is set in the remaining number of codes, and at step S2207, a determination is made whether the remaining number of codes is larger than the maximum number of codes. If the remaining number of codes is larger than the maximum number of codes, processing proceeds to step S2208, wherein the position that is moved from the head position of the code string by only the amount set in the maximum number of codes is set in the code string tail position. And if the remaining number of codes is not larger than the maximum number of codes, processing proceeds to step S2209, and the code string termination position is set in the code string tail position.

The processing of the above steps S2206 to S2209 is performed for the purpose of determining, using the code string tail position set in steps S2208 or S2209, whether the processing, described below, to create index data corresponding to each code string block is to be terminated.

Next, in step S2210, a storage area is allocated for the index data of the code string block that is the current target of creating index data and a pointer to that storage area is obtained, and processing proceeds to step S2211. The code string block that is the target of index data creation is the block that starts from the code positioned in the code string head position set in step S2204 or in step S2215 described below.

At step S2211, index data is created for the code string block that is the current target of index data creation and is stored in the storage area allocated in step S2210, and the firstmost code ID is obtained. Details of the processing in step S2211 and the firstmost code ID are similar or almost similar to those explained hereinbefore referencing FIG. 11A to FIG. 11C.

Next, at step S2212, "Exists" is set in the setting indicator of the index data management table pointed to by the index data pointer, the firstmost code ID is set in the head code ID, and the pointer obtained in step S2210 is set in the index data pointer. The firstmost code ID is the code set in the processing of step S2211.

Next, at step S2213, a determination is made whether the code string tail position coincides with the code string termination position. If the code string tail position coincides with the code string termination position, because the creation of index data has finished, processing is terminated. If the code string tail position does not coincide with the code string termination position, processing proceeds to step S2214, and the index data management pointer is positioned at the next entry in the index data management table, and, at step S2215, the code string tail position is set in the code string head position, and processing returns to step S2206.

The processing loop of the above steps S2206 to S2215 is repeated until a determination is made in step S2213 that the code string tail position points to the code string termination position, and when that determination is made, index data creation processing is terminated because index data creation for all the code strings is completed.

Next, details of step S2211 shown in FIG. 22, which executes the index data creation processing for a code string block, are described. The difference between the creation processing of a code string block in the embodiment 4 and those in the embodiment 2 is caused by the fact that the index data managing table in the embodiment 4 contains head code IDs instead of the head codes that are contained in the index data managing table in the embodiment 2.

Therefore, the general flow of index data creation processing shown in FIG. 4 in the embodiment 1 is also applicable to those in the embodiment 4. Also, the processing flow for enumerating the number of occurrences of each code type of the codes included in code strings that are targets of searches shown in FIG. 11A and the processing flow for setting the code ID range for each code type shown in FIG. 11B in the embodiment 2 are applicable to those in the embodiment 4. The processing flow for completing a next code ID table shown in FIG. 11C in the embodiment 2 is also applicable to that in the embodiment 4 by only deleting the process "set the firstmost code" at step S1143.

As is described above, the descriptions for the details of step S2211 shown in FIG. 22 are omitted.

Next, the process of a code string search in the embodiment 4 is described. Overview of the code string search in the embodiment 2 is applicable to that of the embodiment 4. Also the control flows of the next inner loop and the innermost loop are applicable to those of the embodiment 4. Therefore descriptions of those flows in the embodiment 4 are omitted, and the control flow of the innermost loop and the processing flow of a search for the next code string block are described hereinbelow.

Figure 23:
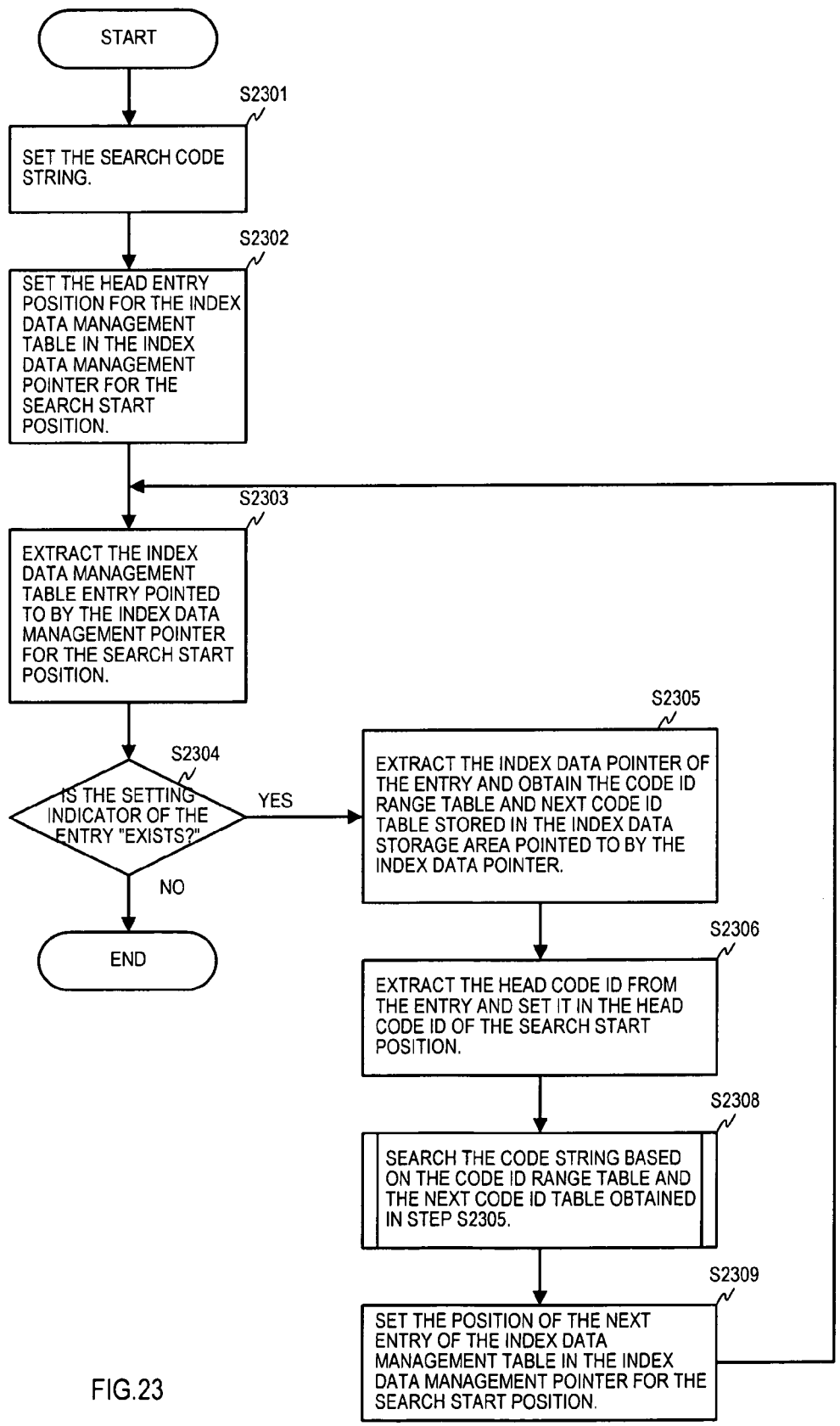
FIG. 23 is a drawing describing in general the overall processing flow for a code string search in an embodiment 4 of this invention.

FIG. 23 depicts the control flow of the innermost loop and is a drawing describing in general the overall processing flow for a code string search in the embodiment 4 of this invention. The flow shown in FIG. 23 consists of the initialization processing and the search processing loop that successively replaces, in the search target code string, the code string block that starts the search with the next code string block.

First, in step S2301, the search code string is set. This setting of search code string is that wherein the search code string read out by the search code string read-out means 111 shown in FIG. 2B is set in a temporary storage area and the leading position of the read-out search code string is provided.

Next, in step S2302, the top entry position in the index data management table is set in the index data management pointer that is the search start position in a temporary storage area.

With that, the initialization processing noted above is finished.

Next, proceeding to step S2303, the index data management table entry pointed to by the index data pointer for the search start position is extracted, and in step S2304, a determination is made whether the setting indicator for the extracted entry shows "Exists". If the setting indicator shows "Exists", processing proceeds to step S2305 and if the setting indicator does not show "Exists", processing is terminated because all of the searches have finished.

At step S2305, the index data pointer for the entry extracted at step S2303 is extracted, and the code ID range table and next code ID table stored in the index data storage area pointed to by the index data pointer are obtained. This obtaining of the code ID range table and next code ID table can be realized by storing pointers showing their starting addresses at the time that the code ID range table and next code ID table are stored in their storage areas in step S1103 shown in FIG. 11A and step S1141 shown in FIG. 11C, and then using those pointers.

Next in step S2306, the head code ID of the entry extracted in step S2303 is extracted and set in the head code ID for of the search start position. Next in step S2308, that code string block is searched based on the code ID range table and the next code ID table obtained at step S2305. Details of the processing in step S2308 are those described hereinbefore referencing FIG. 13A and FIG. 13B. Next at step S2309, the position of the next entry in the index data management table is set in index management data pointer for the search start position, and processing returns to step S2303.

The processing loop of the above steps S2303 to S2309 is repeated, while updating the index management data pointer for the search start position in step S2309, until the determination in step S2304 is that the setting indicator of an entry in the index data management table is not "Exists".

Also because there are cases wherein the comparison of each single code spans from the code string block from which the search starts to the next code string block, as was noted above, both the setting processing of the index management data pointer for the search start position in steps S2302 and S2309 and the setting processing for the head code ID in step S2306 save the index data management pointer and the head code ID related to the code string block from which the search starts. This head code ID, as is described referencing FIG. 14A in the embodiment 2, is used in the determination whether to proceed to a comparison of a code in the next code string block after the code comparison reaches the end of the current code string block.

Next details of the search processing of the next code string block in the embodiment 4 are described.

Figure 24A:
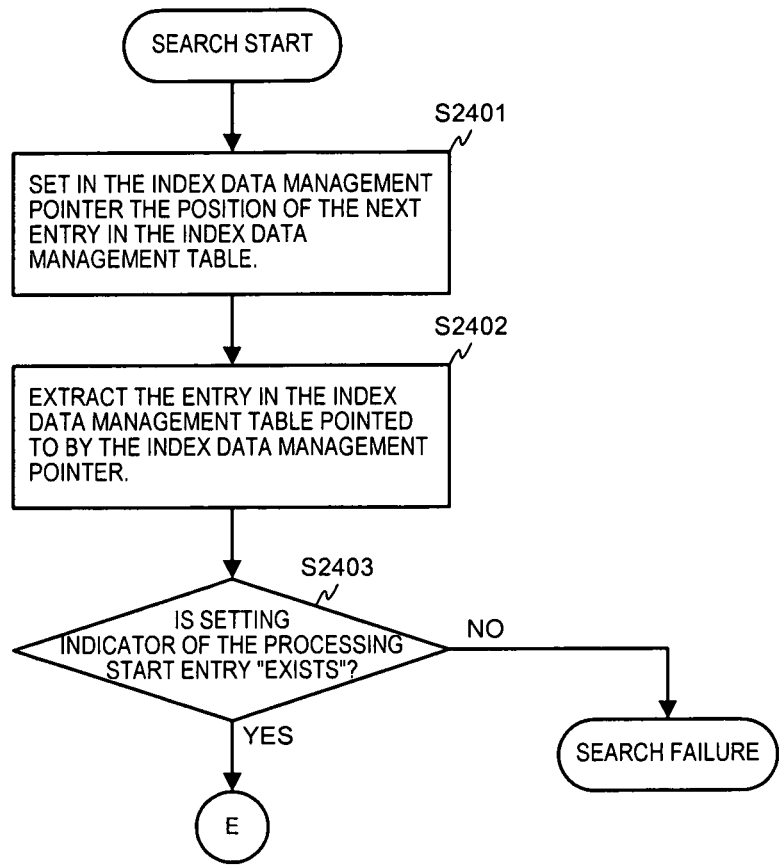
FIG. 24A is a drawing describing the processing flow of the prior stage of a search in the next code string block in an embodiment 4 of this invention.

FIG. 24A is a drawing describing the processing flow of the prior stage of a search for the next code string block in one embodiment of this invention.

As shown in the drawing, at step S2401, the position of the next entry in the index data management table is set in the index data management pointer. At this time, the index data management pointer for the search start position has been set in step S1312 shown in FIG. 13B. Next proceeding to step S2402 the entry in the index data management table pointed to by the index data management pointer is extracted, and in step S2403 a determination is made whether the setting indicator for the entry shows "Exists".

If the setting indicator is not "Exists", because no more code string blocks exist and the comparison of every single code is aborted, "search failure" is returned and processing returns to the processing shown in FIG. 14A, FIG. 14B, or FIG. 14C.

Figure 24B:
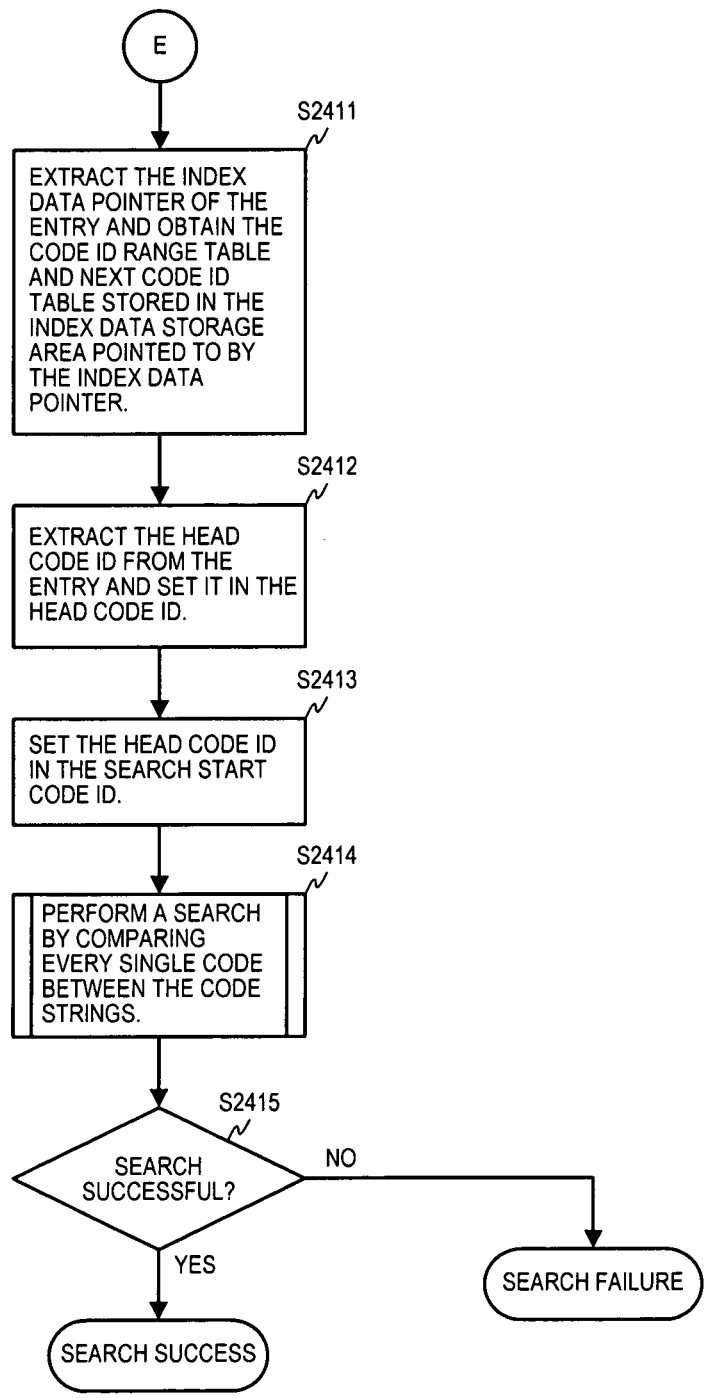
FIG. 24B is a drawing describing the processing flow of the latter stage of a search in the next code string block in an embodiment 4 of this invention.

Conversely, when the determination in step S2403 is that the setting indicator for the entry shows "Exists", processing proceeds to the steps S2411 and thereafter shown in FIG. 24B, and the comparison of every single code proceeds further.

FIG. 24B is a drawing describing the processing flow of the latter stage of a search for the next code string block in the embodiment 4 of this invention.

At step S2411 a code ID range table and next code ID table stored in the index data storage area pointed to by the index data pointer of the entry previously extracted at step S2402 shown in FIG. 24A.

Next, in step S2412, the head code ID in the index management table is extracted and set in the head code ID in the temporary storage area, and at step S2413, that head code ID is set in the search start code ID and processing proceeds to step S2414.

At step S2414, the processing shown in FIG. 14A, FIG. 14B, or FIG. 14C is recursively called out, and a search is performed by comparing each code in the code string block with every single code in the search code string from its head code to its tail code. Then whether the search is a success or a failure is reported.

At step S2415, if the search at step S2414 is successful, "search success" is returned, and if the search at step S2414 is a failure, "search failure" is returned, and processing returns to the processing shown in FIG. 14A, FIG. 14B, or FIG. 14C.

Hereinabove, details of the embodiment 4 of this invention have been described. Hereinbelow, in order to facilitate an understanding of this embodiment 4, the flow of processing in a full match search, which is one of the code string searches in the embodiment 4 of this invention, is described referencing FIG. 25A to FIG. 25C. In the examples shown in FIG. 25A to FIG. 25C, the search target code string is taken as that of the code string blocks up to the second block shown in FIG. 21A, and the search code string is taken as "ABC". Hereinafter, that search target code string is taken to be that expressed in the search target code string 10b, just as is shown in FIG. 21A.

Figure 25A:
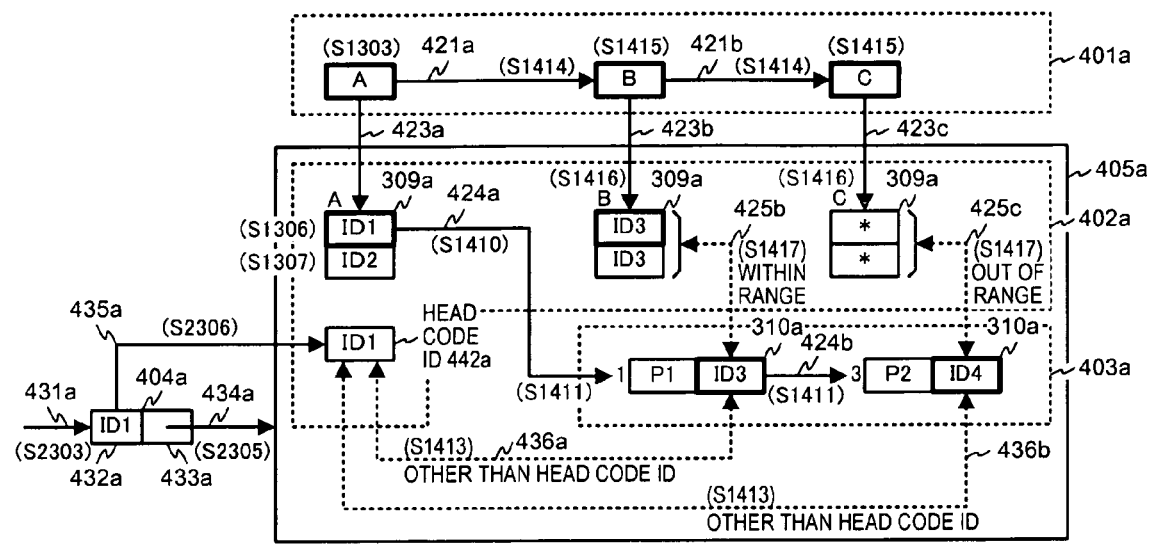
FIG. 25A is a drawing describing the flow of the search processing from the head code string block in an embodiment 4 of this invention.
Figure 25B:
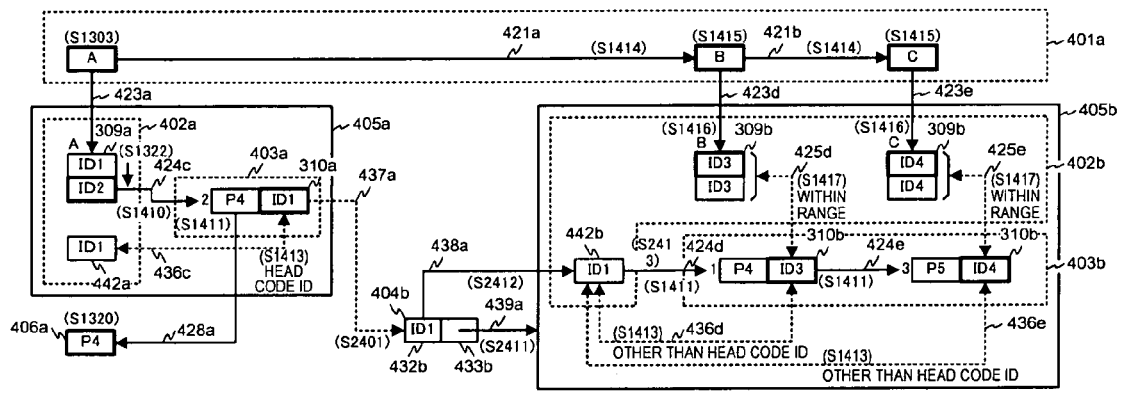
FIG. 25B is a drawing describing the flow of the transition to a search in the next code string block in an embodiment 4 of this invention.

FIG. 25A and FIG. 25B are drawings describing the flow of processing from the head code string block of a search target code string, and, regarding the outermost processing loop shown in FIG. 23, is equivalent to the first processing loop.

FIG. 25A describes the flow of a search that takes as its target the head code string block among all the code string blocks.

The block to which the reference numeral 401*a* is affixed delineates the flow of the processing of each of the search codes in the search code string ABC from its head. In other words, block 401*a* shows the changes in the code at the current search position. The block enclosed in a dotted line to which the reference numeral 402*a* is affixed delineates the code ID range in the code ID range table 309*a* entry pointed to by the code at the current search position and ID 1, which is the head code ID 442*a* in the code ID range table 309*a* entry pointed to by code A, which is at the head position in the code string block. The block to which the reference numeral 403*a* is affixed delineates the flow of obtaining in sequence next codes from the next code ID table 310.

Also, the step reference numbers enclosed in parentheses indicate processing steps shown in FIG. 13A to FIG. 14A and FIG. 23 to FIG. 24B that are related to the flow of processing shown in the drawing.

For the processing before a search starts, as shown by the arrow 431*a* in the drawing, at step S2303 in FIG. 23 (in the description hereinafter the notation of the figure number is omitted) the head entry 404*a* in the index data management table is extracted. Then, as shown by arrow 434*a*, at step S2305, the code ID range table 309*a* and next code ID table 310*a* stored in the index data storage area 405*a* are extracted based on the index data pointer 433*a* for that entry. Then, as shown by arrow 435*a*, at steps S2306, ID 1, which is the head code ID stored in head code ID 432*a* of entry 404*a*, is read out and set in head code ID 442*a*.

First, as shown in 401*a*, the code A located at the head of the search code is extracted at step S1303 and, as shown by the arrow 423*a* to 402*a*, ID 1, which is the head code ID in the code ID range table entry pointed to by code A, is extracted at step S1306 and is set in the search start code ID. And ID 1, which is the tail code, is extracted at step S1307 and set in the search termination code ID.

Next, as shown by the arrow 424*a* from ID1 in block 402*a* to block 403*a*, ID 3, which is the next code ID in the next code ID table 310 entry pointed to by ID 1, is extracted at step S1410 and step S1411. Then, as shown by the bi-directional dotted-line arrow 436*a* between ID 3, which is the next code ID in the next code ID table 310 entry pointed to by ID 1 in block 403*a*, and head code ID 442*a* in block 402*a*, in step S1413, a determination is made that ID 3, which is the next code ID, is different than ID 1, which is the head code ID.

Hence, as shown by the arrow 421*a* to the codes from A to B in 401*a*, at step S1417 the code at the next code position becomes the target of processing, and at step S1415 code B is extracted. As shown by the arrow 423*b* to 402*a*, ID 3, which is the head code ID for the code ID range table 309 entry pointed to by code B, and ID 3, which is the tail code ID, are extracted as the code ID range.

Then, as shown by the bidirectional dotted-line arrow 425*b* between ID 3, which is the next code ID in the next code ID table 310 entry pointed to by ID 1 in 403*a* and the range in the code ID range table 309 entry pointed to by code B in 402*a*, in step S1417, a determination is made that ID 3, which is the next code ID in the next code ID table 310 entry pointed to by ID 1, is within the code ID range in the code ID range table 309 entry pointed to by code B.

Hence, next, as shown by the arrow 424*b* in 403*a*, ID 4, which is the next code ID in the next code ID table 310 entry pointed to by ID 3, is extracted at step S1411. Then, as shown by the bi-directional dotted-line arrow 436*b* between ID 4, which is the next code ID in the next code ID table 310*a* entry pointed to by ID 3 in block 403*a*, and head code ID 442*a* in block 402*a*, in step S1413 a determination is made that ID 4, which is the next code ID, is different than ID 1, which is the head code ID.

Furthermore, as shown by the arrow 421*b* from code B to code C in 401*a*, at step S1414, the code at the next code position becomes the target of processing and at step S1415 the code C is extracted. As shown by the arrow 423*c* to 402*a*, at step S1416, the head code ID and the tail code ID in the code ID range table 309 entry pointed to by code C are extracted as the code ID range. However, as shown in the drawing, because code C does not exist in the head code string block, and a significant code ID is not stored in the head code ID and tail code ID (the IDs are set as "undefined" at step S1128*a* shown in FIG. 11B), the determination at step S1413 shown by bi-directional dotted-line arrow 425*c* is that the next code ID is outside the code range, and the search fails. At that point, "search failure" is returned and processing returns to the processing loop shown in FIG. 13B.

In other words, this shows that the code string starting from the code A for which the code ID is ID 1 in search target code string 10*b* does not match the search code string ABC. This code string from the code A for which the code ID is ID 1 in search target code string 10*b* is ABE, as shown in FIG. 21A, and thus does not match ABC.

FIG. 25B shows the flow of a search wherein ID 2, which is the next code ID after the ID 1 of code A, is made the search start code ID for the search code string ABC at step S1322. The processing loop shown in FIG. 13B consists of the first time processing shown in FIG. 25A and the second time processing shown in FIG. 25B.

Then, in this second time processing, the comparison between the search target code string and the search code string spans across to the next code string block after the head code string block.

As shown by the arrow in block 402*a* of FIG. 25B, at step S1322 in the processing loop shown in FIG. 13B, the search start code ID is updated from ID 1 to ID 2. Then, as shown by the arrow 424*c* from ID 2 of block 402*a* to block 403*a*, ID 1, which is the next code ID in the next code ID table 310*a* entry pointed to by ID 2, is extracted by step S1410 and step S1411. Also, as shown by the bi-directional dotted-line arrow 436*c* between ID 1, which is the next code ID in the next code ID table 310 entry pointed to by ID 2 in block 403*a*, and head code ID 442*a* in block 402*a*, in step S1413, a determination is made that ID 1, which is the next code ID, coincides with ID 1, which is the head code ID.

As a result, as shown by the dotted-line arrow 437*a*, in step S2401, entry 404*b*, which is the next entry in the index data management table after the head entry 404*a*, is extracted. Then, as shown by arrow 439*a* in the drawing, at step S2411, the code ID range table 309*b* and next code ID table 310*b* stored in the index data storage area 405*b* are obtained based the index data pointer 433*b* of entry 404*b*. Also, as shown by arrow 438*a* in the drawing, at step S2412, ID 1, which is the head code ID stored in the head code ID 432*b* of entry 404*b*, is set in the head code ID 442*b*.

Continuing, as shown by arrow 424*d*, ID 3, which is the next code ID in the next code ID table 310*b* entry pointed to by ID 1, which is set in head code ID 442*b*, is extracted by the processing of step S2413 and the processing of step S1411 shown in FIG. 14A which is recursively called out. Then, in step S1413, as shown by the bi-directional dotted-line arrow 436*d* between that ID 3 and the head code ID 442*b* of block 402*b*, a determination is made that the ID 3 that is the next code ID is different than the ID 1 that is the head code.

At that point, as shown by the arrow 421a from code A in block 401a to code B, at step S1414, the code at the next code position is made the target of processing, and at step S1415, the code B next after the head code, code A, is extracted from the search code string. As shown by the arrow 423d to block 402b, at step S1416, ID 3, which is the head code ID in the code ID range table 309b entry pointed to by code B, and the ID 3, which is the tail code ID in the same entry, are extracted as the code ID range. Then, as shown by the bidirectional dotted-line arrow 425d between ID 3, which is the next code ID in the next code ID table 310b entry pointed to by ID 1 in block 403b and the code ID range in the code ID range table 309b entry pointed to by code B in block 402b, in step S1417, a determination is made that ID 3, which is the next code ID in the next code ID table 310 entry pointed to by ID 1, is within the code ID range in the code ID range table 309b entry pointed to by code B.

As a result, next, as shown by arrow 424e in block 403b, ID 4, which is the next code ID in the next code ID table 310b entry pointed to by ID 3, is extracted at step S1411. Then, in step S1413, as shown by the bi-directional dotted-line arrow 436e between that ID 4, which is the next code ID, and the head code ID 442b of block 402b, a determination is made that the ID 4 is different than the ID 1 that is the head code.

Next, as shown by the arrow 421b from code B in block 401a to code C, at step S1414, the code at the next code position is made the target of processing, and at step S1415, the code C is extracted. As shown by the arrow 423e to block 402b, at step S1416, ID 4, which is the head code ID in the code ID range table 309b entry pointed to by code C, and the ID 4, which is the tail code ID in the same entry, are extracted as the code ID range.

Then, as shown by the bidirectional dotted-line arrow 425e between ID 4, which is the next code ID in the next code ID table 310b entry pointed to by ID 3 in block 403b and the code ID range in the code ID range table 309b entry pointed to by code C in block 402b, in step S1417, a determination is made that ID 4 is within the code ID range in the code ID range table 309b entry pointed to by code C.

In other words, this shows that the code string from the code A for which the code ID is ID 2 in search target code string 10b matches the search code string ABC. This agrees with the fact that the code string from the code A for which the code ID is ID 2 in search target code string 10b is ABC, as shown in FIG. 21A.

Then at step S1320, as shown by arrow 428a, the code position P4 for the next code ID table 310a entry pointed to by ID 2, which is the search start code ID, is set in the search result code position shown by reference numeral 406a.

Then, because ID 2, which is the search start code ID, is the search termination code ID specified in step S1307, the search of the head code string block with that search start position is terminated and a return is made to the processing loop shown in FIG. 23, wherein the search start position is incremented by 1, in other words, a search is performed from the top of the second code string block.

Figure 25C:
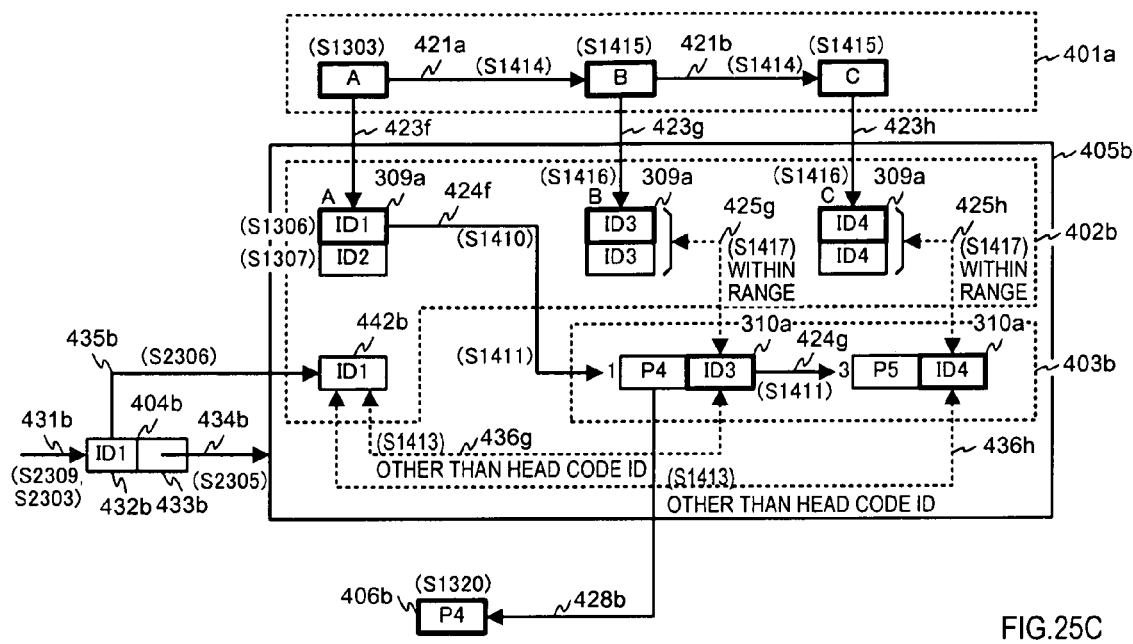
FIG. 25C is a drawing describing the flow of the search processing from the second code string block after the head code string block in an embodiment 4 of this invention.

FIG. 25C is drawing describing the flow of processing from the second code string block in the search target code string, and, regarding the outermost processing loop shown in FIG. 23, is equivalent to the processing of the second time through the loop. The flow of processing described hereinafter is the same as that described above referencing FIG. 25A.

As shown by arrow 431b in the drawing, the value of the index data management pointer for the search start position has been updated in step S2309 in the processing before the start of the search, and at step S2303 the top entry 404b in the index data management table is extracted. Then, as shown by the arrow 434b, at step S2305, based on the index data pointer 433b of that entry, the code ID range table 309b and next code ID table 310b stored in the index data storage area 405b are extracted. Also, as shown by the arrow 435b, at steps S2306, the ID 1, which is the head code ID stored in the head code ID 432b of that entry 404b, is read out and is set in head code ID 442b.

At the beginning of the search from the second code string block, in step S1303, the code A, which is located at the head of the search code string, is extracted again, as shown in block 401a. Then, as shown by the arrow 423f to block 402b, the ID 1 that is the head code ID in the entry in code ID range table 309b pointed to by code A is extracted at step S1306 and set in the search start code ID. Also, at step S1307 the ID 2 that is the tail code is extracted and set in the search termination code ID.

Next, as shown by arrow 424f from the ID 1 of block 402b to block 403b, ID 3, which is the next code ID in the next code ID table 310 entry pointed to by ID 1, is extracted by steps S1410 and S1411. Then, as shown by the bi-directional dotted-line arrow 436g between ID 3, which is the next code ID in the next code ID table 310 entry pointed to by ID 1 in block 403b, and head code ID 442b in block 402b, in step S1413, a determination is made that ID 3, which is the next code ID, is different than ID 1, which is the head code ID.

As a result, as shown by arrow 421a from code A in block 401a to code B, at step S1414, the code at the next code position becomes the target of processing, and code B is extracted at step S1415. As shown by arrow 423g to block 402b, at step S1416, the ID 3 that is the head code ID in the code ID range table 309b entry pointed to by code B and the ID 3 that is its tail code are extracted as the code ID range.

Then, as shown by the bi-directional dotted-line arrow 425g between ID 3, which is the next code ID in the next code ID table 310b entry pointed to by ID 1 in block 403b, and the code ID range in the code ID range table entry pointed to by code B, in step S1417, a determination is made that ID 3, which is the next code ID in the next code ID table 310b entry pointed to by ID 1, is within the code ID range in the code ID range table entry pointed to by code B.

As a result, next, as shown by the arrow 424g in block 403b, at step S1411, ID 4, which is the next code ID in the next code ID table 310b entry pointed to by ID 3, is extracted. Then, as shown by the bi-directional dotted-line arrow 436h between ID 4, which is the next code ID in the next code ID table 310 entry pointed to by ID 3 in block 403b, and head code ID 442b in block 402b, in step S1413, a determination is made that ID 4, which is the next code ID, is different than ID 1, which is the head code ID.

Next, as shown by arrow 421b from code B in block 401a to code C, at step S1414, the code at the next code position becomes the target of processing, and code C is extracted at step S1415. As shown by arrow 423h to block 402b, at step S1416, the ID 4 that is the head code ID in the code ID range table 309b entry pointed to by code C and the ID 4 that is its tail code are extracted as the code ID range.

Then, as shown by the bi-directional dotted-line arrow 425h between ID 4, which is the next code ID in the next code ID table 310b entry pointed to by ID 3 in block 403b, and the code ID range in the code ID range table entry pointed to by code C, in step S1417, a determination is made that ID 4, which is the next code ID in the next code ID table 310b entry pointed to by ID 3, is within the code ID range in the code ID range table entry pointed to by code C.

In other words, this shows that the code string from the code A for which the code ID is ID 1 in the second code string 15b matches the search code string ABC. This agrees with the fact that, of the codes in the second code string block 15*b*, the code string from the code A for which the code ID is ID 1 is ABC, as shown in FIG. 21A.

Then at step S1320, as shown by arrow 428*b*, the code position P4 for the next code ID table 310*a* entry pointed to by ID 1, which is the search start code ID, is set in the search result code position shown by reference numeral 406*b*.

Although the above described details of modes for implementing the embodiment 1 to the embodiment 4 of this invention, it is not limited to those preferred embodiments and it will be clear to one skilled in the art that various modifications are possible.

For example, it is possible to apply the code verification method in the embodiment 2 to the embodiment 1 and so forth in this invention. Also, the index data management table in the embodiment 2 and the embodiment 3 can contain a head code ID instead of a head code as in the embodiment 4.

Further the next code ID tables can contain, as a next code ID, a code ID different than all code IDs of all codes in the search target code string in the entry pointed to by a code ID of a code that is located in the last position in a code string block instead of a code ID of a code that is located in the first position in the code string block in order to decide whether the next code string search processing should be started.

Also it is clear that the code string search apparatus, with the storage means holding the code ID range table, the next code ID table and so on, can be constructed on a computer by programs that a computer is caused to execute to perform the code string search processing shown in FIG. 6A to FIG. 6D, FIG. 12 to FIG. 15B, FIG. 19A to FIG. 19B, FIG. 22 to FIG. 24B and art-recognized equivalents.

It is also clear that the index data creation apparatus and method of this invention can be implemented by programs executing on a computer the processing of creating index data for the code string search shown in FIG. 4 to FIG. 5C, FIG. 10A to FIG. 11C, FIG. 22, and art-recognized equivalents. Hence the means for creating the index data of this invention and so forth can be implemented on a computer by those programs.

Therefore, the programs, and a computer-readable storage medium into which the programs are stored are encompassed by the embodiments of the present invention. Furthermore, the data configuration of the index data for the code string searches of this invention and a computer-readable storage medium wherein is stored the index data having that data configuration are also encompassed by the embodiments of the present invention.

By using the new index data configurations of the code ID range table and next code ID table provided by this invention and described in detail above, the burden of creating index data is reduced and code string searches can be performed efficiently.

Also, in accordance with the embodiment 2 to the embodiment 4 of this invention, because the index data can be partitioned and stored in a plurality of storage areas, even if there is a profusion of index data, the code string block size can be optimized to fit the hardware environment being used and access to and maintenance of the index data can be made easy.

What is claimed is:

1. A code string search apparatus for searching search target code strings that are the object of a search by means of a search code string, comprising:
 a code ID range table holding a code ID range for each code of a same code type, which is a range of code IDs uniquely identifying each and every code located in a search target code string;
 a next code ID table holding, corresponding to each of the code IDs, a next code ID, which is a code ID of a code located next to a code whose code ID is said each of the code IDs in the search target code string;
 a search code string read-out means that reads out a search code string;
 a code ID range read-out means that successively reads out from the code ID range table a code ID range pointed to by a code type of each code from the head code configuring the search code string read out by the search code string read-out means;
 a next code ID read-out means that reads out from the next code ID table a next code ID held corresponding to the code ID included within the code ID range pointed to by a code type of the head code in the search code string and read out by the code ID range read-out means, and after that successively reads out from the next code ID table the next code ID held corresponding to the read-out next code ID; and
 a code ID verify means that verifies whether the next code ID read out by the next code ID read-out means is included within the code ID range read out by the code ID range read-out means.

2. A code string search apparatus according to claim 1, wherein,
 when a head code ID is taken to be a first code ID, which head code ID is included within the code ID range pointed to by a code type of a first code which is the head code of the search code string,
 the code ID verify means verifies whether the next code ID held corresponding to the first code ID and read out by the next code ID read-out means is included within the code ID range pointed to by a code type of a second code which is a code located next to the first code in the search target code string, and after that, when the positions in the search code string of the first code and the second code are updated by the read-out operation of the code ID range read-out means and the next code ID read-out means,
 the code ID verify means verifies whether the next code held corresponding to the code ID of the first code, whose position has been updated, is included within the code ID range pointed to by a code type of the second code, whose position has been updated.

3. A code string search apparatus according to claim 2, wherein
 the next code ID table holds, corresponding to each of the code IDs, a code position which shows the position of a code whose code ID is said each of the code IDs in the search target code string, and
 when the verification whether the next code ID read out by the next code ID read-out means is included within the code ID range read out by the code ID range read-out means succeeds from a head code of the search code string to a tail code of the search code string,
 the code ID verify means outputs as a search result code position a code position held in the next code ID table corresponding to the code ID of the head code.

4. A code string search apparatus according to claim 3, wherein
 a next code ID and a code position held in the next code ID table corresponding to a code ID are held contiguously in code position sequence for the code IDs of codes of the same code type.

5. A code string search apparatus according to claim 4, wherein the code ID verify means, using each of all the code IDs included within the code ID range pointed to by the code type of the head code in the search code string as a head code ID, verifies whether the next code ID read out by the next code ID read-out means is included within the code ID range read out by the code ID range read-out means.

6. A code string search apparatus according to claim 5, wherein
the code ID verify means outputs as search result code positions, when the verification of whether a next code ID read out by the next code ID read-out means is included within the code ID range read out by the code ID range read-out means fails, the code position held in the same entry in the next code ID table in which the next code ID was held and the code position held in the next code ID table entry corresponding to the code ID of the head code.

7. A code string search apparatus according to claim 5, wherein
the search code string includes an any-code to verify any codes, and
instead of verifying whether the next code ID read out by the next code ID read-out means is included in the code ID range read out by the code ID range read-out means when the any-code is the second code,
the code ID verify means performs verification on the code located after the any-code in the search code string as the second code.

8. A code string search method performed by the code string search apparatus according to claim 1, comprising:
a search code string read-out step that reads out a search code string;
a code ID range read-out step that successively reads out from the code ID range table a code ID range pointed to by a code type of each code from the head code configuring the search code string read out at the search code string read-out step;
a next code ID read-out step that reads out from the next code ID table a next code ID held corresponding to the code ID included within the code ID range pointed to by a code type of the head code in the search code string and read out at the code ID range read-out step, and after that successively reads out from the next code ID table the next code ID held corresponding to the read-out next code ID; and
a code ID verify step that verifies whether the next code ID read out at the next code ID read-out step is included within the code ID range read out at the code ID range read-out step.

9. A code string search method according to claim 8, wherein,
when a head code ID is taken to be a first code type, which head code ID is included within the code ID range pointed to by a code type of a first code which is the head code of the search code string,
the code ID verify step verifies whether the next code ID held corresponding to the first code ID and read out at the next code ID read-out step is included within the code ID range pointed to by a code type of a second code which is a code located next to the first code in the search target code string, and after that, when the positions in the search code string of the first code and the second code are updated by the read-out operation of the code ID range read-out step and the next code ID read-out step, the code ID verify step verifies whether the next code held corresponding to the code ID of the first code, whose position has been updated, is included within the code ID range pointed to by a code type of the second code, whose position has been updated.

10. A code string search method according to claim 9, wherein
the next code ID table holds, corresponding to each of the code IDs, a code position which shows the position of a code whose code ID is said each of the code IDs in the search target code string, and
when the verification whether the next code ID read out at the next code ID read-out step is included within the code ID range read out at the code ID range read-out step succeeds from a head code of the search code string to a tail code of the search code string,
the code ID verify step outputs as a search result code position a code position held in the next code ID table corresponding to the code ID of the head code.

11. A code string search method according to claim 10, wherein
the code ID verify step, using each of all the code IDs included within the code ID range pointed to by the code type of the head code in the search code string as a head code ID, verifies whether the next code ID read out at the next code ID read-out step is included within the code ID range read out at the code ID range read-out step.

12. A code string search program for causing a computer to execute a code string search method according to claim 8.

13. A code string search program for causing a computer to execute a code string search method according to claim 9.

14. A code string search program for causing a computer to execute a code string search method according to claim 10.

15. A code string search program for causing a computer to execute a code string search method according to claim 11.

16. A non-transitory computer readable medium storing a code string search program according to claim 12.

17. A data configuration adapted to a code string search method for searching search target code strings that are the object of a search by means of a search code string, comprising:
a code ID range table holding a code ID range for each code of a same code type, which is a range of code IDs uniquely identifying each and every code located in a search target code string;
a next code ID table holding, corresponding to each of the code IDs, a next code ID, which is a code ID of a code located next to a code whose code ID is said each of the code IDs in the search target code string; and wherein,
a code string search method according to claim 8 is enabled by using the code ID range table and the next code ID table.

18. A data configuration according to claim 17, wherein
the next code ID table holds, corresponding to each of the code IDs, a code position which shows the position of a code whose code ID is said each of the code IDs in the search target code string.

19. A data configuration according to claim 18, wherein
a next code ID and a code position held in the next code ID table corresponding to a code ID are held contiguously in code position sequence for each code ID of codes of the same code type.

20. A non-transitory computer readable medium storing a data configuration according to claim 17.

21. An index data creation apparatus for a code string search searching search target code strings that are the object of a search by means of a search code string, comprising:

a search target code string read-out means that reads out the search target code string and obtains the number of occurrences of each code type of codes in the read-out search target code string;

a code ID range table creation means that creates a code ID range table holding a code ID range for each code of a same code type, which is a range of code IDs uniquely identifying each and every code located in the search target code string, based on the number of occurrence of each code type obtained by the search target code string read-out means;

a next code ID table creation means that creates a next code ID table holding, corresponding to each of the code IDs, a next code ID, which is a code ID of a code located next to a code whose code ID is said each of the code IDs in the search target code string, based on the search target code string read out by the search target code string read-out means and the code ID range table.

22. An index data creation apparatus according to claim 21, wherein the next code ID table further holds, corresponding to each of the code IDs, a code position which shows the position of a code whose code ID is said each of the code IDs in the search target code string, and a next code ID and a code position held in the next code ID table corresponding to a code ID are held contiguously in code position sequence for the code IDs of the same code type.

23. An index data creation method performed by the index data creation apparatus according to claim 21, comprising:

a search target code string read-out step that reads out the search target code string and obtains the number of occurrences of each code type of codes in the read-out search target code string;

a code ID range table creation step that creates a code ID range table holding code ID range for each code of a same code type, which is a range of code IDs uniquely identifying each and every code located in the search target code string, based on the number of occurrence of each code type obtained at the search target code string read-out step;

a next code ID table creation step that creates a next code ID table holding, corresponding to each of the code IDs, a next code ID, which is a code ID of a code located next to a code whose code ID is said each of the code IDs in the search target code string, based on the search target code string read out at the search target code string read-out step and the code ID range table.

24. An index data creation program for causing a computer to execute an index data creation method according to claim 23.

25. A non-transitory computer readable medium storing an index data creation program according to claim 24.

26. A code string search apparatus for searching search target code strings that are the object of a search by means of a search code string, comprising:

code ID range tables, each of the code ID range tables holding code ID range for each code of the same type, which is a range of code IDs uniquely identifying each and every code located in each of code string blocks that are parts of a search target code string that is partitioned into a plurality of the code string blocks;

next code ID tables, each of the next code ID tables holding, corresponding to each of the code IDs, a next code ID, which is a code ID of a code located next after a code whose code ID is said each of the code IDs in a code string block that is a part of the search target code string, and if a code is located in last position in a code string block, a next code ID table holds, as a next code ID corresponding to a code ID of the code in the last position, a code ID of a code located in a first position of the code string block;

a search execution part for executing searches with a search code string, referencing the code ID range tables and the next code ID tables;

an index data management table holding head codes, each of the head codes being located at a leading position in each of code string blocks;

a search management part that manages an execution of a search by the search execution part;

wherein the search execution part is provided with a search code string read-out means that reads out a search code string, and a code ID range read-out means that successively reads out from the code ID range table corresponding to a specified code string block a code ID range pointed to by a code type of each code from the head code configuring the search code string read out by the search code string read-out means, and a next code ID read-out means that reads out from the next code ID table corresponding to the specified code string block a next code ID pointed to by a code ID included within the code ID range pointed to by a code type of the head code in the search code string, and after that successively reads out from the next code ID table the next code ID held corresponding to the read-out next code ID, and makes a determination whether the next code ID coincides with a code ID of the head code in the code string block, and a code ID verify means that, when the next code ID read out by the next code ID read-out means does not coincide with the code ID of the head code in the code string block, verifies whether the next code ID is included within the code ID range read out by the code ID range read-out means; and wherein the search management part successively specifies a code string block from the first code string block for the search execution part and, when it is determined by the next code ID read-out means that the next code ID read out coincides with the code ID of the head code in the code string block, reads out from the index data management table a head code in a code string block located next to the code string block and by comparing the head code with a code in the search code string specifies for the search execution part the code string block located next to the code string block.

27. A code string search apparatus according to claim 26, wherein, when a head code ID is taken to be a first code ID, which head code ID is included within the code ID range pointed to by a code type of a first code which is the head code of the search code string, the code ID verify means verifies whether the next code ID held corresponding to the first code ID and read out by the next code ID read-out means is included within the code ID range pointed to by a code type of a second code which is a code located next to the first code in the search target code string, and after that, when the positions in the search code string of the first code and the second code are updated by the read-out operation of the code ID range read-out means and the next code ID read-out means, the code ID verify means verifies whether the next code held corresponding to the code ID of the first code, whose position has been updated, is included within the code ID range pointed to by a code type of the second code, whose position has been updated, and the code compared with the head code by the search management part is a code located next to a first code which points to a next code table entry holding the next code ID read out.

28. A code string search apparatus according to claim 27, wherein the next code ID table holds, corresponding to each of the code IDs, a code position which shows the position of a code whose code ID is said each of the code IDs in the search target code string, and when the verification whether the next code ID read out by the next code ID read-out means is included within the code ID range read out by the code ID range read-out means succeeds from a head code of the search code string to a tail code of the search code string, the code ID verify means outputs as a search result code position a code position held in the next code ID table corresponding to the code ID of the head code.

29. A code string search apparatus according to claim 28, wherein a next code ID and a code position held in a next code ID table corresponding to a code ID are held contiguously in code position sequence for the code IDs of codes of the same code type.

30. A code string search apparatus according to claim 29, wherein the code ID verify means, using each of all the code IDs included within the code ID range pointed to by the code type of the head code in the search code string as a head code ID, verifies whether the next code ID read out by the next code ID read-out means is included within the code ID range read out by the code ID range read-out means.

31. A code string search apparatus according to claim 30, wherein the code ID verify means outputs as search result code positions, when the verification of whether a next code ID read out by the next code ID read-out means is included within the code ID range read out by the code ID range read-out means fails, the code position held in the same entry in the next code ID table in which the next code ID held and the code position held in the next code ID table entry corresponding to the code ID of the head code.

32. A code string search apparatus according to claim 30, wherein the search code string includes an any-code to verify any codes, and instead of verifying whether the next code ID read out by the next code ID read-out means is included in the code ID range read out by the code ID range read-out means taking the any-code as the second code, the code ID verify means performs verification on the code located after the any-code in the search code string as the second code.

33. A code string search method performed by the code string search apparatus according to claim 26, comprising:

a search code string read-out step that reads out a search code string;

a code ID range read-out step that successively reads out from the code ID range table corresponding to a specified code string block a code ID range pointed to by a code type of each code from the head code configuring the search code string read out at the search code string read-out step;

a next code ID read-out step that reads out from the next code ID table corresponding to the specified code string block a next code ID pointed to by a code ID included within the code ID range pointed to by a code type of the head code in the search code string, and after that successively reads out from the next code ID table the next code ID held corresponding to the read-out next code ID, and makes a determination whether the next code ID coincides with a code ID of the head code in the code string block;

a code ID verify step that, when the next code ID read out at the next code ID read-out step does not coincide with the code ID of the head code in the code string block, verifies whether the next code ID is included within the code ID range read out at the code ID range read-out step;

a search start position specifying step that successively specifies a code string block from the first code string block; and a next code string block specifying step that, when it is determined at the next code ID read-out step that the next code ID read out coincides with the code ID of the head code in the code string block, reads out from the index data management table a head code in a code string block located next to the code string block and by comparing the head code with a code in the search code string specifies the code string block located next to the code string block.

34. A code string search method according to claim 33, wherein, when a head code ID is taken to be a first code type, which head code ID is included within the code ID range pointed to by a code type of a first code which is the head code of the search code string, the code ID verify step verifies whether the next code ID held corresponding to the first code ID and read out at the next code ID read-out step is included within the code ID range pointed to by a code type of a second code which is a code located next to the first code in the search target code string, and after that, when the positions in the search code string of the first code and the second code are updated by the read-out operation of the code ID range read-out step and the next code ID read-out step, the code ID verify step verifies whether the next code held corresponding to the code ID of the first code, whose position has been updated, is included within the code ID range pointed to by a code type of the second code, whose position has been updated, and when the next code ID read out by the next code ID read-out step coincides with the code ID of the head code in a code string block, the next code string specifying step reads out from the index data management table the head code in the code string block located next to the code string block and by comparing the head code with the code located next to the first code when both coincide specifies the code string block located next.

35. A code string search method according to claim 34, wherein the next code ID table holds, corresponding to each of the code IDs, a code position which shows position of a code whose code ID is said each of the code IDs in the search target code string, and when the verification whether the next code ID read out at the next code ID read-out step is included within the code ID range read out at the code ID range read-out step succeeds from a head code of the search code string to a tail code of the search code string, the code ID verify step outputs as a search result code position a code position held in the next code ID table corresponding to the code ID of the head code.

36. A code string search method according to claim 35, wherein the code ID verify step, using each of all the code IDs included within the code ID range pointed to by the code type of the head code in the search code string as a head code ID, verifies whether the next code ID read out at the next code ID read-out step is included within the code ID range read out at the code ID range read-out step.

37. A code string search program for causing a computer to execute a code string search method according to claim 33.

38. A code string search program for causing a computer to execute a code string search method according to claim 34.

39. A code string search program for causing a computer to execute a code string search method according to claim 35.

40. A code string search program for causing a computer to execute a code string search method according to claim 36.

41. A non-transitory computer readable medium storing a code string search program according to claim 37.

42. A data configuration adapted to a code string search method for searching search target code strings that are object of a search by means of a search code string, comprising:

code ID range tables, each of the code ID range tables holding a code ID range for each code of the same type, which is a range of code IDs uniquely identifying each and every code located in each of code string blocks that are parts of a search target code string that is partitioned into a plurality of the code string blocks;

next code ID tables, each of the next code ID tables holding, corresponding to each of the code IDs, a next code ID, which is a code ID of a code located next after a code whose code ID is said each of the code IDs in a code string block that is a part of the search target code string, and if a code is located in last position in a code string block, a next code ID table holds, as a next code ID corresponding to a code ID of the code in the last position, a code ID of a code located in a first position of the code string block;

an index data management table holding head codes, each of the head codes being located at a leading position in each of code string blocks; and wherein, a code string search method according to claim 33 is enabled by using the code ID range table, the next code ID table, and the index data management table.

43. A data configuration according to claim 42, wherein a next code ID table holds, corresponding to each of the code IDs, a code position which shows position of a code whose code ID is said each of the code IDs in the search target code string.

44. A data configuration according to claim 43, wherein a next code ID and a code position held in the next code ID table corresponding to a code ID are held contiguously in code position sequence for the code IDs of codes with the same code type.

45. A non-transitory computer readable medium storing a data configuration according to claim 42.

46. An index data creation apparatus for a code string search searching search target code strings that are the object of a search by means of a search code string, comprising:

a search target code string read-out means that successively reads out code string blocks that are parts of a search target code string that is partitioned into a plurality of blocks and obtains a number of occurrences of each code type of codes in the read-out code string block;

a code ID range table creation means that creates code ID range tables, each of the code ID range tables holding a code ID range for each code of the same type, which is a range of code IDs uniquely identifying each and every code located in each of the code string blocks, based on the number of occurrences of each code type obtained by the search target code string read-out means;

a next code ID table creation means that creates next code ID tables, each of the next code ID tables holding, corresponding to each of the code IDs, a next code ID, which is a code ID of a code located next after a code whose code ID is said each of the code IDs in a code string block, based on the code string blocks read out by the search target code string read-out means and the code ID range table; and an index data creation management means that reserves an index data storage area holding the code ID range table and the next code ID table corresponding to a code string block for each such code string block and creates an index data management table holding, for each code string block, a code located at leading position of the code string block and a pointer to the index data storage area for each code string block.

47. An index data creation apparatus according to claim 46, wherein a next code ID table further holds, corresponding to each of the code IDs, a code position which shows the position of a code whose code ID is said each of the code IDs in a code string block, and a next code ID and a code position held in the next code ID table corresponding to a code ID are held contiguously in code position sequence for the code IDs of codes of the same code type.

48. An index data creation method performed by the index data creation apparatus according to claim 46, comprising:

a search target code string read-out step that successively reads out a code string block that is part of a search target code string that is partitioned into a plurality of blocks and obtains a number of occurrences of each code type of codes in the read-out code string block;

a code ID range table creation step that creates a code ID range table holding a code ID range for each code of the same type, which is a range of code IDs uniquely identifying each and every code located in each of the code string blocks, based on the number of occurrences of each code type obtained at the search target code string read-out step;

a next code ID table creation step that creates a next code ID tables holding, corresponding to each of the code IDs, a next code ID, which is a code ID of a code located next after a code whose code ID is said each of the code IDs in a code string block, based on the code string block read out at the search target code string read-out step and the code ID range table created at the code ID range table creation step; and wherein the search target code string read-out step, the code ID range table creation step, and the next code ID table creation step are repeatedly executed on all of the code string blocks.

49. An index data creation program for causing a computer to execute an index data creation method according to claim 48.

50. A non-transitory computer readable medium storing an index data creation program according to claim 49.

51. A code string search apparatus for searching search target code strings that are object of a search by means of a search code string, comprising:
- code ID range tables, each of the code ID range tables holding a code ID range for each code of the same type, which is a range of code IDs uniquely identifying each and every code located in each of code string blocks that are parts of a search target code string that is partitioned into a plurality of the code string blocks;
- next code ID tables, each of the next code ID tables holding, corresponding to each of the code IDs, a next code ID, which is a code ID of a code located next after a code whose code ID is said each of the code IDs in a code string block that is a part of the search target code string, and if a code is located in last position in a code string block, a next code ID table holds, as a next code ID corresponding to a code ID of the code in the last position, a code ID of a code located in a first position of the code string block;
- a search execution part for executing searches with a search code string, referencing the code ID range tables and the next code ID tables;
- an index data management table holding head codes, each of the head codes being located at a leading position in each of code string blocks;
- a search management part that manages an execution of a search by the search execution part;
- wherein the search execution part is provided with
- a search code string read-out means that reads out a search code string, and
- a code ID range read-out means that successively reads out from the code ID range table corresponding to a specified code string block a code ID range pointed to by a code type of each code from the head code configuring the search code string read out by the search code string read-out means, and
- a next code ID read-out means that reads out from the next code ID table corresponding to the specified code string block a next code ID pointed to by a code ID included within the code ID range pointed to by a code type of the head code in the search code string, and after that successively reads out from the next code ID table the next code ID held corresponding to the read-out next code ID, and makes a determination whether the next code ID coincides with a code ID of the head code in the code string block, and
- a code type search means that, when the next code ID read out by the next code ID read-out means does not coincide with the code ID of the head code in the code string block, successively reads out the code ID ranges for the code types from the code ID range table and by verifying whether the next code ID is included within a read-out code range searches for a code type pointing to an entry of the code ID range table holding a code ID range within which the next code ID that is included, and
- a code type verify means that verifies whether the code type of the code read out by the search code string read-out means coincides with the code type found by the code type search means; and wherein
- the search management part
- successively specifies a code string block from the first code string block in the search execution part and,
- when it is determined by the next code ID read-out means that the next code ID read out coincides with the code ID of the head code in the code string block, reads out from the index data management table a head code in a code string block located next to the code string block and by comparing the head code with a code in the search code string specifies for the search execution part the code string block located next to the code string block.

52. A code string search apparatus according to claim 51, wherein
- the code type search means searches for an index code, which is a code type pointing to an entry of the code ID range table holding a code ID range within which a next code ID is included, the next code ID which is held in the next code ID table corresponding to a head code ID that is included in the code ID range for the code type of a first code, which is the head code in the search code string, and
- the code type verify means verifies whether the index code coincides with a code type of a second code at a position next to a position in which the first code is located in the search code string, and after that,
- when the positions in the search code string for the first code and the second code are updated by the read-out operations of the code ID range read-out means,
- the code type search means searches for an index code pointing to an entry of the code ID range table holding a code ID range within which the next code ID held in the next code ID table corresponding to the code ID of the first code whose position is updated is included, and
- the code type verify means verifies whether the index code coincides with a code type of the second code at an updated position, and
- the code compared with the head code by the search management part is a code located next to a first code which points to a next code table entry holding the next code ID read out, and when the code type of the code compared with the head code coincides with the code type of the head code, the search management part specifies for the search execution part the code string block located next to the code string block.

53. A code string search apparatus according to claim 52, wherein
- the next code ID table holds, corresponding to each of the code IDs, a code position which shows the position of a code whose code ID is said each of the code IDs in the search target code string, and
- when the verification whether the code types of the head code and those thereafter read out by the search code string read-out means coincide with the index codes found by the code type search means succeeds from a head code of the search code string to a tail code of the search code string,
- the code type verify means outputs as a search result code position a code position held in the next code ID table corresponding to the code ID of the head code.

54. A code string search apparatus according to claim 53, wherein
- a next code ID and a code position held in a next code ID table corresponding to a code ID are held contiguously in code position sequence for the code IDs of codes of the same code type.

55. A code string search apparatus according to claim 54, wherein
- using each of all the code IDs included within the code ID range pointed to by the code type of the head code in the search code string as a head code ID,
- the code type search means searches for an index code and the code type verify means verifies whether the index code coincides with the code type of the second code.

56. A code string search apparatus according to claim 55, wherein,
when the verification whether an index code coincides with a code type of the second code fails, the code type verify means outputs as search result code positions the code position held in the same entry in the next code ID table in which the next code ID was held and the code position held in the next code ID table entry corresponding to the code ID of the head code.

57. A code string search apparatus according to claim 55, wherein
the search code string includes an any-code to verify any codes, and
instead of a search for an index code pointing to an entry of the code ID range table holding a code ID range within which the next code ID read out by the next code ID read-out means taking the any-code as the first code,
the code type search means searches for an index code pointing to an entry of the code ID range table holding a code ID range within which a next code ID read out by the next code ID read-out means taking a code located after the any-code in the search code string as the first code.

58. A code string search method performed by the code string search apparatus according to claim 51, comprising:
a search code string read-out step that reads out a search code string;
a code ID range read-out step that successively reads out from the code ID range table corresponding to a specified code string block a code ID range pointed to by a code type of each code from the head code configuring the search code string read out at the search code string read-out step;
a next code ID read-out step that reads out from the next code ID table corresponding to the specified code string block a next code ID pointed to by a code ID included within the code ID range pointed to by a code type of the head code in the search code string, and after that successively reads out from the next code ID table the next code ID held corresponding to the read-out next code ID, and makes a determination whether the next code ID coincides with a code ID of the head code in the code string block;
a code type search step that, when the next code ID read out at the next code ID read-out step does not coincide with the code ID of the head code in the code string block, successively reads out the code ID ranges for the code types from the code ID range table and by verifying whether the next code ID is included within a read-out code range searches for a code type pointing to an entry of the code ID range table holding a code ID range within which the next code ID that is included;
a code type verify step that verifies whether the code type of the code read out at the search code string read-out step coincides with the code type found at the code type search step;
a search start position specifying step that successively specifies a code string block starting from the first code string block; and
a next code string block specifying step that, when it is determined at the next code ID read-out step that the next code ID read out coincides with the code ID of the head code in the code string block, reads out from the index data management table a head code in a code string block located next to the code string block and by comparing the head code with a code in the search code string specifies for the search execution part the code string block located next to the code string block.

59. A code string search method according to claim 58, wherein
the code type search step searches for an index code, which is a code type pointing to an entry of the code ID range table holding a code ID range within which a next code ID is included, the next code ID which is held in the next code ID table corresponding to a head code ID that is included in the code ID range for the code type of a first code, which is the head code in the search code string, and
the code type verify step verifies whether the index code coincides with a code type of a second code at a position next to a position in which the first code is located in the search code string, and after that,
when the positions in the search code string for the first code and the second code are updated by the read-out operations at the code ID range read-out step,
the code type search step searches for an index code pointing to an entry of the code ID range table holding a code ID range within which the next code ID held in the next code ID table corresponding to the code ID of the first code whose position is updated is included, and
the code type verify step verifies whether the index code coincides with a code type of the second code at an updated position, and
when the next code ID read out by the next code ID read-out step coincides with the code ID of the head code in a code string block,
the next code string specifying step reads out from the index data management table the head code in the code string block located next to the code string block, compares the head code with the code located next to the first code, and specifies the code string block located next when the head code coincide with the code located next to the first code.

60. A code string search method according to claim 59, wherein
the next code ID table holds, corresponding to each of the code IDs, a code position which shows position of a code whose code ID is said each of the code IDs in the search target code string, and
when the verification whether the code types of the head code and those thereafter read out at the search code string read-out step coincide with the index codes found at the code type search step succeeds from a head code of the search code string to a tail code of the search code string,
the code type verify step outputs as a search result code position a code position held in the next code ID table corresponding to the code ID of the head code.

61. A code string search method according to claim 60, using each of all the code IDs included within the code ID range pointed to by the code type of the head code in the search code string as a head code ID,
the code type search step searches for an index code and
the code type verify step verifies whether the index code coincides with the code type of the second code.

62. A code string search program for causing a computer to execute a code string search method according to claim 58.

63. A code string search program for causing a computer to execute a code string search method according to claim 59.

64. A code string search program for causing a computer to execute a code string search method according to claim 60.

65. A code string search program for causing a computer to execute a code string search method according to claim 61.

66. A non-transitory computer readable medium holding a code string search program according to claim 62.

67. A code string search apparatus for searching search target code strings that are the object of a search by means of a search code string, comprising:
  code ID range tables, each of the code ID range tables holding a code ID range for each code of the same type, which is a range of code IDs uniquely identifying each and every code located in each of code string blocks that are parts of a search target code string that is partitioned into a plurality of the code string blocks, and are designed so that tail codes of the code string blocks are duplicated in the head codes of following code string blocks;
  next code ID tables, each of the next code ID tables holding, corresponding to each of the code IDs, a next code ID, which is a code ID of a code located next after a code whose code ID is said each of the code IDs in a code string block that is a part of the search target code string, and if a code is located in tail position in a code string block, a next code ID table holds, as a next code ID corresponding to a code ID of the code in the tail position, a code ID of a code located in a head position of the code string block;
  a search execution part for executing searches with a search code string, referencing the code ID range tables and the next code ID tables;
  an index data management table holding, for each code string block, a head code ID which is a code ID of a head code of the code string block;
  a search management part that manages an execution of a search by the search execution part;
  wherein the search execution part is provided with
  a search code string read-out means that reads out a search code string, and
  a code ID range read-out means that successively reads out from the code ID range table corresponding to a specified code string block a code ID range pointed to by a code type of each code from the head code or a second code in the search code string read out by the search code string read-out means, and
  a next code ID read-out means that reads out from the next code ID table corresponding to the above specified code string block a next code ID pointed to by a code ID included within the code ID range read out by the code ID range read-out means for the code type of the head code in the search code string or a next code ID held corresponding to the head code ID in the code string block specified above and stored in the index data management table, and after that successively reads out from the next code ID table for a specified code string block the next code ID held corresponding to the read-out next code ID, and makes a determination whether the next code ID coincides with the head code ID in the code string block, and
  a code ID verify means that, when the next code ID read out by the next code ID read-out means does not coincide with the code ID of the head code in the code string block, verifies whether the next code ID is included within the code ID range read out by the code ID range read-out means; and
  wherein
  the search management part successively specifies to the search execution part a code string block starting from the first code string block and,
  when it is determined by the next code ID read-out means that the next code ID read out coincides with the code ID of the head code in the code string block,
  specifies to the search execution part a code string block located next after the code string block, and
  when the search management part successively specifies a code string block,
  the code range read-out means successively reads out a code ID range of a code type for each code starting from the head code in the search code string, and
  the next code ID read-out means first reads out from the next code ID table corresponding to the above specified code string block the next code ID stored corresponding to a code ID included within the code ID range for the code type of the head code in the search code string, and
  when the search management part specifies a code string block located next,
  the code ID range read-out means successively reads out a code ID range of a code type for each code starting from the second code in the search code string, and
  the next code ID read-out means first reads out from next code ID table corresponding to the above specified code string block the next code ID stored corresponding to the head code ID in the above specified code string block and stored in the index data management table.

68. A code string search apparatus according to claim 67, wherein
  when the code ID of a search code string head code in the search code string, which is a code ID included in the code ID range, read out by the code ID range read-out means, for the code type of the head code in the search code string or the head code ID which is held in the index data management table entry of the code string block specified is taken to be a first code ID and a code whose code ID is the first code ID is taken to be a first code,
  the code ID verify means verifies whether the next code ID held in the next code ID table corresponding to the first code ID is included in the code ID range corresponding to a code type of a second code, which is a code located next to the first code in the search target code string, and thereafter,
  when the positions in the search code string of the first code and the second code are updated by the read-out operation of the code ID range read-out means and the next code ID read-out means, the code ID verify means verifies whether the next code ID held corresponding to the code ID of the first code, whose position has been updated, is included within the code ID range for the code type of the second code, whose position has been updated.

69. A code string search apparatus according to claim 68, wherein
  the next code ID table holds, corresponding to each of the code IDs, a code position which shows position of a code whose code ID is said each of the code IDs in the search target code string, and
  when the verification whether the next code ID read out by the next code ID read-out means is included within the code ID range read out by the code ID range read-out means succeeds from a head code of the search code string to a tail code of the search code string,
  the code ID verify means outputs as a search result code position a code position held in the next code ID table corresponding to the code ID of the head code.

70. A code string search apparatus according to claim 69, wherein a next code ID and a code position held in a next code ID table corresponding to a code ID are held contiguously in code position sequence for the code IDs of codes with the same code type.

71. A code string search apparatus according to claim 70, wherein
the code ID verify means, using each of all the code IDs included within the code ID range pointed to by the code type of the head code in the search code string as the code ID of the head code of the search code string, verifies whether the next code ID read out by the next code ID read-out means is included within the code ID range read out by the code ID range read-out means.

72. A code string search apparatus according to claim 71, wherein
the code ID verify means outputs as search result code positions, when the verification of whether a next code ID read out by the next code ID read-out means is included within the code ID range read out by the code ID range read-out means fails, the code position held in the same entry in the next code ID table in which the next code ID is held and the code position held in the next code ID table entry corresponding to the code ID of the head code.

73. A code string search apparatus according to claim 71, wherein
the search code string includes an any-code to verify any codes, and
instead of verifying whether the next code ID read out by the next code ID read-out means is included in the code ID range read out by the code ID range read-out means taking the any-code as the second code,
the code ID verify means performs verification on the code located after the any-code in the search code string as the second code.

74. A code string search method performed by the code string search apparatus according to claim 67, comprising:
a search code string read-out step that reads out a search code string;
a code ID range read-out step that successively reads out from the code ID range table corresponding to a specified code string block a code ID range pointed to by a code type of each code from the head code or a second code in the search code string read out at the search code string read-out step;
a next code ID read-out step that reads out from the next code ID table corresponding to the above specified code string block a next code ID pointed to by a code ID included within the code ID range read out at the code ID range read-out step for the code type of the head code in the search code string or a next code ID held corresponding to the head code ID in the code string block specified above and stored in the index data management table, and after that successively reads out from the next code ID table for a specified code string block the next code ID held corresponding to the read-out next code ID, and makes a determination whether the next code ID coincides with the head code ID in the code string block;
a code ID verify means that, when the next code ID read out at the next code ID read-out step does not coincide with the code ID of the head code in the code string block, verifies whether the next code ID is included within the code ID range read out at the code ID range read-out step;
a search start position specifying step that successively specifies a code string block from the first code string block;

a next code string block specifying step that, when it is determined at the next code ID read-out step that the next code ID read out coincides with the code ID of the head code in the code string block, specifies the code string block located next to the code string block; and wherein
after execution of the search start position specifying step,
the code range read-out step successively reads out a code ID range of a code type for each code starting from the head code in the search code string, and
the next code ID read-out step first reads out from next code ID table corresponding to the above specified code string block the next code ID stored corresponding to a code ID included in the code ID range for the code type of the head code in the search code string, and
after execution of the next code string specifying step,
the code ID range read-out step successively reads out a code ID range of a code type for each code starting from the second code in the search code string, and
the next code ID read-out step first reads out from next code ID table corresponding to the above specified code string block the next code ID stored corresponding to the head code ID in the above specified code string block and stored in the index data management table.

75. A code string search method according to claim 74, wherein
when the code ID of a search code string head code in the search code string, which is a code ID included in the code ID range, read out at the code ID range read-out step, for the code type of the head code in the search code string or the head code ID which is held in the index data management table entry of the code string block specified is taken to be a first code ID and a code whose code ID is the first code ID is taken to be a first code,
the code ID verify step verifies whether the next code ID held in the next code ID table corresponding to the first code ID is included in the code ID range corresponding to a code type of a second code, which is a code located next to the first code in the search target code string, and thereafter,
when the positions in the search code string of the first code and the second code are updated by the read-out operation of the code ID range read-out step and the next code ID read-out step, the code ID verify step verifies whether the next code ID held corresponding to the code ID of the first code, whose position has been updated, is included within the code ID range for the code type of the second code, whose position has been updated.

76. A code string search method according to claim 75, wherein
the next code ID table holds, corresponding to each of the code IDs, a code position which shows position of a code whose code ID is said each of the code IDs in the search target code string, and
when the verification whether the next code ID read out at the next code ID read-out step is included within the code ID range read out at the code ID range read-out step succeeds from a head code of the search code string to a tail code of the search code string,
the code ID verify step outputs as a search result code position a code position held in the next code ID table corresponding to the code ID of the head code.

77. A code string search method according to claim 76, wherein
the code ID verify step, using each of all the code IDs included within the code ID range pointed to by the code type of the head code in the search code string as the code ID of the head code of the search code string, verifies whether the next code ID read out at the next code ID read-out step is included within the code ID range read out at the code ID range read-out step.

78. A code string search program for causing a computer to execute a code string search method according to claim 74.

79. A code string search program for causing a computer to execute a code string search method according to claim 75.

80. A code string search program for causing a computer to execute a code string search method according to claim 76.

81. A code string search program for causing a computer to execute a code string search method according to claim 77.

82. A non-transitory computer readable medium holding a code string search program according to claim 78.

83. A data configuration adapted to a code string search method for searching search target code strings that are object of a search by means of a search code string, comprising:
   code ID range tables, each of the code ID range tables holding a code ID range for each code of the same type, which is a range of code IDs uniquely identifying each and every code located in each of code string blocks that are parts of a search target code string that is partitioned into a plurality of the code string blocks, and are designed so that tail codes of the code string blocks are duplicated in the head codes of following code string blocks;
   next code ID tables, each of the next code ID tables holding, corresponding to each of the code IDs, a next code ID, which is a code ID of a code located next after a code whose code ID is said each of the code IDs in a code string block that is a part of the search target code string, and if a code is located in tail position in a code string block, a next code ID table holds, as a next code ID corresponding to a code ID of the code in the tail position, a code ID of a code located in a head position of the code string block;
   an index data management table holding, for each code string block, a head code ID which is a code ID of a head code of the code string block; and wherein
   a code string search method according to claim 74 is enabled by using the code ID range table, the next code ID table, and the index data management table.

84. A data configuration according to claim 83, wherein a next code ID table holds, corresponding to each of the code IDs, a code position which shows position of a code whose code ID is said each of the code IDs in the search target code string.

85. A data configuration according to claim 84, wherein a next code ID and a code position held in the next code ID table corresponding to a code ID are held contiguously in code position sequence for the code IDs of codes with the same code type.

86. A non-transitory computer readable medium holding the data configuration according to claim 83.

87. An index data creation apparatus for a code string search searching search target code strings that are the object of a search by means of a search code string, comprising:
   a search target code string read-out means that successively reads out code string blocks that are parts of a search target code string that is partitioned into a plurality of blocks and are designed so that tail codes of the code string blocks are duplicated in the head codes of following code string blocks and obtains a number of occurrences of each code type of codes in the read-out code string block;
   a code ID range table creation means that creates code ID range tables, each of the code ID range tables holding a code ID range for each code of the same type, which is a range of code IDs uniquely identifying each and every code located in each of the code string blocks, based on the number of occurrences of each code type obtained by the search target code string read-out means;
   a next code ID table creation means that creates next code ID tables, each of the next code ID table holding, corresponding to each of the code IDs, a next code ID, which is a code ID of a code located next after a code whose code ID is said each of the code IDs in a code string block, based on the code string blocks read out by the search target code string read-out means and the code ID range table; and
   an index data creation management means that reserves an index data storage area holding the code ID range table and the next code ID table corresponding to a code string block for each such code string block and creates an index data management table holding, for each code string block, a code ID of a code located at leading position of the code string block and a pointer to the index data storage area for each code string block.

88. An index data creation apparatus according to claim 87, wherein
   a next code ID and a code position held in the next code ID table corresponding to a code ID are held contiguously in code position sequence for the code IDs of codes of the same code type.

89. An index data creation method performed by an index data creation apparatus according to claim 87, comprising:
   a search target code string read-out step that successively reads out code string blocks that are parts of a search target code string that is partitioned into a plurality of blocks and are designed so that tail codes of the code string blocks are duplicated in the head codes of following code string blocks and obtains a number of occurrences of each code type of codes in the read-out code string block;
   a code ID range table creation step that creates code ID range tables, each of the code ID range tables holding a code ID range for each code of the same type, which is a range of code IDs uniquely identifying each and every code located in each of the code string blocks, based on the number of occurrences of each code type obtained at the search target code string read-out step;
   a next code ID table creation step that creates next code ID tables, each of the next code ID table holding, corresponding to each of the code IDs, a next code ID, which is a code ID of a code located next after a code whose code ID is said each of the code IDs in a code string block, based on the code string blocks read out at the search target code string read-out step and the code ID range table;
   an index data creation management step that reserves an index data storage area holding the code ID range table and the next code ID table corresponding to a code string block for each such code string block and creates an index data management table holding, for each code string block, a code ID of a code located at leading position of the code string block and a pointer to the index data storage area for each code string block; and wherein
   the search target code string read-out step, the code ID range table creation step, and the next code ID table creation step are all repeatedly executed on all the code string blocks.

90. An index data creation program for causing a computer to execute an index data creation method according to claim 89.

91. A non-transitory computer readable medium holding an index data creation program according to claim 90.

* * * * *